US012510839B2

(12) United States Patent
Kototani et al.

(10) Patent No.: US 12,510,839 B2
(45) Date of Patent: Dec. 30, 2025

(54) PROCESS CARTRIDGE AND PROCESS CARTRIDGE SET

(71) Applicant: CANON KABUSHIKI KAISHA, Tokyo (JP)

(72) Inventors: Shohei Kototani, Shizuoka (JP); Dai Nozaki, Shizuoka (JP); Masashi Uno, Shizuoka (JP); Kenji Ookubo, Shizuoka (JP); Yuichi Kikuchi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/961,214

(22) Filed: Nov. 26, 2024

(65) Prior Publication Data

US 2025/0181004 A1 Jun. 5, 2025

(30) Foreign Application Priority Data

Dec. 1, 2023 (JP) ................................ 2023-203615

(51) Int. Cl.

*G03G 15/02* (2006.01)
*G03G 9/08* (2006.01)
*G03G 9/087* (2006.01)
*G03G 9/113* (2006.01)
*G03G 21/18* (2006.01)

(52) U.S. Cl.

CPC ....... *G03G 15/0233* (2013.01); *G03G 9/0825* (2013.01); *G03G 9/08773* (2013.01); *G03G 9/1139* (2013.01); *G03G 15/0258* (2013.01); *G03G 21/1814* (2013.01); *G03G 21/1828* (2013.01)

(58) Field of Classification Search

CPC ........... G03G 15/0233; G03G 15/0258; G03G 9/0825; G03G 9/08773; G03G 9/1139; G03G 21/1814; G03G 21/1828

See application file for complete search history.

(56) References Cited

U.S. PATENT DOCUMENTS

2013/0223891 A1* 8/2013 Koyanagi .......... G03G 15/0812 399/284
2015/0248069 A1* 9/2015 Uchino .............. G03G 9/08755 430/97
2021/0116832 A1* 4/2021 Kototani .............. G03G 9/0827

FOREIGN PATENT DOCUMENTS

JP H0962026 A 3/1997
JP 2015502567 A 1/2015
JP 2015210468 A 11/2015

(Continued)

*Primary Examiner* — Joseph S Wong

(74) *Attorney, Agent, or Firm* — Canon U.S.A., Inc. IP Division

(57) ABSTRACT

A process cartridge includes a charging unit, (I) wherein the charging unit includes a conductive member, wherein the conductive member includes a conductive layer disposed on an outer surface of a support, the conductive layer has a matrix-domain structure including a matrix and a plurality of domains, the matrix contains a first rubber, the domains contain a second rubber, and (II) wherein the toner includes agglomerates containing silica fine particles and binding components on surfaces of the toner particles, and wherein a relationship of Dms<Ag is satisfied, where Dms is an arithmetic mean of distances between adjacent domains at the outer surface of the conductive roller, and Ag is an arithmetic mean of Feret diameters of the agglomerates.

11 Claims, 10 Drawing Sheets

(56) References Cited

FOREIGN PATENT DOCUMENTS

| | | | |
|---|---|---|---|
| JP | 2016065963 | A | 4/2016 |
| JP | 2018077385 | A | 5/2018 |
| JP | 2021067759 | A | 4/2021 |

* cited by examiner

PROCESS CARTRIDGE AND PROCESS CARTRIDGE SET

BACKGROUND

Technical Field

The present disclosure relates to a process cartridge and a process cartridge set for use in a recording method using electrophotography, electrostatic recording, and toner jet recording.

Description of the Related Art

Electrophotography and other methods that visualize image information via electrostatic latent images are applied in copying machines, multifunction peripherals, and printers. As use purposes diversify, longer life and higher image quality have been desired of electrophotographic apparatuses and process cartridges in recent years.

To maintain high image quality throughout a lifetime, it is effective to control toner chargeability to not change over the lifetime. In typical electrophotographic processes, the toner chargeability is controlled by disposing various types of organic or inorganic fine powders called external additives on the surfaces of the toner particles. Use of external additives in the form of aggregates has also been examined instead of single particles. For example, Japanese Patent Application Laid-Open No. 2016-65963 discusses toner that can achieve high image quality even under a high-temperature high-humidity environment through the use of silica aggregates.

Electrophotographic apparatuses use conductive members as charging members. Conductive members configured to include a conductive support and a conductive layer disposed on the support have been known. Conductive members play the role of transporting charges from the conductive support to the surface of the conductive member and imparting the charges to a contacted object through discharge or triboelectric charging.

A conductive member serving as a charging member causes a discharge between itself and an electrophotographic photosensitive member, thereby charging the surface of the electrophotographic photosensitive member. If the surface of the charging member that is a conductive member is contaminated with external additives or toner particles that are insulators, the contaminated portions change in chargeability and become visible in the image. A cleaning member can thus be attached for the purpose of removing the toner and external additives from the electrophotographic photosensitive member to prevent the contamination of the charging member. In such a cleaning section, there is a layer called blocking layer, which is formed by supplying external additives between the cleaning member and the electrophotographic photosensitive member. The clearing performance is known to be exerted by the blocking layer.

For example, Japanese Patent Application Laid-Open No. 2018-77385 discusses an attempt to provide a high-quality image by controlling the surface asperities of the conductive members to a desired shape and selecting the content of external additives in the toner to control the surface contamination characteristics of the charging members.

As described above, to achieve high image quality throughout a long lifespan, toners containing various external additives and cartridges using various conductive members have heretofore been discussed.

At the same time, adverse effects caused by the contamination of members by external additive have also been known. For example, if paper dust or other foreign objects in the apparatus main body reach the cleaning section, and a part of the blocking layer in the cleaning section is damaged, the cleaning ability in that part is lost. This results in a phenomenon that a large amount of toner and external additives are supplied to the conductive member until the blocking layer is re-formed. Once this phenomenon occurs, image defects appear in the form of vertical streaks due to extreme contamination of a part of the conductive member. Such a phenomenon is particularly noticeable if the external additives are designed to be used in small quantities for other purposes or if the blocking layer is designed to be thin.

On the other hand, if the external additives are designed to be present at the cleaning section in large quantities, some of the external additives can pass through the cleaning section and contaminate the conductive member even with the blocking layer maintained. Once this phenomenon occurs, the entire conductive member can be contaminated in a spotty pattern. This results in nonuniform potentials on the photosensitive member, causing the adverse effect of uneven image density.

Such disadvantages can be more pronounced in long-life electrophotographic systems where contamination continues to accumulate if merely the amount of external additives is adjusted.

In view of the foregoing, long-life electrophotographic systems have had room for further improvement regarding image defects due to contamination of conductive members.

SUMMARY

The present disclosure is directed to providing a cartridge that is less likely to cause poor cleaning or image defects due to contamination of a conductive member throughout a long lifespan and can achieve long life and high image quality.

According to an aspect of the present disclosure, A process cartridge includes toner, a toner accommodation unit configured to accommodate the toner, an electrophotographic photosensitive member, a charging unit configured to charge a surface of the electrophotographic photosensitive member, a cleaning unit configured to remove residual toner from a region upstream of the charging unit, and a developing unit configured to develop an electrostatic latent image formed on the surface of the electrophotographic photosensitive member with toner to form a toner image on the surface of the electrophotographic photosensitive member, (I) wherein the charging unit includes a conductive member disposed to contact the electrophotographic photosensitive member, wherein the cleaning unit includes a cleaning blade disposed to contact the electrophotographic photosensitive member, wherein the conductive member includes a support having a conductive outer surface and a conductive layer disposed on the outer surface of the support, the conductive layer has a matrix-domain structure including a matrix and a plurality of domains dispersed in the matrix, the matrix contains a first rubber, the domains contain a second rubber, and a surface of the conductive member has a surface roughness Ra of 2.00 μm or less, and wherein G1 and G2 both fall within a range of 1.0 $N/mm^2$ or more and 10.0 $N/mm^2$ or less, and an absolute value of a difference between G1 and G2 is 0.1 $N/mm^2$ or more and 7.0 $N/mm^2$ or less, where G1 is a Martens hardness of the matrix measured at the outer surface of the conductive member under a load of 1 mN, and G2 is a Martens hardness of the domains measured at the outer surface of the conductive member under a load of 1 mN, and (II) wherein the toner includes at least toner particles, with agglomerates containing silica fine particles and binding components on surfaces of the toner particles, wherein CI is 1% by number or more and 15% by number or less, where CI (% by number) is a ratio by number of toner particles with the agglomerates, wherein CI, Ca, and Cb satisfy the following inequalities (1) and (2):

$$0.90 \le Ca/CI \le 1.00, \text{ and } \ldots \text{ inequality} \quad (1)$$

$$0.01 \le Cb/CI \le 0.10, \ldots \text{ inequality} \quad (2)$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

ultrasonic condition A: an output frequency of 30 kHz, an output power of 0.75 W, and an irradiation time of 300 s, and ultrasonic condition B: an output frequency of 30 kHz, an output power of 35 W, and an irradiation time of 300 s, and wherein a relationship of Dms<Ag is satisfied, where Dms is an arithmetic mean of distances between adjacent domains at the outer surface of the conductive roller, and Ag is an arithmetic mean of Feret diameters of the agglomerates.

According to another aspect of the present disclosure, a process cartridge set includes a first cartridge and a second cartridge configured to be detachably attached to a main body of an electrophotographic apparatus, (I) wherein the first cartridge includes a charging unit configured to charge a surface of an electrophotographic photosensitive member, a cleaning unit configured to remove residual toner from a region upstream of the charging unit, and a first frame configured to support the charging unit and the cleaning unit, and wherein the second cartridge includes a toner container configured to accommodate toner with which an electrostatic latent image formed on the surface of the electrophotographic photosensitive member is developed to form a toner image on the surface of the electrophotographic photosensitive member, (II) wherein the charging unit includes a conductive member disposed to contact the electrophotographic photosensitive member, wherein the cleaning unit includes a cleaning blade disposed to contact the electrophotographic photosensitive member, wherein the conductive member includes a support having a conductive outer surface and a conductive layer disposed on the outer surface of the support, the conductive layer has a matrix-domain structure including a matrix and a plurality of domains dispersed in the matrix, the matrix contains a first rubber, the domains contain a second rubber, and a surface of the conductive member has a surface roughness Ra of 2.00 μm or less, and wherein G1 and G2 both fall within a range of 1.0 N/mm$^2$ or more and 10.0 N/mm$^2$ or less, and an absolute value of a difference between G1 and G2 is 0.1 N/mm$^2$ or more and 7.0 N/mm$^2$ or less, where G1 is a Martens hardness of the matrix measured at the outer surface of the conductive member under a load of 1 mN, and G2 is a Martens hardness of the domains measured at the outer surface of the conductive member under a load of 1 mN, and (III) wherein the toner includes at least toner particles, with agglomerates containing silica fine particles and binding components on surfaces of the toner particles, wherein CI is 1% by number or more and 15% by number or less, where CI (% by number) is a ratio by number of toner particles with the agglomerates, wherein CI, Ca, and Cb satisfy the following inequalities (1) and (2):

$$0.90 \le Ca/CI \le 1.00, \text{ and } \ldots \text{ inequality} \quad (1)$$

$$0.01 \le Cb/CI \le 0.10, \ldots \text{ inequality} \quad (2)$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

ultrasonic condition A: an output frequency of 30 kHz, an output power of 0.75 W, and an irradiation time of 300 s, and ultrasonic condition B: an output frequency of 30 kHz, an output power of 35 W, and an irradiation time of 300 s, and wherein a relationship of Dms<Ag is satisfied, where Dms is an arithmetic mean of distances between adjacent domains at the outer surface of the conductive roller, and Ag is an arithmetic mean of Feret diameters of the agglomerates.

Further features of the present disclosure will become apparent from the following description of exemplary embodiments with reference to the attached drawings.

DESCRIPTION OF THE EMBODIMENTS

Figure 1:
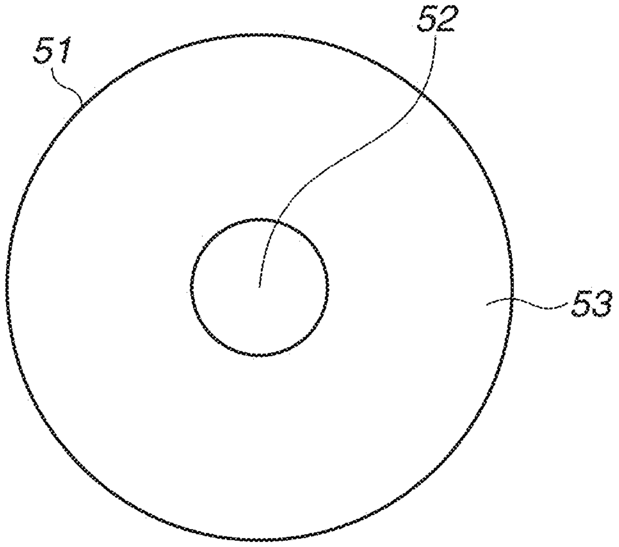
FIG. 1 is a sectional view of a charging roller in a direction orthogonal to its longitudinal direction.

In the present disclosure, phrases such as “XX or more and YY or less” and “XX to YY” expressing a numerical range mean that the numerical range includes both lower and upper limits that are the end points unless otherwise specified. If numerical ranges are described stepwise, the upper and lower limits of the numerical ranges can be freely combined. In the following description, toner particles before the deposition of agglomerates on the toner particle surfaces may be referred to as "toner core particles".

[Features of an Exemplary Embodiment According to Present Disclosure]

As mentioned above, toner's external additives desirably have the capability of forming a stable blocking layer in a cleaning section and the capability of being less likely to pass through the cleaning section or, if passed through, less likely to adhere to a conductive member.

As a means for forming a stable blocking layer, a large amount of external additives can be supplied to the blocking layer. If a large amount of external additives is supplied, a firm blocking layer difficult for toner to pass through is considered to be formed by the large amount of external additives. The supply of a large amount of external additive is also considered to enable quickly re-formation of the blocking layer if the blocking layer is damaged.

However, to supply a large amount of external additives also means that the external additives are likely to transfer from the toner to members. This facilitates member contamination and the passing of the external additives through the cleaning section. Moreover, if the external additives are likely to transfer to members, the external additives will be used up in an early stage, and the effect is difficult to maintain throughout a long lifespan.

To maintain high cleaning performance over a longer lifespan, toner therefore desirably forms a firm blocking layer without depending on a large amount of external additives, and can re-form the blocking layer by quickly supplying a large amount of additional additives in case of breakage of the blocking layer without supplying much external additives in a state where the blocking layer is stable.

In view of such desirable characteristics, the inventors have found that the following combination of toner and a conductive member as a charging member can provide high-quality electrophotographic images without much chances of poor cleaning or image defects due to contamination of the conductive member throughout a long lifespan.

"Toner"

The toner includes at least toner particles, with agglomerates containing silica fine particles and binding components on the surfaces of the toner particles. CI is 1% by number or more and 15% by number or less, where CI (% by number) is the ratio by number of toner particles with the agglomerates. CI, Ca, and Ca satisfy the following inequalities (1) and (2):

$$0.90 \le Ca/CI \le 1.00, \text{ and } \ldots \text{ inequality} \quad (1)$$

$$0.01 \le Cb/CI \le 0.10, \ldots \text{ inequality} \quad (2)$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

Ultrasonic condition A: an output frequency of 30 kHz, an output power of 0.75 W, and an irradiation time of 300 s, and Ultrasonic condition B: an output frequency of 30 kHz, an output power of 35 W, and an irradiation time of 300 s.

A relationship of Dms<Ag is satisfied, where Dms is an arithmetic mean of distances between adjacent domains at the outer surface of the conductive roller, and Ag is an arithmetic mean of Feret diameters of the agglomerates.

"Conductive Member"

The conductive member (hereinafter, may be referred to as a conductive roller) includes a support with a conductive outer surface and a conductive layer disposed on the outer surface of the support. The conductive layer has a matrix-domain structure including a matrix and a plurality of domains dispersed in the matrix. The matrix contains a first rubber. The domains contain a second rubber. The surface of the conductive member has a surface roughness Ra of 2.00 μm or less. G1 and G2 both fall within the range of 1.0 $N/mm^2$ or more and 10.0 $N/mm^2$ or less, and the absolute value of a difference between G1 and G2 satisfies a relationship of 0.1 $N/mm^2$ or more and 7.0 $N/mm^2$ or less, where G1 is the Martens hardness of the matrix measured at the outer surface of the conductive roller under a load of 1 mN, and G2 is the Martens hardness of a domain measured at the outer surface of the conductive roller under a load of 1 mN (the "outer surface" of the conductive roller refers to the surface of the conductive roller to contact the toner).

The inventors have considered that the mechanism through which this combination achieves its effect is as follow:

The toner according to the present disclosure includes agglomerates containing silica fine particles and binding components on the toner particle surfaces. The agglomerates contain the binding components that bind the silica fine particles with each other and the toner particles and the agglomerates with each other. Unlike ordinary aggregates of silica fine particles, the silica fine particles are therefore difficult to separate from each other, and so are the toner particles and the agglomerates. The agglomerates are thus considered to be able to form a firm blocking layer when supplied to the blocking layer. This is considered to make the passing of the external additives less likely and reduce the occurrence of uneven image density due to the foregoing contamination of the conductive roller.

If the blocking layer is damaged, the toner passes through the cleaning section and reaches the conductive member. If such a state continues, large amounts of toner and external additives accumulate on the conductive member, leading to image defects. To solve this phenomenon, the inventors have contemplated that the phenomenon can be resolved by quickly transferring the external additives on the toner particles from the toner to the photosensitive member when the toner reaches the conductive member, thereby quickly supplying the external additives to the cleaning section.

In the toner according to the present disclosure, CI is 1% by number or more and 15% by number or less, where CI (% by number) is the ratio by number of toner particles with the agglomerates. CI, Ca, and Ca satisfy the following inequalities (1) and (2):

$$0.90 \le Ca/CI \le 1.00, \text{ and } \ldots \text{ inequality} \quad (1)$$

$$0.01 \le Cb/CI \le 0.10, \ldots \text{ inequality} \quad (2)$$

where Ca (% by number) is the ratio by number of toner particles with the agglomerates in the toner after processed under the foregoing ultrasonic condition A, and Cb (% by number) is the ratio by number of toner particles with the agglomerates in the toner after processed under the foregoing ultrasonic condition B. In other words, the agglomerates have the characteristic of not transferring from the toner in a low shear environment and transferring from the toner in a high shear environment. The inventors have contemplated that the presence of such a characteristic can provide the effect of transferring the agglomerates from the toner to quickly re-form the blocking layer in limited situations where the blocking layer is damaged and the toner passes through, and can thereby suppress image defects.

The inventors have also contemplated that the combination with the conductive roller to be described below enables extremely efficient transfer of the agglomerates on the toner particle surfaces according to the present disclosure to the photosensitive drum, whereby the disadvantage can be resolved.

The conductive roller according to the present disclosure has a surface roughness Ra of 2.00 μm or less at the outer surface. The conductive roller also satisfies the characteristics that G1 and G2 both fall within the range of 1.0 $N/mm^2$ or more and 10.0 $N/mm^2$ or less and the absolute value of the difference between G1 and G2 is 0.1 $N/mm^2$ or more and 7.0 $N/mm^2$ or less, where G1 is the Martens hardness of the matrix of the conductive layer having the matrix-domain structure, measured at the outer surface of the conductive roller under a load of 1 mN, and G2 is the Martens hardness of a domain measured under a load of 1 mN. Moreover, the agglomerates satisfy the relationship of $Dms<Ag$, where Dms is the arithmetic mean of the closest distances between domains at the outer surface of the conductive roller, and Ag is the arithmetic mean of the Feret diameters of the agglomerates. The foregoing G1 and G2 represent the presence of regions of different hardnesses at the outer surface of the conductive roller. The fact that the conductive roller and the agglomerates satisfy such characteristics means that when an agglomerate contacts the conductive roller, the agglomerate can span across regions of different hardnesses at the surface of the conductive roller.

If pressure is applied across such regions of different hardnesses, regions of lower hardness deform to relieve pressure. Meanwhile, regions of higher hardness do not deform and the pressure practically concentrates on the regions of higher hardness, causing a phenomenon of increased peak pressure. With agglomerates across regions of different hardnesses at the surface of the conductive roller, the pressure acting on the agglomerates from the conductive member is considered to be higher than with ordinary external additives. More specifically, when the toner reaches the nip portion between the conductive roller and the photosensitive member and high shear is applied to the agglomerates on the toner particle surfaces, the agglomerates are considered to transfer from the toner to the surface of the photosensitive member. Since the transferred agglomerates supply a large amount of external additives to the surface of the photosensitive member only in a temporary environment when the toner passes through the cleaning section, the blocking layer is considered to be able to be quickly repaired before an image defect occurs.

As described above, the combination according to the present exemplary embodiment forms a firm blocking layer at locations where shear is low, like the cleaning section. Meanwhile, the agglomerates can suitably transfer to re-form the blocking layer through contact with the conductive layer after passed through the cleaning section.

Based on the foregoing mechanism, the configuration and suitable ranges of the present disclosure will now be described in detail. An overall configuration of a process cartridge will be described below.

[Conductive Roller]

The conductive member will be described with reference to FIG. 1, using a conductive roller having a roller shape (hereinafter, may be referred to as a "conductive member") as an example. FIG. 1 is a sectional view perpendicular to a direction (hereinafter, may be referred to as a "longitudinal direction") along the axis of the conductive roller. A conductive roller 51 includes a cylindrical conductive support 52 and a conductive layer 53 formed on the outer periphery of the support 52, i.e., the outer surface of the support 52.

<Support>

The support 52 can be made of a material appropriately selected from conventional materials in the field of electrophotographic conductive rollers and materials usable for conductive rollers. Examples of the materials may include metals and alloys such as aluminum, stainless steel, conductive synthetic resins, iron, and copper alloys.

Oxidation treatment or chromium, nickel, or other plating treatment may be applied to such materials. As for the type of plating, both electroplating and electroless plating can be used. Electroless plating is desirable from the viewpoint of dimensional stability. Examples of the types of electroless plating to be used here may include nickel plating, copper plating, gold plating, and plating with various other types of alloys.

The plating thickness is desirably 0.05 μm or more. Considering the balance between the work efficiency and antirust performance, the plating thickness is desirably 0.10 μm or more and 30.00 μm or less. The cylindrical shape of the support 52 may be a solid cylinder or a hollow cylinder. The support 52 desirably has an outer diameter in the range of 3 mm or more and 10 mm or less.

The presence of an intermediate resistance layer or an insulating layer between the support 52 and the conductive layer 53 can hinder prompt supply of charges after charge consumption by electrical discharge. The conductive layer 53 is therefore desirably formed directly on the support 52, or on the outer periphery of the support 52 with only a thin intermediate layer of conductive resin, such as a primer, therebetween.

Conventional primers can be selected and used depending on the rubber material for forming the conductive layer 53 and the material of the support 52. Examples of the primer materials include thermosetting resins and thermoplastic resins. Specifically, conventional materials such as phenol resins, urethane resins, acrylic resins, polyester resins, polyether resins, and epoxy resins can be used.

<Conductive Layer>

The conductive layer 53 includes a matrix and a plurality of domains dispersed in the matrix. The matrix contains a first rubber. The domains contain a second rubber, and an electronic conductive agent where appropriate. The electronic conductive agent is desirably included in the domains since agglomerates of external additives can be suitably transferred. However, the electronic conductive agent may be included in the matrix as far as the charging function of the conductive roller is not impaired.

The conductive layer 53 according to the exemplary embodiment desirably satisfies the following constituent elements (i) and (ii), and more desirably the following constituent element (iii) as well:

Constituent element (i): the outer surface of the conductive roller 51 has a surface roughness Ra of 2.00 μm or less;

Constituent element (ii): G1 and G2 both fall within the range of 1.0 $N/mm^2$ or more and 10.0 $N/mm^2$ or less, and the absolute value of the difference between G1 and G2 satisfies the relationship of 0.1 $N/mm^2$ or more and 7.0 $N/mm^2$ or less, where G1 is the Martens hardness of the matrix portion measured under a load of 1 mN and G2 is the Martens hardness of a domain portion measured under a load of 1 mN; and Constituent element (iii): The arithmetic mean Dm of wall-to-wall distances of adjacent domains (hereinafter, may be referred to simply as a "domain-to-domain distance Dm") under a cross-sectional observation of the conductive layer 53 in the thickness direction is 2.00 μm (2000 nm) or less.

[Constituent Element (i): Surface Roughness Ra of Conductive Layer]

The surface roughness Ra of the outer surface of the conductive roller 51 is desirably 2.00 μm or less.

If the surface roughness Ra is 2.00 μm or less, the increased contact area between the conductive roller 51 and the photosensitive drum can increase the chances of contact with toner reaching the surface of the conductive roller 51. This can provide an appropriate shear for the agglomerates and improve the performance of transferring the agglomerates to the photosensitive drum.

Such a configuration also reduces the area of recesses where the toner and the external additives tend to accumulate on the surface of the conductive roller 51. The external additives are thus less likely to remain on the surface of the conductive roller 51, with less possibilities of image defects. By contrast, if Ra is greater than 2.00 μm, some of the agglomerates remain in the recesses to contaminate the conductive roller 51, facilitating image defects.

The surface roughness Ra is desirably 1.00 μm or less. There is no particular lower limit, but the surface roughness Ra is desirably 0.30 μm or more, and more desirably 0.60 μm. The surface roughness Ra can be adjusted as appropriate, for example, through selection of the domain and matrix materials and the polishing conditions.

A method for measuring the surface roughness Ra will be described below.

[Constituent Element (ii): Martens Hardness]

At least some of the plurality of domains dispersed in the matrix are exposed at the outer surface of the conductive roller 51. The outer surface of the conductive roller 51 is thus formed by the matrix and the exposed domains. Suppose that G1 is the Martens hardness determined by a method to be described below with a probe contacting the matrix exposed at the outer surface of the conductive roller 51, and G2 is the Martens hardness determined by the method to be described below with the probe contacting a domain exposed at the outer surface of the conductive roller 51. The Martens hardnesses G1 and G2 satisfy the foregoing relationship.

The Martens hardnesses G1 and G2 are not parameters indicating the hardness of the bulk matrix or the hardness of the bulk domains, but parameters indicating the hardnesses of the conductive layer 53 at the matrix portion and the exposed domain portions constituting the outer surface of the conductive layer 53.

In other words, the Martens hardnesses measured at the outer surface of the conductive layer 53 define the pressure that the external additives and toner particles at the outer surface undergo when pressed in the nip formed between the electrophotographic photosensitive member and the conductive roller 51.

That G1 and G2 satisfy the foregoing relationship means that the outer surface of the conductive roller 51 does not have a uniform hardness. For such a reason, agglomerates contacting the outer surface are considered to undergo a high shear in harder regions and be likely to transfer from the toner particles when spanning across the domains and the matrix as described above G1 is desirably 1.0 $N/mm^2$ or more and 8.0 $N/mm^2$ or less, more desirably 1.8 $N/mm^2$ or more and 7.0 $N/mm^2$ or less. G2 is desirably 1.5 $N/mm^2$ or more and 10.0 $N/mm^2$ or less, more desirably 2.2 $N/mm^2$ or more and 8.0 $N/mm^2$ or less. The absolute value of the difference between G1 and G2 is desirably 0.3 $N/mm^2$ or more and 6.0 $N/mm^2$ or less.

The Martens hardnesses G1 and G2 can be controlled, for example, by adjusting the material of the first rubber constituting the matrix, the degree of cross-linkage of the first rubber, the types of additives to the matrix, the amounts of the additives, the material of the second rubber constituting the domains, the degree of cross-linkage of the second rubber, the amount of the electronic conductive agent in the domains, and the ratio of the domains present in the matrix.

G1 and G2 are desirably mainly controlled by adjusting the degrees of cross-linkage of the rubbers. Specifically, to bring G1 and G2 into the foregoing ranges, the degrees of cross-linkage of the rubbers are adjusted by controlling the types and amounts of vulcanizing agents and vulcanization accelerators added. Examples of the vulcanizing agents include sulfur. The amount of sulfur is desirably adjusted as appropriate based on the types and amounts of rubbers used. With respect to 100 parts by mass of the rubber component in the unvulcanized rubber composition, 0.5 parts by mass or more and 8.0 parts by mass or less is desirable. The amount of sulfur more than or equal to 0.5 parts by mass can sufficiently harden the vulcanized article. The amount of sulfur less than or equal to 8.0 parts by mass can prevent excessive cross-linkage and too high a hardness of the vulcanized article.

Examples of the vulcanization accelerators may include thiuram, thiazole, guanidine, sulfenamide, dithiocarbamate salt, and thiourea vulcanization accelerators. Of these, thiuram vulcanization accelerators are desirable because they have high effectiveness as vulcanization accelerators for vulcanizing both the first rubber and the second rubber, and can easily adjust G1 and G2.

Examples of the thiuram vulcanization accelerators may include tetramethylthiuram disulfide (TT), tetraethylthiuram disulfide (TET), tetrabutylthiuram disulfide (TBTD), and tetraoctylthiuram disulfide (TOT).

The content of the vulcanization accelerator in the unvulcanized rubber composition is desirably 0.5 parts by mass or more and 4.0 parts by mass or less with respect to 100 parts by mass of the rubber component in the unvulcanized rubber composition. If the content is 0.5 parts by mass or more, the vulcanization accelerator provides a sufficient effect. If the content is 4.0 parts by mass or less, G1 and G2 can be easily adjusted within the foregoing ranges without excessive vulcanization.

The amount of addition of the electronic conductive agent is another means for adjusting G1 and G2. Examples of the electronic conductive agents blended into the domains may include carbon black, graphite, oxides such as titanium oxide and tin oxide, metals such as Cu and Ag, and particles made conductive by surface coating with oxides or metals. Where appropriate, two or more types of such conductive agents may be blended and used in appropriate amounts.

Of the foregoing electronic conductive agents, conductive carbon black, which has high affinity with rubber and can give reinforcing properties to rubber, is desirably used. The type of the carbon black to be blended into the domains is not limited in particular. Specific examples may include gas furnace black, oil furnace black, thermal black, lamp black, acetylene black, and Ketjen black.

For the purpose of adjusting G1 and G2, the content of the electronic conductive agent such as carbon black is desirably 20 parts by mass or more and 150 parts by mass or less with respect to 100 parts by mass of the second rubber in the domains. The content is more desirably 50 parts by mass or more and 100 parts by mass or less. The content within this range can provide the operation and effects of the present exemplary embodiment while maintaining the conductivity of the conductive member.

[Constituent Element (iii): Wall-to-Wall Distance of Adjacent Domains]

To apply an appropriate peak pressure for agglomerates on the toner particle surfaces to transfer to the surface of the photosensitive member when the agglomerates contact the surface of the conductive roller, distances between adjacent domains at the outer surface of the conductive roller desirably satisfy the range described below.

Specifically, to provide a configuration where the agglomerates on the toner particle surface span across the borders between the domains and matrix of different hardnesses, the arithmetic mean Dms of the distances between adjacent domain at the outer surface of the conductive roller 51 is desirably 2.00 μm or less, more desirably 1.00 μm or less.

The domain-matrix structure at the outer surface is similar to that inside the conductive layer 53. The distances between adjacent domains at the outer surface of the conductive roller 51 are therefore desirably such that the arithmetic mean Dm of wall-to-wall distances between adjacent domains under a sectional observation of the conductive layer 53 is 2.00 μm or less, more desirably 1.00 μm.

Since the chances for the agglomerates at the toner particle surfaces to contact the borders between the domains and the matrix can be improved, the distance Dm between the domains is desirably 0.15 μm or more, and more desirably 0.20 μm or more. Within this range, the domains can be electrically securely isolated from each other by the insulating region (matrix). An effect of facilitating charge accumulation in the domains can also be expected.

Method for Measuring Wall-to-Wall Distance Dm Between Adjacent Domains

The domain-to-domain distance Dm can be measured by the following method.

Initially, a section is fabricated by a method similar to that for measuring the volume resistivity of the matrix (describing below).

To observe the matrix-domain structure in a suitable manner, preprocessing such as staining and evaporation may be performed to obtain a suitable contrast between the conductive and insulating phases.

After formation of a fracture surface and platinum evaporation, the section is observed under a scanning electron microscope (SEM) to check for the matrix-domain structure. In view of accurate quantification of the domain area, the section is desirably observed at a magnification of 5000 times under the SEM. A specific procedure will be described below.

Uniformity of Wall-to-Wall Distances Dms and Dm Between Adjacent Domains

To apply a constant peak pressure to the agglomerates on the toner particle surfaces and reduce variations depending on the contact position, the distance Dms between adjacent domains at the surface of the conductive roller 51 is desirably uniformly distributed. The uniform distribution of the domain-to-domain distance Dm is also desirable from the viewpoint of discharge characteristics, since micro-discharges can be more stably formed. The uniform distribution of the domain-to-domain distance Dm can prevent a phenomenon of uneven discharge in situations where the domain-to-domain distance Dm increases locally within the conductive layer 53 and charge supply is hindered compared to the surroundings.

Figure 3A:
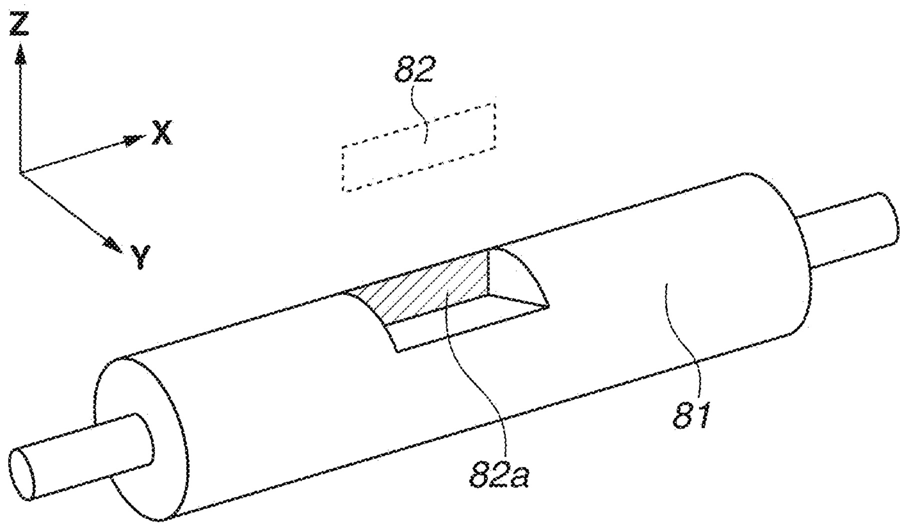
FIGS. 3A and 3B are explanatory diagrams illustrating sectioning directions of the conductive layer of the charging roller.
Figure 3B:
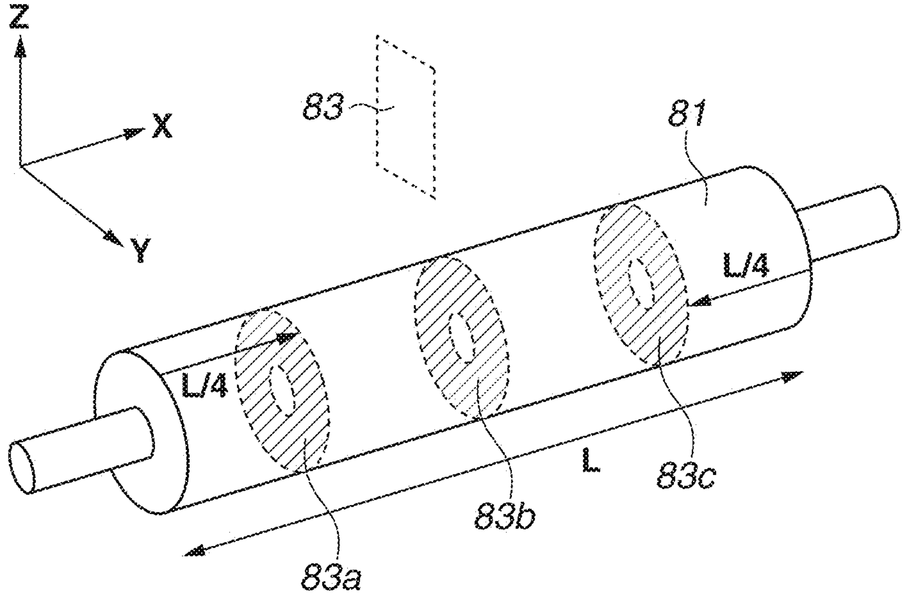

In a section where charges are transported, i.e., a section along the thickness direction such as illustrated in FIG. 3B, 50-μm-square observation regions are obtained at three locations arbitrarily selected within a thickness range of 0.1T to 0.9T in depth from the outer surface of the conductive layer 53 toward the support 52. Here, a coefficient of variation σm/Dm of the domain-to-domain distance Dm is desirably 0 or more and 0.40 or less, more desirably 0.10 or more and 0.30 or less, where Dm is the domain-to-domain distance in each observation region and σm is the standard deviation of the distribution of the domain-to-domain distances Dm.

Method for Measuring Uniformity of Wall-to-Wall Distances Dms and Dm Between Adjacent Domains Like the measurement of the domain-to-domain distances, the uniformity of the domain-to-domain distances can be measured by quantifying images obtained by directly observing raptured surfaces. A specific procedure will be described below.

The conductive member according to the present exemplary embodiment can be formed, for example, through a method including the following processes (i) to (iv): Process (i): Prepare a domain-forming rubber mixture (hereinafter, also referred to as a carbon master batch [CMB] containing carbon black and the second rubber);

Process (ii): Prepare a matrix-forming rubber mixture (hereinafter, also referred to as a master rubber compound [MRC]) containing the first rubber;

Process (iii): Prepare a rubber mixture having a matrix-domain structure by kneading the CMB and MRC; and Process (iv): Form a layer of the rubber mixture prepared in process (iii) on a conductive support directly or via another layer, and cure the rubber composition layer to form the conductive layer.

The foregoing constituent elements (i) to (iii) can be controlled by selecting the materials used in the foregoing processes and adjusting the manufacturing conditions.

<Method for Checking Matrix-Domain Structure>

The presence of the matrix-domain structure in the conductive layer 53 can be checked by slicing the conductive layer 53 and observing raptured surfaces formed on the slice in detail.

<Control of Dispersed State of Domains>

Concerning the dispersed state of domains, it is effective to control the following four factors (a) to (d):

(a) A difference between the interfacial tensions σ of the CMB and MRC;

(b) The ratio (ηd/ηm) of CMB viscosity (ηd) to MRC viscosity (ηm);

(c) The shear rate (γ) during the kneading of the CMB and MRC and the amount of energy (EDK) during shearing in the foregoing process (iii); and (d) The volume fraction of the CMB to the MRC in the foregoing process (iii).

(a) Difference in Interfacial Tension Between CMB and MRC

In general, when two types of incompatible rubbers are mixed, phase separation occurs. The reason is that the interaction between the same type of polymers is stronger than that between different types of polymers, and the same type of polymers tend to aggregate to reduce the free energy for stabilization.

Since different types of polymers contact at the interfaces of the phase-separated structure, the free energy is high compared to the interior that is stabilized by interaction between the same type of molecules. As a result, to reduce the interfacial free energy, interfacial tension occurs to minimize the contact area between different types of polymers. If the interfacial tension is low, the system tends towards a more uniform mixture of different polymers for increased entropy. The uniformly mixed state refers to dissolution, and a solubility parameter (SP) value serving as an index of solubility tends to correlate with the interfacial tension.

In other words, the difference in interfacial tension between the CMB and MRC is considered to correlate with a difference between the SP values of the respective rubbers included in the CMB and MRC. The rubbers are desirably selected so that the absolute value of a difference between the SP value of the first rubber in the MRC and the SP value of the second rubber in the CMB is 0.4 $(J/cm^3)^{0.5}$ or more and 5.0 $(J/cm^3)^{0.5}$ or less, more desirably 0.4 $(J/cm^3)^{0.5}$ or more and 2.2 $(J/cm^3)^{0.5}$ or less. Within this range, a stable phase-separated structure can be formed with small CMB domain diameters.

As a specific example of the second rubber that can be used for the CMB, at least one selected from a group consisting of natural rubber (NR), isoprene rubber (IR), butadiene rubber (BR), acrylonitrile butadiene rubber (NBR), styrene butadiene rubber (SBR), butyl rubber (IIR), ethylene propylene rubber (EPM), ethylene propylene diene rubber (EPDM), chloroprene rubber (CR), nitrile rubber (NBR), hydrogenated nitrile rubber (H-NBR), silicone rubber, and urethane rubber (U) is desirable.

The second rubber is more desirably at least one selected from a group consisting of SBR, IIR, and NBR, even more desirably at least one selected from a group consisting of SBR and IIR.

The thickness of the conductive layer 53 is not limited in particular, as long as the intended function and effects of the conductive roller 51 are obtained. The thickness of the conductive layer 53 is desirably 1.0 mm or more and 4.5 mm or less.

The mass ratio of the domains and matrix (domain: matrix) is desirably 5:95 to 40:60, more desirably 10:90 to 30:70, even more desirably 13:87 to 25:75.

Method for Measuring SP Value

The SP value can be accurately calculated by creating a calibration curve using materials with known SP values. Material manufacturers' catalog values may be used as the known SP values. For example, the SP values of NBR and SBR are largely determined by the content ratios of acrylonitrile and styrene, independent of the molecular weights.

The rubbers constituting the matrix and domains are therefore analyzed for the content ratios of acrylonitrile and styrene, using analytical methods such as pyrolysis gas chromatography (Py-GC) and solid-state nuclear magnetic resonance (NMR). The SP values can be calculated using the calibration curves thus obtained from the materials with known SP values.

The SP value of IR is determined by its isomeric structures, such as 1,2-polyisoprene, 1,3-polyisoprene, 3,4-polyisoprene, cis-1,4-polyisoprene, and trans-1,4-polyisoprene. Like SBR and NBR, the SP value can thus be calculated from materials with known SP values by analyzing the isomer content ratio using Py-GC or solid-state NMR.

The SP values of the materials with the known SP values are ones determined by the Hansen sphere method.

(b) Viscosity Ratio of CMB and MRC

The closer the viscosity ratio of the CMB and MRC (CMB/MRC, or $\eta d/\eta m$) is to 1, the smaller the domain diameters can be made. Specifically, the viscosity ratio is desirably 1.0 or more and 2.0 or less. The viscosity ratio of the CMB and MRC can be adjusted by selecting the Mooney viscosities of the raw rubbers used for the CMB and MRC and adjusting the types and amounts of fillers compounded.

Plasticizers such as paraffin oil can be added as far as the formation of the phase-separated structure is not hindered. The viscosity ratio can also be adjusted by adjusting the kneading temperature.

The viscosities of the domain-forming rubber mixture and the matrix-forming rubber mixture can be obtained by measuring the Mooney viscosity $ML_{(1+4)}$ at the kneading rubber temperature, based on Japan Industrial Standard (JIS) K 6300-1:2013.

(c) Shear Rate During Kneading of MRC and CMB and Amount of Energy During Shearing The higher the shear rate of the MRC and CMB during kneading and the greater the amount of energy during shearing, the smaller the domain-to-domain distances Dm and Dms can be made.

The shear rate can be increased by increasing the inner diameter of the agitation member such as the kneader's blade or screw to reduce the gap between the end faces of the agitation member and the inner wall of the kneader, and/or increasing the number of rotations. The energy during shearing can be increased by increasing the number of rotations of the agitation member and/or increasing the viscosity of the first rubber in the CMB and that of the second rubber in the MRC.

(d) Volume Fraction of CMB to MRC

The volume fraction of the CMB to the MRC correlates with the collision and coalescence probability of the domain-forming rubber mixture against the matrix-forming rubber mixture. Specifically, reducing the volume fraction of the domain-forming rubber mixture to the matrix-forming rubber mixture decreases the collision and coalescence probability between the domain-forming rubber mixture and the matrix-forming rubber mixture. In other words, the domain-to-domain distances Dm and Dms can be reduced by reducing the volume fraction of the domains in the matrix within the range where a predetermined conductivity can be obtained.

The volume fraction of the MRC to the CMB (i.e., the volume fraction of the domains to the matrix) is desirably 15% or more and 40% or less.

<Volume Resistivity R1 of Matrix and Volume Resistivity R2 of Domains>

In using the conductive roller 51 as a charging roller in an electrophotographic system, the volume resistivities of the matrix and domains are desirably controlled within appropriate ranges.

The volume resistivity R1 of the matrix is desirably greater than $1.00\times10^{12}$ Ω·cm. This can prevent the movement of charges through the matrix, bypassing the domains. This can also prevent consumption of most of the accumulated charges by a single discharge. Moreover, the charges accumulated in the domains are prevented from leaking to the matrix and forming a conductive path as if communicating through the conductive layer 53. The volume resistivity R1 is desirably $2.00\times10^{12}$ Ω·cm or higher.

The upper limit of R1 is not limited in particular. As a guideline, R1 is desirably $1.00\times10^{17}$ Ω·cm or less, more desirably $8.00\times10^{16}$ Ω·cm or less.

To enable the movement of charges in the conductive layer 53 through the domains and achieve micro-discharge, the inventors contemplate that a configuration to isolate regions accumulating sufficient charges (domains) with an electrically insulating region (matrix) is effective. By setting the volume resistivity R1 of the matrix within the range of such a high-resistance region, sufficient charges can be accumulated at the interfaces with the domains, and charge leakage from the domains can be prevented.

To achieve micro-discharges with sufficient amounts of discharge, it is extremely efficient to limit the moving paths of the charges to those through the domains. Since the charge leakage from the domains to the matrix is prevented and the charge transport paths are limited to those through the plurality of domains, the charge density at the domains can be improved. This can further increase the amount of charges accumulated in the domains.

As a result, the total number of charges involved in discharging at the domain surfaces serving as a conductive phase to originate discharge can be increased. The ease of discharge at the surface of the conductive member can thereby be improved.

The volume resistivity R1 of the matrix is determined by the composition of the MRC.

The first rubber used for MRC is desirably a low-conductivity rubber. At least one selected from a group consisting of NR, BR, NBR, U, silicone rubber, fluorocarbon rubber, IR, CR, SBR, EPM, EPDM, and polynorbornene rubber is desirable. The first rubber is more desirably at least one selected from a group consisting of BR, SBR, and EPDM.

Fillers, processing aids, crosslinking agents, crosslinking aids, crosslinking accelerators, crosslinking accelerator aids, crosslinking retarders, antioxidants, softeners, dispersants, and coloring agents may be added to the MRC as long as the volume resistivity R1 of the matrix falls within the foregoing range. Meanwhile, to maintain the volume resistivity R1 of the matrix within the foregoing range, the MRC desirably contains no electronic conductive agent such as carbon black.

Method for Measuring Volume Resistivity of Matrix

The volume resistivity R1 of the matrix can be measured by slicing the conductive layer 53 and measuring the slice using a micro-probe. The conductive layer 53 is sliced using a device that can fabricate an extremely thin sample, such as a microtome. A specific procedure will be described below.

Now, the volume resistivity R2 of the domains is desirably smaller than the volume resistivity R1 of the matrix. This facilitates limiting the charge transport paths to those through the plurality of domains while preventing unintended movement of charges in the matrix.

The volume resistivity R1 is desirably $1.0\times10^{5}$ times or more of the volume resistivity R2. R1 is more desirably $1.0\times10^{5}$ times to $1.0\times10^{18}$ times of R2, even more desirably $1.0\times10^{6}$ times to $1.0\times10^{17}$ times, still more desirably $8.0\times10^{6}$ times to $1.0\times10^{16}$ times.

R2 is desirably $1.00\times10^{1}$ Ω·cm or more and $1.00\times10^{4}$ Ω·cm or less, more desirably $1.00\times10^{1}$ Ω·cm or more and $1.00\times10^{2}$ Ω·cm or less.

With the foregoing ranges satisfied, the charge transport paths within the conductive layer 53 can be controlled for easier micro-discharging. This facilitates reducing white dot-like image defects even if a small amount of external additives gets into between the conductive member and the photosensitive drum.

The volume resistivity R2 of the domains can be adjusted by setting the conductivity of the domains to a predetermined value, for example, by changing the type and amount of the electronic conductive agent to be added to the rubber component of the domains.

A rubber composition containing the rubber component for the matrix can be used as the rubber material for the domains. To form the matrix-domain structure, the difference in the SP (SP value) from the rubber material constituting the matrix is desirably controlled within a certain range. More specifically, the absolute value of the difference between the SP value of the first rubber and the SP value of the second rubber is desirably 0.4 $(J/cm^3)^{0.5}$ or more and 5.0 $(J/cm^3)^{0.5}$ or less, more desirably 0.4 $(J/cm^3)^{0.5}$ or more and 2.2 $(J/cm^3)^{0.5}$ or less.

The volume resistivity R2 of the domains can be adjusted by appropriately selecting the type and amount of the electronic conductive agent added. For the electronic conductive agent used to control the volume resistivity R2 of the domains to $1.00\times10^{1}$ Ω·cm or more and $1.00\times10^{4}$ Ω·cm or less, electronic conductive agents that can change the volume resistivity widely from high resistance to low resistance depending on the amount of dispersion are desirable.

Examples of the electronic conductive agents to be blended into the domains may include carbon black, graphite, oxides such as titanium oxide and tin oxide, metals such as Cu and Ag, and particles made conductive by surface coating with oxides or metals. Where appropriate, two or more types of such conductive agents may be blended and used in appropriate amounts.

Of the foregoing electronic conductive agents, conductive carbon black, which has high affinity with rubber and enables easy control of the distance between the electronic conductive agents, is desirably used. The type of the carbon black to be blended into the domains is not limited in particular. Specific examples may include gas furnace black, oil furnace black, thermal black, lamp black, acetylene black, and Ketjen black.

Of these, conductive carbon black that can give high conductivity to the domains and has a dibutyl phthalate (DBP) absorption of 40 $cm^3$/100 g or more and 170 $cm^3$/100 g or less can be suitably used.

The content of the electronic conductive agent such as conductive carbon black is desirably 20 parts by mass or more and 150 parts by mass or less with respect to 100 parts by mass of the second rubber in the domains. The content is more desirably 50 parts by mass or more and 100 parts by mass or less.

A large amount of conductive agent is desirably blended as compared to typical conductive members used in electrophotography. The volume resistivity R2 of the domains can thereby be easily controlled within the range of $1.00\times10^{1}$ Ω·cm or more and $1.00\times10^{4}$ Ω·cm or less.

Fillers, processing aids, crosslinking agents, crosslinking accelerators, antioxidants, crosslinking accelerator aids, crosslinking retarders, plasticizers, dispersants, and coloring agents commonly used as rubber compounding ingredients may be added to the rubber composition for the domains as far as the effects of the present disclosure are not hindered.

The volume resistivity R2 of the domains can be adjusted by adjusting the amount of the electronic conductive agent in the CMB. Take, for example, the case of using conductive carbon black with a DBP absorption of 40 $cm^3$/100 g or more and 170 $cm^3$/100 g or less as the electronic conductive agent. The volume resistivity R2 in the desired range can be achieved by preparing the CMB to contain 40 parts by mass or more and 200 parts by mass or less of conductive carbon black with respect to 100 parts by mass of the second rubber in the CMB.

Method for Measuring Volume Resistivity of Domains

The volume resistivity R2 of the domains can be measured by a similar method as the method for measuring the volume resistivity R1 of the matrix except that the measurement location is changed to a position corresponding to a domain and the voltage applied in measuring the current value is changed to 1 V. A specific procedure will be described below.

<Domain Shape>

Suppose that the longitudinal length of the conductive layer of the conductive roller is L, and the thickness of the conductive layer is T. As illustrated in FIG. 3B, cross sections of the conductive layer in the thickness direction are obtained at three positions that are the longitudinal center of the conductive layer and positions L/4 from both ends of the conductive layer to the center. Each of the cross sections of the conductive layer in the thickness direction desirably satisfy the following conditions.

In each of the cross sections, 15-μm-square observation regions are set at three locations arbitrarily selected within a thickness range of 0.1T to 0.9T in depth from the outer surface of the conductive layer. In each of the total of nine observation regions, 80% by number or more of the domains observed desirably satisfy the following constituent elements (iv) and (v):

- Constituent element (iv): the ratio μr of the cross-sectional area of the electronic conductive agent included in the domain to the cross-sectional area of the domain is 20% or more; and
- Constituent element (v): A/B is 1.00 or more and 1.10 or less, where A is the perimeter length of the domain, and B is the envelope perimeter length of the domain.

The foregoing constituent elements (iv) and (v) can be said to be provisions related to the domain shape. The "domain shape" is defined as the cross-sectional shape of the domain appearing on the cross section of the conductive layer in the thickness direction.

The domain shape is desirably one without protrusions or recesses on the perimeter, i.e., a shape close to a circle. The inventors contemplate that if the domain shape is without protrusions or recesses and close to a circle, the distribution of domain-to-domain distances can be evened out to reduce locations where domain-to-domain distances are nonuniform. As a result, the interfaces between the domains and the matrix are uniformly arranged over the surface of the conductive roller. Since locations that can shear agglomerates are evenly distributed, the effect of transferring agglomerates on the toner particle surfaces to the drum surface can be suitably developed. Moreover, the number of structures uneven in shape can be reduced to reduce the nonuniformity of the electric field between domains. In other words, spots where the electric field concentrates can be reduced to reduce the phenomenon of excessive charge transport in the matrix.

The inventors have found that the amount of the electronic conductive agent included in a domain affects the outer shape of the domain. More specifically, the inventors have found that the greater the amount of the electronic conductive agent loaded into a domain, the closer the outer shape of the domain is to a circle. The greater the number of domains close to circles, the fewer the points of concentration of electron exchange between domains can be made. Moreover, the domains on the outer surface of the conductive layer can be made closer to circles in shape. The domain shapes closer to circles make the wall-to-wall distances between adjacent domains uniform. This can improve the uniformity of the peak pressure to the agglomerates on the toner particle surfaces within the plane, and improve the efficiency of transfer of the agglomerates from the toner particle surfaces. As a result, the effects of the present exemplary embodiment can be maintained even in the event of some contamination on the surface of the conductive member.

The inventors' study shows that a domain where the ratio μr of the total cross-sectional area of the electronic conductive agent observed in the cross section of the domain with respect to the area of the cross section is 20% or more can take on a shape closer to a circle. Specifically, the ratio μr of the cross-sectional area of the electronic conductive agent in the domain to the cross-sectional area of the domain is desirably 20% or more. The ratio μr is more desirably 25% or more and 30% or less.

With the ratio μr in the foregoing range, a sufficient peak pressure can be applied to the agglomerates on the toner particle surfaces even if the time of contact between the surface of the conductive member and the toner is short due to high-speed processes.

As for the smooth peripheral shape of the domain, the inventors have found that the following inequality (5) is desirably satisfied:

$$1.00 \leq A/B \leq 1.10, \ldots \text{ inequality} \tag{5}$$

where A is the perimeter length of a domain, and B is the envelope perimeter length of the domain.

Figure 6:
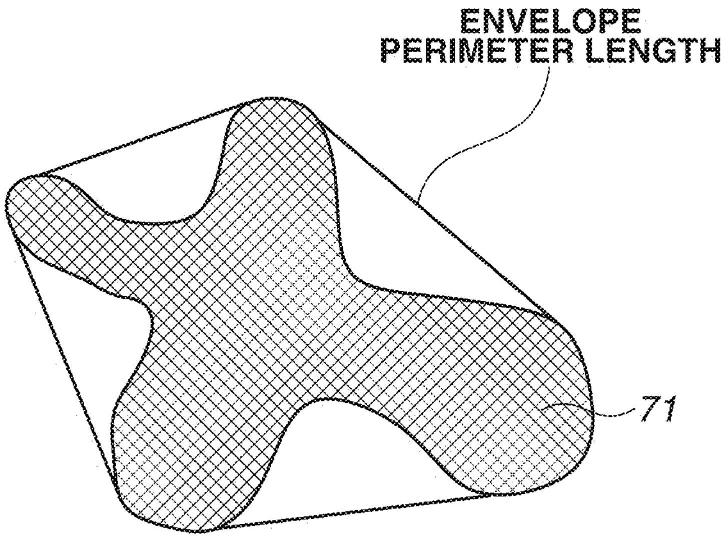
FIG. 6 is an explanatory diagram for describing the envelope perimeter length of a domain.

Inequality (5) expresses the ratio of the perimeter length A of a domain to the envelope perimeter length B of the domain. As employed herein, the envelope perimeter length refers to, as illustrated in FIG. 6, the perimeter length when the protrusions of a domain 71 observed in an observation region are connected.

The minimum value of the ratio of the perimeter length of the domain to the envelope perimeter length of the domain is 1. The ratio of 1 indicates that the domain has a cross-sectional shape without any recess, such as a perfect circle and an ellipse. The ratio of 1.1 or less indicates that the domain does not have large protrusions or recesses. In such a case, a uniform peak pressure can be applied to the agglomerates on the toner particle surfaces, and the field anisotropy is less likely to develop in the conductive layer.

<Method for Measuring Parameters Related to Domain Shape>

Cut out ultrathin sections with a thickness of 1 μm from the conductive layer of the conductive roller at a cutting temperature of −100° C. using a microtome (product name: Leica EM FCS, manufactured by Leica Microsystems). As will be described below, the sections are desirably formed along a cross section perpendicular to the longitudinal direction of the conductive roller so that the domain shapes in the ruptured surfaces of the sections are evaluated.

The reason will now be described.

FIGS. 3A and 3B are diagrams illustrating the shape of a conductive roller 81 three-dimensionally with three axes, or specifically, X-, Y-, and Z-axes. In FIGS. 3A and 3B, the X-axis represents a direction parallel to the longitudinal direction (axial direction) of the conductive roller 81. The Y- and Z-axes represent directions perpendicular to the axial direction of the conductive roller 81.

FIG. 3A is a conceptual diagram illustrating the cutting of the conductive roller 81 along a section 82*a* parallel to an XZ plane 82. The XZ plane can be rotated 360° about the axis of the conductive roller 81. The conductive roller 81 rotates in contact with the photosensitive drum and a discharge occurs at the contact portion of between the conductive roller 81 and the photosensitive drum, the cross section 82*a* parallel to the XZ plane 82 represents a plane where discharges occur simultaneously at a certain timing. The surface potential of the photosensitive drum is formed by a surface corresponding to a specific amount of section 82*a* passes.

To evaluate the domain shape, which correlates with the electric field concentration inside the conductive roller, it is therefore desirable to not analyze a section where discharges occur simultaneously at a moment like the section 82*a*, but evaluate a cross section parallel to a YZ plane 83 perpendicular to the axial direction of the conductive roller 81 where the domain shape including a certain amount of section 82*a* can be evaluated.

For this evaluation, select a total of three positions including a cross section 83*b* at the longitudinal center of the conductive layer and two cross sections (83*a* and 83*c*) L/4 from both ends of the conductive layer to the center, where L is the longitudinal length of the conductive layer.

Observation positions on the cross sections 83*a* to 83*c* will be described. Set 15-μm-square observation regions at three locations arbitrarily selected within a thickness range of 0.1T or more and 0.9T or less in depth from the outer surface of each section, where T is the thickness of the conductive layer. Measurement is performed on the total of nine observation regions. Evaporate platinum on the sections to obtain evaporated sections. Next, capture images of the surfaces of the evaporated sections at a magnification of 1000 times or 5000 times under an SEM (product name: S-4800, manufactured by Hitachi High-Tech Corporation) to obtain observation images.

Next, to quantify the domain shapes in the observation images, render the analysis images in an 8-bit grayscale to obtain 256-level monochrome images, using image processing software (product name: Image-Pro Plus, manufactured by Media Cybernetics, Inc.). Next, invert the black and white of the monochrome images so that domains in the fracture surfaces appear white, thereby obtaining binarized images.

(Method for Measuring Cross-Sectional Area Ratio μr of Electronic Conductive Agent in Domains)

The cross-sectional area ratio of the electronic conductive agent in the domains can be measured by quantifying the binarized images of the foregoing observation images captured at a magnification of 5000 times.

Render the observation images in an 8-bit grayscale to obtain 256-level monochrome images, using the image processing software (product name: Image-Pro Plus, manufactured by Media Cybernetics, Inc). Binarize the resulting observation images so that carbon black particles can be distinguished, thereby obtaining binarized images. Using a counting function on the resulting images, calculate the sectional areas S of the domains in the analysis images and the total sectional areas Sc of the carbon black particles serving as the electronic conductive agent included in the domains.

Calculate an arithmetic mean μr of Sc/S at the foregoing nine locations as the cross-sectional area ratio of the electronic conductive agent in the domains.

The cross-sectional area ratio μr of the electronic conductive agent affects the uniformity of the volume resistivity R2 of the domains. Along with the measurement of the cross-sectional area ratio μr, the uniformity of the volume resistivity R2 of the domains can be measured in the following manner.

Using the foregoing measurement method, calculate σr/μr as a uniformity index of the volume resistivity R2 of the domains from μr and the standard deviation σr of μr.

(Method for Measuring Perimeter Length A and Envelope Perimeter Length B of Domains)

Using the counting function of the image processing software, calculate the following items from a group of domains in the binarized images of the foregoing observation images captured at a magnification of 1000 times:

Perimeter length A (μm)

Envelope perimeter length B (μm)

Determine the ratios A/B related to the foregoing inequality (5) from the values. Employ the arithmetic mean of the evaluation images at the nine locations.

(Method for Measuring Domain Shape Index)

For a domain shape index, the percent by number of domains where μr (% by area) is 20% or more and the perimeter length ratio A/B satisfies the foregoing inequality (5) can be calculated with respect to the total number of domains. The domain shape index is desirably 80% by number to 100% by number.

Using the counting function of the image processing software (product name: Image-Pro Plus, manufactured by Media Cybernetics, Inc), calculate the numbers of domains in the foregoing binarized images. Then determine the percent by number of domains that satisfy μr>20 and the foregoing inequality (5).

As defined in constituent element (iv), the outer shapes of the domains can be brought close to spheres by filling the domains with the electronic conductive agent at high density. As defined in constituent element (v), the domains can thereby be made smoother.

To obtain domains filled with the electronic conductive agent at high density as defined in constituent element (iv), the electronic conductive agent desirably includes carbon black with a DBP absorption of 40 $cm^3$/100 g or more and 80 $cm^3$/100 g or less.

The DBP absorption ($cm^3$/100 g) refers to the volume of DBP that 100 g of carbon black can absorb. The DBP absorption can be measured according to JIS K 6217-4:2017 (Carbon black for rubber industry—Fundamental characteristics—Part 4: Determination of oil absorption number [OAN] and oil absorption number of compressed sample [COAN]).

In general, carbon black has a higher-order structure in the form of clusters, where primary particles with an average diameter of 10 nm or more and 50 nm or less are aggregated. This cluster-like higher-order structure is called "structure", and its degree is quantified by the DBP absorption ($cm^3$/100 g).

Conductive carbon black with a DBP absorption within the foregoing range has an underdeveloped structure, resulting in less aggregation of carbon black and favorable dispersibility in rubber. Such conductive carbon black can be filled into the domains by large amounts. As a result, domains with outer shapes closer to a sphere are likely to be obtained.

Since conductive carbon black with a DBP absorption within the foregoing range is less likely to form aggregates, domains satisfying constituent element (v) can be easily formed.

<Domain Diameter D>

The arithmetic mean of the circular equivalent diameters D of the domains (hereinafter, also referred to simply as "domain diameters D") observed in the cross sections of the conductive layer is desirably 0.10 μm or more and 5.00 μm or less. Within this range, the domains at the outermost surface have a size similar to or smaller than that of the toner particles. Suitable peak pressure can thus be applied to the agglomerates on the toner particle surfaces. This also enables discharges finer than the toner size, and can thus achieve high-resolution discharges for homogenous images.

If the average of the domain diameters D is 0.10 μm or more, the effect of applying peak pressure to the agglomerates on the toner surfaces arises, and the charge transport paths within the conductive layer can be more effectively limited to intended ones. The average is desirably 0.15 μm or more, and more desirably 0.20 μm or more.

If the average of the domain diameters D is 5.00 μm or less, the domains smaller than the toner size dramatically increase the opportunity for the borders between the domains and the matrix to contact agglomerates, and can thus apply sufficient peak pressure to the agglomerates on the toner particle surfaces. This also exponentially increases the ratio of the surface areas of the domains to the total volume of the domains, i.e., the specific surface area of the domains, whereby the efficiency of charge emission from the domains can be dramatically improved. For such a reason, the average of the domain diameters D is more desirably 2.00 μm or less, even more desirably 1.00 μm or less.

A method for controlling the domain diameter D will be described. Concerning constituent element (vi), the MRC and CMB are kneaded to cause a phase separation between the MRC and CMB, for example. In the process of preparing a rubber mixture where CMB domains are formed in the MRC matrix, the domain diameter of the CMB is controlled to be small.

Reducing the domain diameter of the CMB increases the specific surface area of the CMB and increases the interfaces with the matrix, and force to reduce the interfacial tension acts on the interfaces of the CMB domains. This brings the outer shapes of the CMB domains closer to a sphere.

Regarding the factors that determine the domain diameter D in the matrix-domain structure formed when two incompatible polymers are melted and kneaded, Taylor's equation (Eq. (6)), Wu's empirical formulas (inequalities (7) and (8)), and Tokita's equation (Eq. (9)) are known:

Taylor's equation $$D=[C\cdot\sigma/\eta m\cdot\gamma]\cdot f(\eta m/\eta d), \qquad \text{Eq. (6)}$$

Wu's empirical formulas $$\gamma\cdot D\cdot\eta m/\sigma=4(\eta d/\eta m)^{0.84}\ (\text{at } \eta d/\eta m>1),\ \ldots\ \text{inequality} \qquad (7)$$

$$\gamma\cdot D\cdot\eta m/\sigma=4(\eta d/\eta m)^{-0.84}\ (\text{at } \eta d/\eta m\leqq 1),\ \text{and}\ \ldots\ \text{inequality} \qquad (8)$$

Tokita's equation $$D=12\cdot P\cdot\sigma\cdot\varphi/(\pi\cdot\eta\cdot\gamma)\cdot(1+4\cdot P\cdot\varphi\cdot EDK/(\pi\cdot\eta\cdot\gamma)). \qquad \text{Eq. (9)}$$

In equations and inequalities (6) to (9), D is the maximum Feret diameter of the CMB domains, C is a constant, σ is the interfacial tension, ηm is the viscosity of the matrix, ηd is the viscosity of the domains, γ is the shear rate, η is the viscosity of the mixed system, P is the probability of collision and coalescence, φ is the volume of the domain phase, and EDK is the rupture energy of the domain phase.

Concerning constituent element (iii), to uniformize the domain-to-domain distances, it is effective to reduce the domain diameter D according to equations and inequalities (6) to (9). In the process of kneading the MRC and CMB, the base rubber of the domains splits and decreases gradually in particle size. The domain-to-domain distances also vary depending on when the kneading process is stopped.

The uniformity of the domain-to-domain distances can therefore be controlled by the kneading time in the kneading process and the number of kneading rotations that is an index of the kneading strength. The longer the kneading time and the higher the number of kneading rotations, the more the uniformity of the domain-to-domain distances can be improved.

Uniformity of Domain Diameter D

The domain diameter D is desirably uniform, or equivalently, the particle size distribution is desirably narrow. Uniformizing the distribution of domain diameters D where charges pass in the conductive layer can reduce charge concentration inside the matrix-domain structure and effectively facilitate discharges over the entire surface of the conductive roller.

Suppose that in a cross section where charges are transported, i.e., a cross section in the thickness direction of the conductive layer such as illustrated in FIG. 3B, 50-μm-square observation regions are obtained at three locations arbitrarily selected within a thickness range of 0.1T to 0.9T in depth from the outer surface of the conductive layer toward the support. The ratio σd/D (coefficient of variation σd/D) of the standard deviation σd of the domain diameters to the arithmetic mean D of the domain diameters is desirably 0 or more and 0.40 or less, more desirably 0.10 or more and 0.30 or less.

Like the foregoing technique for improving the uniformity of the domain-to-domain distance, the uniformity of the domain diameter D is also improved by reducing the domain diameter D according to equations and inequalities (6) to (9). The uniformity of the domain diameter D also varies depending on when the process of kneading the MRC and CMB is stopped during the process where the base rubber of the domains splits and decreases gradually in particle diameter.

The uniformity of the domain diameter D can thus be controlled by the kneading time in the kneading process and the number of kneading rotations serving as the index of the kneading strength. The longer the kneading time and the higher the number of kneading rotations, the more the uniformity of the domain diameter can be improved.

Method for Measuring Uniformity of Domain Diameter

The uniformity of the domain diameter D can be measured by quantifying images obtained through direct observation of fracture surfaces obtained by a method similar to the foregoing method for measuring the uniformity of distances between domains. A specific method will be described below.

[Toner]

Now, components constituting toner and a method for manufacturing the toner will be described.

The toner according to the present disclosure includes at least toner particles, with agglomerates containing silica fine particles and binding components on the surfaces of the toner particles. CI is 1% by number or more and 15% by number or less, where CI (% by number) is the ratio by number of toner particles with the agglomerates. CI, Ca, and Ca satisfy the following inequalities (1) and (2):

$$0.90 \leq Ca/CI \leq 1.00, \text{ and } \ldots \text{ inequality} \quad (1)$$

$$0.01 \leq Cb/CI \leq 0.10, \ldots \text{ inequality} \quad (2)$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

Ultrasonic condition A: an output frequency of 30 kHz, an output power of 0.75 W, and an irradiation time of 300 s, and Ultrasonic condition B: an output frequency of 30 kHz, an output power of 35 W, and an irradiation time of 300 s.

A relationship of Dms<Ag is satisfied, where Dms is the arithmetic mean of distances between adjacent domains at the outer surface of the conductive roller, and Ag is the arithmetic mean of the Feret diameters of the agglomerates.

<Agglomerates and Toner Particles>

Figure 7:
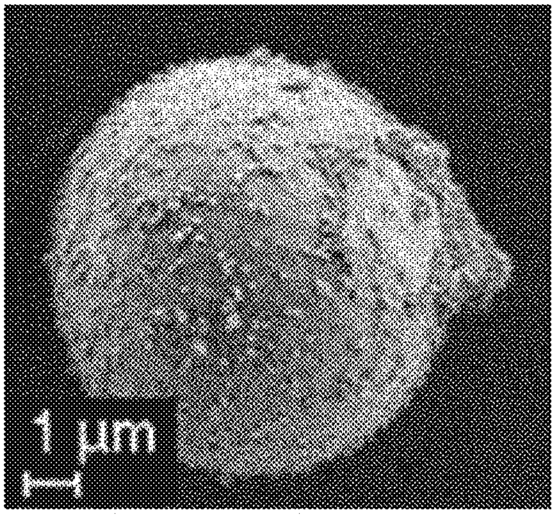
FIG. 7 is a representative image of a toner particle with an agglomerate.

FIG. 7 is a representative image of a toner particle with an agglomerate on its surface.

Specific examples of agglomerates containing silica fine particles and binding components include ones containing particles consisting mainly of silica and binding components that can bind the particles.

Examples of the particles consisting mainly of silica may include dry silica fine particles that are generated by vapor phase oxidation of silicon halides and referred to as dry-method or fumed silica, and wet silica fine particles (hereinafter, also referred to as colloidal silica) that are manufactured from water glass. Such particles may be subjected to hydrophobic treatment. Examples of treatment agents used for the hydrophobic treatment include silicone varnish, various modified silicone varnishes, silicone oil, various modified silicone oils, silane compounds, silane coupling agents, other organosilicon compounds, and organotitanium compounds. Such treatment agents may be used alone or in combination of two or more.

Primary particles of the silica fine particles desirably have a number average particle diameter of 10 nm or more and 200 nm or less (more desirably 15 nm or more and 150 nm or less). The number average particle diameter of the primary particles of the silica fine particles can be determined using enlarged pictures of toner particles captured by an SEM.

For the binder components that can bind the particles consisting mainly of silica, ones that can fasten the particles with appropriate strength and do not cause adverse effects even under mechanical stress or environment changes in temperature or humidity during the development process is desirable. Examples of such a material include organic resins. In particular, vinyl resins and polyester resins can be suitably used. These resins can hold the particles consisting mainly of silica with appropriate fastening strength and continuously supply particles consisting mainly of silica into the development process as the toner is used. While the binding components themselves are also supplied into the developing process, parts contamination and changes in the developing properties can be reduced by appropriately selecting the hardness of the binder components and their responsiveness to environmental changes in temperature and humidity. Specific materials will be described in the manufacturing method section to be described below.

The toner according to the present exemplary embodiment desirably has CI of 1% by number or more and 15% by number or less, where CI (% by number) is the ratio by number of toner particles with the agglomerates. If CI is too low, the number of agglomerates included is so small that the effects of the present disclosure are not obtained. If CI is too high, the number of agglomerates included is so large that a large amount of agglomerates remains on the conductive member at the nip portion between the conductive roller and the photosensitive member, and the contamination of the conductive member deteriorates.

CI is desirably 2% by number or more and 14% by number or less, more desirable 3% by number or more and 12% by number or less. CI can be controlled by adjusting manufacturing conditions such as the number of material batches, the types of materials, and agitation conditions.

In the toner according to the present exemplary embodiment, CI, Ca, and Cb further desirably satisfy inequalities (1) and (2):

$$0.90 \leq Ca/CI \leq 1.00, \text{ and } \ldots \text{ inequality} \quad (1)$$

$$0.01 \leq Cb/CI \leq 0.10, \ldots \text{ inequality} \quad (2)$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

Ultrasonic condition A: an output frequency of 30 kHz, an output power of 0.75 W, and an irradiation time of 300 s, and Ultrasonic condition B: an output frequency of 30 kHz, an output power of 35 W, and an irradiation time of 300 s.

In other words, the range of Ca/CI is desirably 0.90 or more and 1.00 or less. Ca/CI below 0.90 means that agglomerates can transfer even under low shear. Since agglomerates are more likely to be constantly supplied to the blocking layer, the effect will not last long, resulting in easy contamination of the conductive member. A desirable range of Ca/CI is 0.95 or more and 1.00 or less. Ca/CI can be controlled by adjusting the material types of the silica fine particles and the binding components, and the mixing ratios thereof.

The range of Cb/CI is desirably 0.01 or more and 0.10 or less. Cb/CI above 0.10 means that agglomerates are difficult to transfer even under high shear, and the effects of the present disclosure are difficult to obtain. A desirable range of Cb/CI is 0.01 or more and 0.08 or less. Cb/CI can be controlled by adjusting the material types of the silica fine particles and the binding components, and the mixing ratios thereof.

The arithmetic mean Ag of the Feret diameters of the agglomerates is desirably 1000 nm or more and 8000 nm or less. The agglomerates in the foregoing range are large enough to span across the domains and the matrix at the nip portion between the conductive member and the photosensitive member. The arithmetic mean Ag is more desirably 1300 nm or more and 7500 nm or less, even more desirably 1500 nm or more and 7000 nm or less. The arithmetic mean Ag of the Feret diameters of the agglomerates can be controlled by adjusting manufacturing conditions such as the particle diameter of the silica fine particles used, the number of material batches, the mixing ratios of the silica fine particles and the binding components, and the agitation conditions.

When the surface of a toner particle with such agglomerates is observed under an SEM, the area ratio of the binding components of the agglomerates to the entire agglomerates is desirably 5% or more and 50% or less. As described above, if the agglomerates contain an appropriate amount of binding components, the transferability of the agglomerates is appropriately controlled to provide the effects of the present disclosure at a high level. If the area ratio is lower than the foregoing range, the agglomerates are likely to transfer and contaminate the conductive member, and the effects are difficult to obtain throughout a long lifespan. If the area ratio is higher than the foregoing range, the agglomerates are less likely to transfer and the effect of improving poor cleaning is difficult to obtain. The area ratio of the binding components on the agglomerates can be controlled by adjusting manufacturing conditions such as the mixing ratios of the silica fine particles and the binding components and the agitation conditions.

The toner particles with the agglomerates desirably include toner particles with agglomerates satisfying the following condition (a) as much as or more than 50% by number:

(a) the number A of straight lines including a segment with a continuous dark portion of 100 nm or more in length is 12 or more among a total of 18 straight lines that are drawn to pass through a reference point at intervals of 10° in a binarized image of a backscattered electron image of the agglomerate captured using a SEM, with the center of the captured image of the agglomerate as the reference point.

Satisfying the foregoing condition (a) means that the binding components are included in the agglomerate in a uniformly distributed manner. The effects of the present disclosure can thus be obtained easily since the transfer of the agglomerates is less likely to be uneven. The toner particles with the agglomerates satisfying the foregoing condition (a) are desirably included as much as or more than 60% by number, more desirably as much as or more than 80% by number.

The number of toner particles with the agglomerates satisfying the foregoing condition (a) can be controlled by adjusting manufacturing conditions such as the mixing ratios of silica and binding components and the dispersion conditions of the silica and the biding components used.

The toner particles contain a binding resin. The content of the binding resin is desirably 50% by mass or more with respect to the total amount of resin components in the toner particles.

The binding resin is not limited in particular. Examples may include styrene-acrylic resins, epoxy resins, polyester resins, polyurethane resins, polyamide resins, cellulose resins, polyether resins, mixtures of these resins, and composite resins of these. Styrene-acrylic resins and polyester resins are desirable because of their low cost, high availability, and excellent low-temperature fixability.

Examples of the styrene-acrylic resins include polymers composed of monofunctional polymerizable monomers or multifunctional polymerizable monomers to be described below, copolymers obtained by combining two or more of these, and mixtures of these.

Examples of the monofunctional polymerizable monomers may include the following: styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl butyrate, vinyl benzoate, and vinyl formate; vinyl ethers such as vinyl methyl ether, vinyl ethyl ether, and vinyl isobutyl ether; and vinyl ketones such as vinyl methyl ketone, vinyl hexyl ketone, and vinyl isopropyl ketone.

Examples of the multifunctional polymerizable monomers may include the following: diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxy diethoxy)phenyl) propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy diethoxy)phenyl) propane, 2,2'-bis(4-(methacryloxy polyethoxy)phenyl) propane, trimethylolpropane trimethacrylate, tetramethylolmethane tetramethacrylate, divinylbenzene, divinylnaphthalene, and divinyl ether.

As for polyester resins, ones obtained by polycondensation of the carboxylic acid components and alcohol components listed below can be used. The carboxylic acid components include terephthalic acid, isophthalic acid, phthalic acid, fumaric acid, maleic acid, cyclohexanedicarboxylic acid, and trimellitic acid. The alcohol components include bisphenol A, hydrogenated bisphenol, ethylene oxide adducts of bisphenol A, propylene oxide adducts of bisphenol A, glycerin, trimethylolpropane, and pentaerythritol.

The polyester resins may be ones containing urethane groups. The carboxyl groups of the polyester resins, such as those at the terminal ends, are desirably not capped.

The toner particles may contain coloring agents. Conventional pigments and dyes can be used as the coloring agents. Pigments are desirable as the coloring agents because of their excellent weather resistance.

Cyan coloring agents include copper phthalocyanine compounds and their derivatives, anthraquinone compounds, and basic dye lake compounds.

Specific examples include Colour Index (C.I.) Pigment Blue 1, 7, 15, 15:1, 15:2, 15:3, 15:4, 60, 62, and 66.

Magenta coloring agents include condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples include C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C.I. Pigment Violet 19.

Yellow coloring agents include condensed azo compounds, isoindolinone compounds, anthraquinone compounds, azo metal complexes, methine compounds, and arylamide compounds.

Specific examples include C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191 and 194.

Black coloring agents include carbon black, and ones formulated into black using the foregoing yellow, magenta, and cyan coloring agents.

These coloring agents can be used alone, or as a mixture, or in the form of a solid solution.

With respect to 100.0 parts by mass of the binding resin, 1.0 parts by mass or more and 20.0 parts by mass or less of the coloring agents are desirably used.

The toner may be magnetic toner containing magnetic materials. In such a case, the magnetic materials may also serve as coloring agents.

Examples of the magnetic materials include: iron oxides typified by magnetite, hematite, and ferrite; metals typified by iron, cobalt, and nickel; and alloys and mixtures of these metals with metals such as aluminum, cobalt, copper, lead, magnesium, tin, zinc, antimony, beryllium, bismuth, cadmium, calcium, manganese, selenium, titanium, tungsten, and vanadium.

The toner particles may contain a release agent. Conventional waxes may be used as the release agent without any particular restrictions.

Specific examples include the following: petroleum-based waxes typified by paraffin wax, microcrystalline wax, and petrolatum, and their derivatives; montan wax and its derivatives; hydrocarbon waxes produced by the Fischer-Tropsch method and their derivatives; polyolefin waxes typified by polyethylene and their derivatives; and natural waxes typified by carnauba wax and candelilla wax, and their derivatives.

The derivatives may include oxides, block copolymers with vinyl monomers, and graft-modified products.

Other examples include: alcohols such as higher aliphatic alcohols; fatty acids like stearic acid and palmitic acid, and their acid amides, esters, ketones; and hardened castor oil and its derivatives, vegetable waxes, animal waxes. These materials can be used alone or in combination.

Of those, polyolefin waxes, hydrocarbon waxes produced by the Fischer-Tropsch method, and petroleum-based waxes are desirably used since the developability and transferability tend to improve.

Antioxidants may be added to the waxes as far as the foregoing effects are not affected.

The content of the release agent is desirably 1.0 parts by mass or more and 30.0 parts by mass or less with respect to 100.0 parts by mass of the binding resin or the polymerizable monomers constituting the binding resin.

The melting point of the release agent is desirably 30° C. or higher and 120° C. or lower, more desirably 60° or higher and 100° C. or lower.

The use of the release agent having the foregoing thermal property enables efficient development of the releasing effect for an even wider fixing region.

Where appropriate, various types of organic or inorganic fine powders may be added to the toner particles as external additives, as far as the effects of the present exemplary embodiment are not impaired. The organic or inorganic fine powders desirably have a particle diameter 1/10 or less of the weight average particle diameter of the toner particles in view of durability when added to the toner particles.

Examples of the organic or inorganic fine powders may include the following:

(1) Fluidizing agents: Silica, alumina, titanium oxide, carbon black, and fluorinated carbon;

(2) Abrasives: Metal oxides (e.g., strontium titanate, cerium oxide, alumina, magnesium oxide, and chromium oxide), nitrides (e.g., silicon nitride), carbides (e.g., silicon carbide), and metal salts (e.g., calcium sulfate, barium sulfate, and calcium carbonate);

(3) Lubricants: Fluororesin powders (e.g., vinylidene fluoride and polytetrafluoroethylene), and metal fatty acid salts (e.g., zinc stearate and calcium stearate); and (4) Charge control particles: Metal oxides (e.g., tin oxide, titanium oxide, zinc oxide, silica, and alumina), carbon black, and hydrotalcite.

The organic or inorganic fine powders may be subjected to hydrophobic treatment at the surface for improved toner fluidity and uniform charging of the toner particles. Examples of treatment agents for the hydrophobic treatment of the organic or inorganic fine powders may include unmodified silicone varnish, various modified silicone varnishes, unmodified silicone oil, various modified silicone oils, silane compounds, silane coupling agents, other organosilicon compounds, and organotitanium compounds. Such treatment agents may be used alone or in combination.

Of these, hydrotalcite, which is a layered composite compound, is desirably included as an external additive. Containing hydrotalcite having chargeability of opposite polarity to that of silica, which is the main component constituting the agglomerates, improves the toner chargeability, or specifically, charge build-up characteristics under high-temperature and high-humidity conditions that are severe against the charge build-up characteristics. The hydrotalcite is more desirably treated with fluorine. The reason is that including fluorine, which has a high electronegativity, into the hydrotalcite further promotes the exchange of electric charges, resulting in an even higher effect.

[Method for Manufacturing Toner]

An example of a method for obtaining the foregoing toner particles will now be described. Note that the method is not limited to the following.

The manufacturing method of the toner particles is not limited in particular, and a suspension polymerization technique, solution suspension technique, emulsion coagulation technique, or pulverization technique can be used. A method for obtaining the toner particles using the emulsion coagulation technique will be described as an example.

<Method for Manufacturing Toner Particles (Toner Core Particles) Using Emulsion Coagulation Technique>

(Process of Preparing Fine Resin Particle Dispersion)

A fine resin particle dispersion can be prepared by conventional methods. However, such techniques are not restrictive. Examples may include emulsion polymerization, self-emulsification, phase inversion emulsification where resin dissolved in an organic solvent is emulsified by gradually adding an aqueous medium to the resin solution, and forced emulsification where resin is forcibly emulsified by high-temperature treatment in an aqueous medium without using organic solvents.

A method for preparing the fine resin particle dispersion using the phasing inversion emulsification will now be described as an example.

Dissolve resin components in an organic solvent in which the resin components dissolve, and add surfactants and basic compounds. If the resin components are a crystalline resin having a melting point, dissolve the resin components by heating to or above the melting point. Next, stir the solution using a homogenizer while an aqueous medium is slowly added to precipitate fine resin particles. Remove the solvent by heating or depressurization, whereby an aqueous dispersion of fine reins particles is formed.

The organic solvent used to dissolve the resin components may be any organic solvent that can dissolve these components. Specific examples include toluene and xylene.

Examples of the surfactants used in the preparation process include: anionic surfactants such as sulfuric acid ester salts, sulfonic acid salts, carboxylic acid salts, phosphoric acid esters, and soap-based surfactants; cationic surfactants such as amine salts and quaternary ammonium salts; and nonionic surfactants such as polyethylene glycol type, alkylphenol ethylene oxide adduct type, and polyhydric alcohol types.

Examples of the basic compounds used in the preparation process include: inorganic bases such as sodium hydroxide and potassium hydroxide; and organic bases such as ammonia, triethylamine, trimethylamine, dimethylaminoethanol, and diethylethanolamine. The basic compounds may be used alone or in combination of two or more types.

(Preparation of Coloring Agent Dispersion)

A coloring agent dispersion can be prepared using conventional dispersion methods. For example, common dispersion devices such as homogenizers, ball mills, colloid mills, and ultrasonic dispersers can be used without any particular restrictions. The foregoing surfactants can be used during dispersion.

(Preparation of Wax Dispersion)

A wax dispersion is prepared by dispersing wax in water with surfactants and basic compounds, and then heating the liquid to a temperature at or above the melting point of the wax along with dispersion treatment using a homogenizer or disperser that gives strong shear force. The wax dispersion is obtained through such a treatment. The foregoing surfactants can be used during dispersion. The foregoing basic compounds can be used during dispersion.

(Aggregated Particle Formation Process)

In an aggregated particle formation process, initially mix the fine resin particle dispersion, the colorant dispersion, and the wax dispersion to form a mixture. Next, heat the mixture at a temperature below the melting point of the fine resin particles while making the pH acidic for aggregation. This forms aggregated particles containing resin fine particles, colorant particles, and release agent particles, whereby an aggregated particle dispersion is obtained.

(First Fusion Process)

In a first fusion process, under stirring conditions similar to in the aggregated particle formation process, raise the pH of the aggregated particle dispersion to stop the progress of aggregation, and heat the aggregated particle dispersion to a temperature at or above the melting point of the resin components. A fused particle dispersion is thereby obtained.

(Amorphous Fine Resin Particle Adhesion Process)

In an amorphous fine resin particle adhesion process, add an amorphous resin particle dispersion to the fused particle dispersion, and lower the pH to adhere amorphous resin particles to the surfaces of the fused particles, whereby a resin-coated particle dispersion is obtained. The coating layer here corresponds to a shell layer that is formed through a shell layer formation process to be described below. The amorphous fine resin particle dispersion can be manufactured in a manner similar to the preparation process of the foregoing resin fine particle dispersion.

(Second Fusion Process)

In a second fusion process, like the first fusion process, raise the pH of the resin-coated particle dispersion to stop the progress of aggregation, and heat the resin-coated particle dispersion to a temperature at or above the melting point of the resin component. A toner core particle dispersion is thereby obtained in which toner core particles with a shell layer formed by fusing the resin-adhering aggregated particles are dispersed.

<Method for Manufacturing Toner Particles with Agglomerates>

A method for manufacturing toner particles with agglomerates containing silica fine particles and binding components desirably includes, from the viewpoint of uniform agglomeration of silica fine particles and binding components, externally adding the silica fine particles and binding components to the toner core particles using a wet process. In the case of obtaining toner particles with agglomerates containing silica fine particles and binding components using a wet process, the manufacturing method desirably includes the following processes 1 and 2:

(Process 1) Obtain a toner core particle dispersion where toner core particles are dispersed in an aqueous medium; and (Process 2) Mix silica fine particles and polymerizable monomers that become the binding resin components into the toner core particle dispersion, and polymerize the monomers in the toner core particle dispersion to form agglomerates containing silica fine particles and binding resin on the toner core particles.

Examples of the method for obtaining the toner core particle dispersion in process 1 may include simply using a toner core particle dispersion manufactured in an aqueous medium, and submitting dried toner core particles into an aqueous medium and mechanically dispersing the toner core particles. In the case of dispersing dried toner core particles in an aqueous medium, dispersing aids may be used.

Conventional dispersion stabilizers and surfactants can be used as the dispersing aids. Specific examples of the dispersion stabilizers may include the following: inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina; and organic dispersion stabilizers such as polyvinyl alcohol, gelatin, methyl cellulose, methyl hydroxypropyl cellulose, ethyl cellulose, sodium salt of carboxymethyl cellulose, and starch.

Examples of the surfactants may include the following: anionic surfactants such as alkyl sulfate ester salts, alkylbenzene sulfonate salts, and fatty acid salts; nonionic surfactants such as polyoxyethylene alkyl ethers and polyoxypropylene alkyl ethers; and cationic surfactants such as alkylamine salts and quaternary ammonium salts.

In process 1, the solid content concentration of the toner core particle dispersion is desirably adjusted to 10% by mass or more and 50% by mass or less.

In process 2, the silica fine particles and the monomers that become the binding components may be simply added to the toner core particle dispersion. A prepared dispersion of the silica fine particles and the monomers may be added to the toner core particle dispersion. As a technique for dispersing the silica fine particles and the monomers, the dispersion aids described in the section of process 1 can be used.

Examples of the binding components include polymers consisting of monofunctional polymerizable monomers or multifunctional polymerizable monomers, copolymers obtained by combining two or more of these, and mixtures thereof.

Examples of the polymerizable monomers may include the following: styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl butyrate, vinyl benzoate, and vinyl formate; vinyl ethers such as vinyl methyl ether, vinyl ethyl ether, and vinyl isobutyl ether; vinyl ketones such as vinyl methyl ketone, vinyl hexyl ketone, and vinyl isopropyl ketone; trifunctional silane compounds with methacryloxy alkyl groups as substituents, such as γ-methacryloxypropyltrimethoxysilane, γ-methacryloxypropyltriethoxysilane, γ-methacryloxyoctyltrimethoxysilane, γ-methacryloxypropyldiethoxymethoxysilane, and γ-methacryloxypropylethoxydimethoxysilane; and trifunctional silane compounds with acryloxy alkyl groups as substituents, such as γ-acryloxypropyltrimethoxysilane, γ-acryloxypropyltriethoxysilane, γ-acryloxyoctyltrimethoxysilane, γ-acryloxypropyldiethoxymethoxysilane, and γ-acryloxypropylethoxydimethoxysilane.

Of these, trifunctional silane compounds are desirably used from the viewpoint of high affinity with silica. Along with the trifunctional silane compounds, the following may be used: organosilicon compounds with four reactive groups in one molecule (tetrafunctional silanes), organosilicon compounds with two reactive groups in one molecule (difunctional silanes), or organosilicon compounds with one reactive group in one molecule (monofunctional silanes). Examples may include the following: dimethyldiethoxysilane, tetraethoxysilane, hexamethyldisilazane, 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, and trifunctional vinylsilanes such as vinyltriisocyanatesilane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxhydroxysilane, and vinyldiethoxyhydroxysilane.

In process 2, the silica fine particles and the monomers to be the binding components are added to and mixed with the toner core particle dispersion. Here, the temperature of the toner core particle dispersion is desirably adjusted to a temperature suitable for the polymerization reaction. The added monomers are then polymerized by adding a polymerization initiator while mixing the toner core particles, silica fine particles, and monomers. Agglomerates containing silica fine particles and binding components are thereby externally added to the toner core particles, resulting in a toner particle dispersion.

For the polymerization initiator, conventional ones can be used without any particular restrictions. Specific examples may include the following: peroxide-based polymerization initiators typified by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxydicarbonate, tetralin hydroperoxide, 1-phenyl-2-methylpropyl-1-hydroperoxide, triphenylacetic acid tert-hydroperoxide, tert-butyl performic acid, tert-butyl peracetic acid, tert-butyl perbenzoic acid, tert-butyl perphenylacetic acid, tert-butyl permethoxyacetic acid, tert-butyl per-N-(3-tolyl) palmitic acid benzoyl peroxide, t-butyl peroxy 2-ethylhexanoate, t-butyl peroxy pivalate, t-butyl peroxy isobutyrate, t-butyl peroxy neodecanoate, methyl ethyl ketone peroxide, diisopropyl peroxydicarbonate, cumene hydroperoxide, 2,4-dichlorobenzoyl peroxide, and lauroyl peroxide; and azo or diazo polymerization initiators typified by 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

(Filtration Process, Washing Process, Drying Process, Classification Process, and External Addition Process)

Toner particles are then obtained by performing a filtration process to separate the solid content of the toner particles, followed by a washing process, a drying process, and a classification process for particle size adjustment as appropriate. The toner particles may be simply used as toner. Alternatively, toner may be obtained by mixing and adhering external additives such as inorganic fine powders to the toner particles using a mixer.

[Process Cartridge]

A process cartridge according to the present exemplary embodiment includes a charging unit (charging device) for charging the surface of an electrophotographic photosensitive member, a cleaning unit for removing residual toner from a region upstream of the charging device, and a developing unit (developing device) for developing an electrostatic latent image formed on the surface of the electrophotographic photosensitive member with toner to form a toner image on the surface of the electrophotographic photosensitive member. The developing device accommodates the toner in its toner accommodation unit (toner container). The developing device includes a conductive roller disposed to be able to contact the electrophotographic photosensitive member.

The toner and the conductive roller described above can be applied to the process cartridge. The process cartridge may include a frame for supporting the charging device and the developing device.

Figure 4:
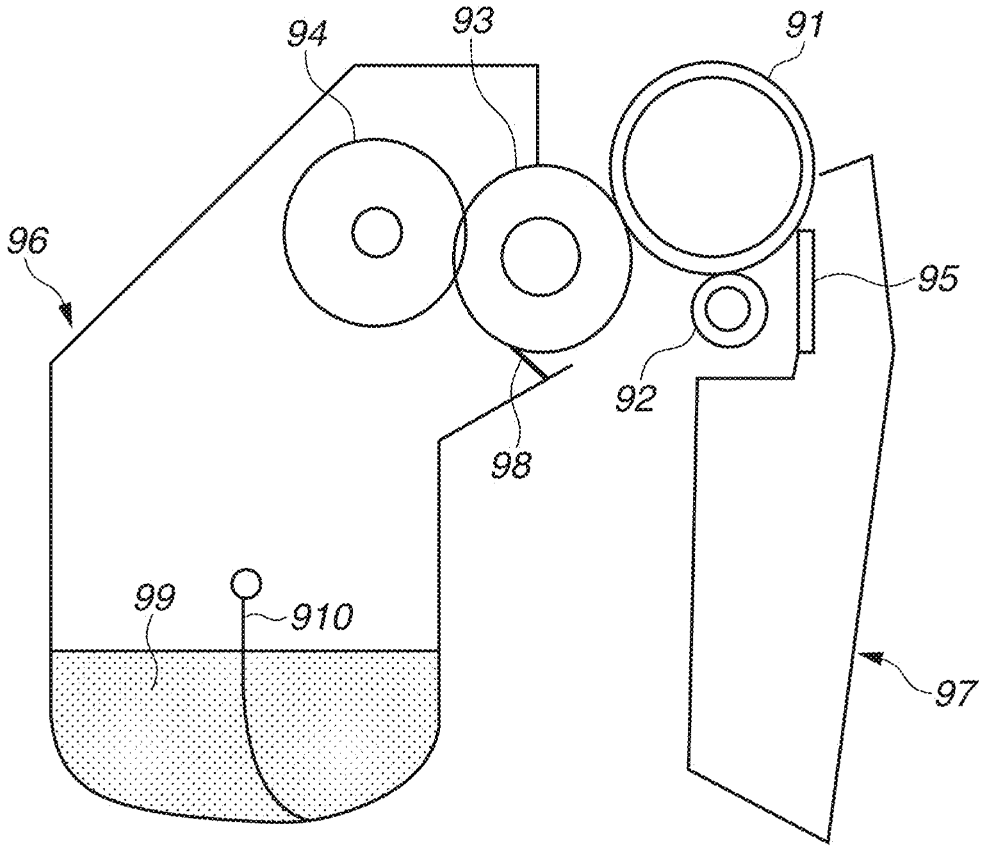
FIG. 4 is a schematic diagram illustrating a process cartridge.

FIG. 4 is a schematic sectional view of an electrophotographic process cartridge including a conductive roller as a charging roller. This process cartridge is configured by integrating the developing device and the charging device so that both can be detachably attached to the main body of an electrophotographic apparatus to be described below.

The developing device includes at least a developing roller 93, and toner 99 is accommodated in a toner container 96. The developing device may be integrated with a toner supply roller 94, a developing blade 98, and an agitation blade 910 as appropriate.

The charging device can include at least a charging roller 92, and a cleaning blade 95 and a waste toner container 97 are included as a cleaning unit. The electrophotographic photosensitive member (photosensitive drum 91) may be integrated with the charging device as a component of the process cartridge or fixed to the main body as a component of the electrophotographic apparatus, as long as the conductive roller is disposed to be able to contact the electrophotographic photosensitive member.

Voltages are applied to the charging roller 92, the developing roller 93, the toner supply roller 94, and the developing blade 98.

[Electrophotographic Apparatus]

The electrophotographic apparatus includes an electrophotographic photosensitive member, a charging device for charging the surface of the electrophotographic photosensitive member, a cleaning unit for removing residual toner from a region upstream of the charging device, and a developing device for developing an electrostatic latent image formed on the surface of the electrophotographic photosensitive member with toner to form a toner image on the surface of the electrophotographic photosensitive member. The charging device includes a conductive roller disposed to be able to contact the electrophotographic photosensitive member. The toner and the conductive roller described above can be applied to this electrophotographic apparatus.

The electrophotographic apparatus may include an image exposure device for irradiating the surface of the electrophotographic photosensitive member with image exposure light to form the electrostatic latent image on the surface of the electrophotographic photosensitive member, a transfer device for transferring the toner image formed on the surface of the electrophotographic photosensitive member to a recording medium, and a fixing device for fixing the toner image transferred to the recording medium to the recording medium.

Figure 5:
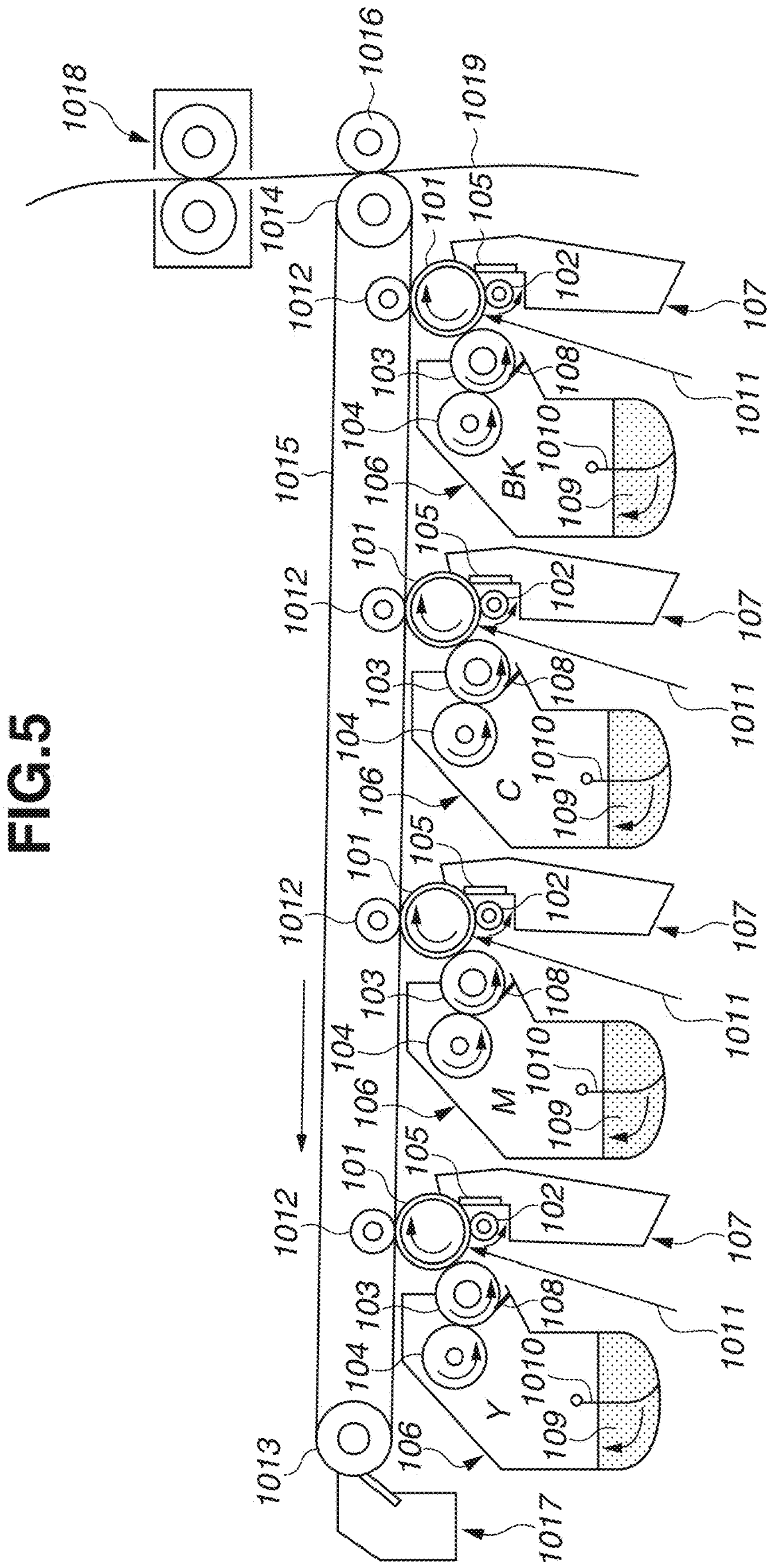
FIG. 5 is a schematic sectional view of an electrophotographic apparatus.

FIG. 5 is a schematic configuration diagram illustrating an electrophotographic apparatus using conductive rollers as charging rollers. This electrophotographic apparatus is a color electrophotographic apparatus to which four process cartridges are detachably attached. The process cartridges use toners of respective colors: black, magenta, yellow, and cyan.

Photosensitive drums 101 rotate in the directions of the arrows, and are uniformly charged by charging rollers 102 to which a voltage is applied from a charging bias power supply. Electrostatic latent images are formed on the surfaces of the photosensitive drums 101 by using exposure light 1011. Toners 109 accommodated in toner containers 106 are supplied to toner supply rollers 104 by agitation blades 1010 and conveyed to developing rollers 103.

Developing blades 108 disposed in contact with the developing rollers 103 uniformly coat the surfaces of the developing rollers 103 with the toners 109, and give charges to the toners 109 by triboelectric charging. The electrostatic latent images are developed with the toners 109 conveyed and imparted by the developing rollers 103 disposed in contact with the photosensitive drums 101, and thereby visualized as toner images.

The visualized toner images on the photosensitive drums 101 are transferred to an intermediate transfer belt 1015 by primary transfer rollers 1012 to which a voltage is applied by a primary transfer bias power supply. The intermediate transfer belt 1015 is supported and driven by a tension roller 1013 and an intermediate transfer belt driving roller 1014. The toner images in the respective colors are superposed in succession to form a color image on the intermediate transfer belt 1015.

A transfer material 1019 is fed into the apparatus by a feed roller, and conveyed to between the intermediate transfer belt 1015 and a secondary transfer roller 1016. A voltage is applied to the secondary transfer roller 1016 from a secondary transfer bias power supply, whereby the color image on the intermediate transfer belt 1015 is transferred to the transfer material 1019. The transfer material 1019 to which the color image is transferred is subjected to fixing processing in a fixing device 1018 and discharged to outside the electrophotographic apparatus, whereby the print operation is completed.

Meanwhile, untransferred toners remaining on the photosensitive drums 101 are scraped off by cleaning blades 105 and stored in waste toner accommodation containers 107. The cleaned photosensitive drums 101 repeat the foregoing processes. Untranferred toner remaining on the intermediate transfer belt 1015 is also scraped off by a cleaning device 1017.

[Process Cartridge Set]

A process cartridge set according to the present exemplary embodiment is a process cartridge set including a first cartridge and a second cartridge that can be detachably attached to the main body of the electrophotographic apparatus. The first cartridge includes a charging device for charging the surface of an electrophotographic photosensitive member, a cleaning unit for removing residual toner from a region upstream of the charging device, and a first frame for supporting the charging device and the cleaning unit. The second cartridge includes a toner container accommodating toner for developing an electrostatic latent image formed on the surface of the electrophotographic photosensitive member to form a toner image on the surface of the electrophotographic photosensitive member. The charging device includes a conductive roller disposed to be able to contact the electrophotographic photosensitive member.

The toner and the conductive roller described above can be applied to this process cartridge set.

The electrophotographic photosensitive member may be included in the first cartridge or fixed to the main body of the electrophotographic apparatus, as long as the conductive roller is disposed to be able to contact the electrophotographic photosensitive member. For example, the first cartridge may include the electrophotographic photosensitive member, the charging device for charging the surface of the electrophotographic photosensitive member, and the first frame for supporting the electrophotographic photosensitive member and the charging device. The second cartridge may include the electrophotographic photosensitive member.

The first cartridge or the second cartridge may include a developing device for forming a toner image on the surface of the electrophotographic photosensitive member. The developing device may be fixed to the main body of the electrophotographic apparatus.

[Method for Measuring Toner Properties]

A method for measuring various properties of the toner according to the present exemplary embodiment will now be described.

<Method for Measuring Weight Average Particle Diameter (D4) and Number Average Particle Diameter (D1)>

A weight average particle diameter (D4) and a number average particle diameter (D1) of the toner are calculated in the following manner. As a measuring instrument, use a precision particle size distribution measuring instrument "Coulter Counter Multisizer 3" (registered trademark, manufactured by Beckman Coulter, Inc.) that is equipped with a 100-μm aperture tube and uses an electrical sensing zone method. Set the measurement conditions and analyze the measurement data using dedicated software "Beckman Coulter Multisizer 3 Version 3.51" (manufactured by Beckman Coulter, Inc.) that comes with the instrument. The measurement is performed with an effective measurement channel count of 25000 channels.

The electrolyte solution used for measurement can be prepared by dissolving reagent-grade sodium chloride in ion-exchanged water to a concentration of approximately 1% by mass. For example, "ISOTON II" (manufactured by Beckman Coulter, Inc.) can be used.

Before the measurement and analysis, the dedicated software is set as follows.

On the "Change standard operating method and measurement (SOMME)" screen of the dedicated software, set the total count in the control mode to 50000 particles. Set the number of measurements to 1. Set the Kd value to the value obtained using the "Standard Particles 10.0 μm" (manufactured by Beckman Coulter, Inc.). Press the "Threshold/noise level measurement" button to automatically set the threshold and noise level. Set the current to 1600 μA, the gain to 2, and the electrolyte solution to ISOTON II. Check "Flush aperture tube after measurement".

On the "Pulse to particle size conversion settings" screen of the dedicated software, set the bin spacing to logarithmic particle sizes, the number of particle size bins to 256, and the particle size range to from 2 μm to 60 μm.

A specific measurement method is as follows:

(1) Put approximate 200 ml of the electrolyte solution in a 250-ml round-bottomed glass beaker dedicatedly designed for Multisizer 3. Place the beaker on the sample stand and stir using a stirrer rod, at 24 rotations per second counterclockwise. Use the "flush aperture" function of the dedicated software to remove any dirt or air bubbles from inside the aperture tube in advance.

(2) Put approximately 30 ml of the electrolyte solution in a 100-ml flat-bottomed glass beaker. As a dispersing agent, add approximately 0.3 ml of a diluted solution of "Contaminon N" (10%-by-mass aqueous solution of a pH-7 neutral detergent for cleaning precision measuring instruments, containing non-ionic surfactants, anionic surfactants, and organic builders, manufactured by Wako Pure Chemical Industries, Ltd.), diluted with ion-exchanged water to approximately three times by mass.

(3) Prepare an ultrasonic disperser "Ultrasonic Dispersion System Tetra 150" (manufactured by Nikkaki Bios Co., Ltd.) with an electrical output of 120 W, where two oscillators having an oscillation frequency of 50 kHz are built in with a phase difference of 180°. Fill the tank of the ultrasonic disperser with approximately 3.3 l of ion-exchanged water. Add approximately 2 ml of Contaminon N to this tank.

(4) Place the beaker of the foregoing step (2) into a beaker fixing hole of the ultrasonic disperser, and activate the ultrasonic disperser. Adjust the height position of the beaker so that the resonance state of the liquid surface of the electrolyte solution in the beaker is maximized.

(5) While irradiating the electrolyte solution in the beaker of the foregoing step (4) with ultrasonic waves, add approximately 10 mg of toner to the electrolyte solution in small amounts for dispersion. Continue the ultrasonic dispersion treatment for an additional 60 seconds. During the ultrasonic dispersion, adjust the water temperature in the tank as appropriate to 10° C. or higher and 40° C. or lower.

(6) Using a pipette, add droplets of the toner-dispersed electrolyte solution of the foregoing step (5) into the round-bottomed beaker of the foregoing step (1) placed in the sample stand. Adjust the measurement concentration to approximately 5%. Continue the measurement until the number of measured particles reaches 50000.

(7) Analyze the measurement data using the dedicated software that comes with the instrument to calculate the weight average particle diameter (D4) and the number average particle diameter (D1). Note that the "average diameter" on the "Analysis/volume statistics (arithmetic mean)" screen when the dedicated software is set to graph/volume % indicates the weight average particle diameter (D4). The "average diameter" on the "Analysis/number statistics (arithmetic mean)" screen when the dedicated software is set to "graph/number %" indicates the number average particle diameter (D1).

<Method for Obtaining Backscattered Electron Image of Toner Particle Surface>

The exposure ratio of the toner base material is calculated using backscattered electron images of toner particle surfaces.

The backscattered electron images of the toner particle surfaces are obtained using an SEM.

Backscattered electron images obtained from an SEM are also referred to as "compositional images". Elements with lower atomic numbers are detected darker, and elements with higher atomic numbers brighter.

In general, toner particles are resin particles mainly containing resin components and a release agent and other compositions consisting mainly of carbon. If there are silica fine particles or metal oxides on the toner particle surfaces, the silica fine particles or metal oxides are observed as bright portions and the resin portions consisting mainly of carbon as dark portions in SEM backscattered electron images.

The SEM device and observation conditions are as follows:

Device used: ULTRA PLUS manufactured by Carl Zeiss Microscopy Co., Ltd.;
Accelerating voltage: 1.0 kV;
Working distance (WD): 2.0 mm;
Aperture size: 30.0 μm;
Detection signal: Energy selective backscattered electron (EsB)
EsB grid: 800 V;
Observation magnification: 50000 times;
Contrast: 63.0%±5.0% (reference value);
Brightness: 38.0%±5.0% (reference value);
Resolution: 1024×768; and
Sample preparation: Disperse toner particles over a carbon tape (no evaporation applied).

The contrast and brightness are set as appropriate based on the state of the device used. The accelerating voltage and the EsB grid are set to achieve the following objectives: obtaining structural information about the outermost surfaces of toner particles, preventing charge-up of the unevaporated samples, and selectively detecting high-energy backscattered electrons. The observation field of view is selected near the apex where the curvature of the toner particle is minimized.

<Method for Checking That Dark Portions in Backscattered Electron Image are Derived from Carbon Atoms>

That dark portions in an observed backscattered electron image are derived from resins is checked by superposing an energy dispersive X-ray spectroscopy (EDS) element mapping image, which can be obtained using an SEM, on the backscattered electron image.

The SEM and EDS devices and observation conditions are as follows:

Device used (SEM): ULTRA PLUS manufactured by Carl Zeiss Microscopy Co., Ltd.;

Device used (EDS): NORAN System 7, Ultra Dry EDS Detector manufactured by

Thermo Fisher Scientific Co., Ltd.;

Accelerating voltage: 5.0 kV;

WD: 7.0 mm;

Aperture size: 30.0 μm;

Detection signal: SE2 (secondary electron)

Observation magnification: 50000 times;

Mode: Spectral imaging; and

Sample preparation: Disperse toner particles over a carbon tape, followed by platinum sputtering.

Superpose the element mapping image obtained by this technique on the backscattered electron image, and check that the carbon atom portions in the mapping image match the dark portions in the backscattered electron image.

<Method for Checking Dispersion State of Binding Components in Agglomerates>

The dispersion state of the binding components in the agglomerates is calculated using the backscattered electron images of the agglomerates on the toner particle surfaces. The backscattered electron images of the agglomerates on the toner particle surfaces are obtained by a method similar to the method for obtaining the backscattered electron images of the toner particle surfaces.

From the obtained backscattered electron images, the dispersion state of the binding components in the agglomerates is calculated using image processing software ImageJ (developed by Wayne Rashand). The procedure will now be described.

Initially, convert a backscattered electron image to be analyzed in 8 bits using the Type option on the Image menu. Next, on the Process menu, select Filters and set the median diameter to 2.0 pixels to reduce image noise. Estimate the center of the backscattered electron image excluding the observation condition display area at the bottom of the image, and select a 1.5-μm-square area about the estimated image center using the Rectangle tool on the toolbar.

Next, select Threshold from the Adjust option on the Image menu. Manually select all pixels corresponding to brightness B1 and click Apply to obtain a binarized image. Through this operation, pixels corresponding to A1 are displayed in black (pixel group A1), and pixels corresponding to A2 are displayed in white (pixel group A2). Again, estimate the center of the backscattered electron image excluding the observation condition display area at the bottom of the image. Select a 1.5-μm-square area about the estimated image center, using the Rectangle tool on the toolbar.

Next, select the scale bar in the observation condition display area displayed at the bottom of the backscattered electron image, using the Straight Line tool on the toolbar. Select Set Scale on the Analyze menu in such a state, and a new window opens and the pixel distance of the selected line is automatically entered in the "Distance in Pixels" field.

Enter the value of the scale bar (for example, 100) into the Known Distance field of the window, input the unit of the scale bar (for example, nm) into the Unit of Measurement field, and click OK to complete the scale setting.

Next, select Set Measurements on the Analyze menu and check Area and Feret's diameter. Select Analyze Particles on the Analyze menu, check Display Results, and click OK to perform domain analysis.

Figure 8:
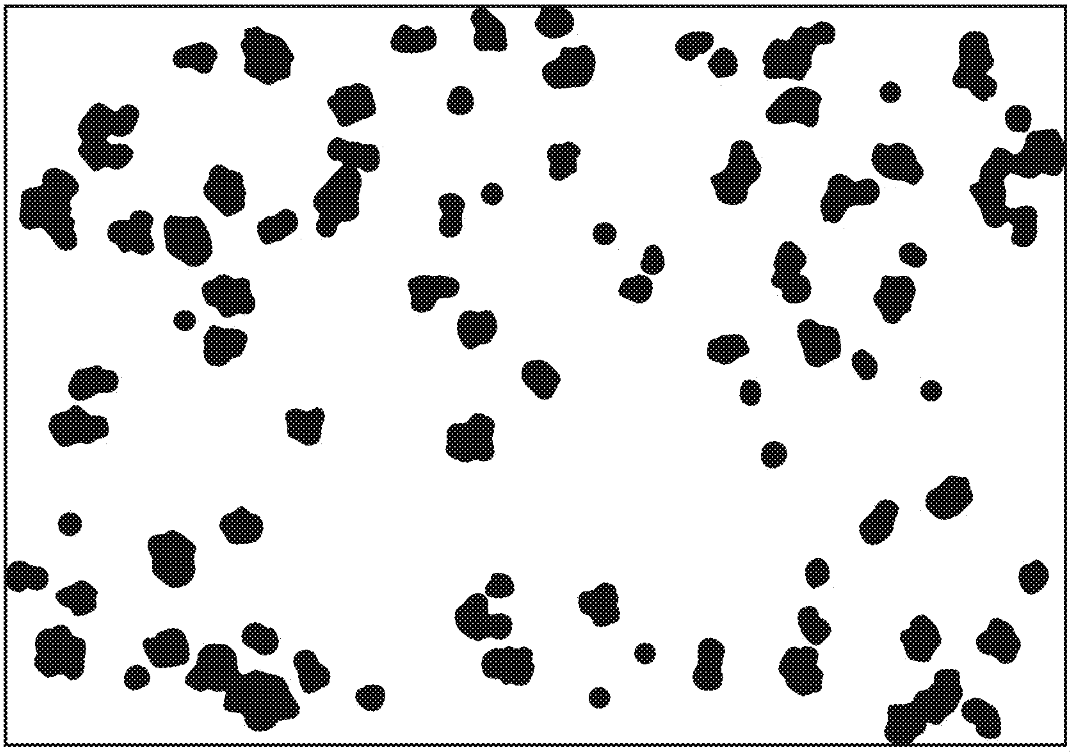
FIG. 8 is an example of an image obtained by performing predetermined processing on an obtained analysis image using image processing software ImageJ in a method for checking the state of dispersion of binding components included in an agglomerate.

Next, perform an Erode process by 10 pixels on the obtained analysis image, using ImageJ. Perform a Dilate process by 10 pixels, using ImageJ. Both the Erode and Dilate processes are performed from the Binary item on the Process menu. FIG. 8 illustrates an example of the image obtained by performing the foregoing processes.

Figure 9:
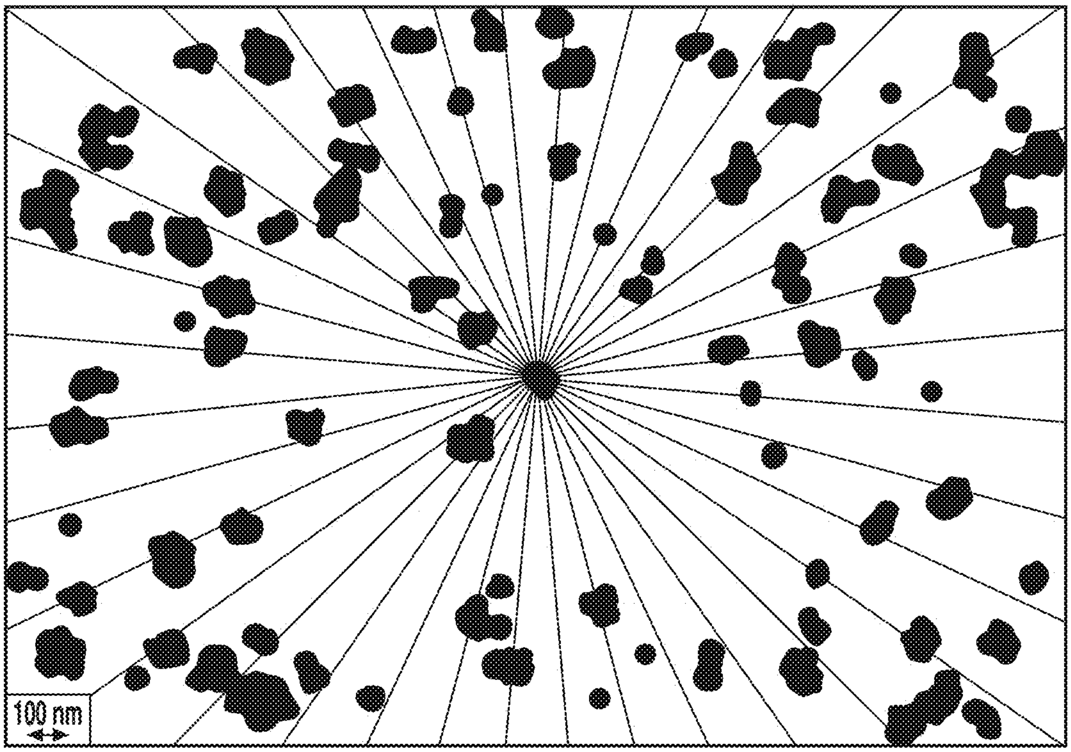
FIG. 9 is an example of the image of FIG. 8 where a total of 18 straight lines passing through a reference point are drawn from ends to ends of the image at intervals of 10°, with the center point as the reference point.

On the analysis image obtained through the foregoing processes, draw a total of 18 straight lines passing through a reference point from one end to the other of the analysis image at intervals of 10°, with the center point of the analysis image as the reference point, using the Straight Line tool on the toolbar. FIG. 9 illustrates an example of the image on which the straight lines are drawn.

Next, measure the lengths L of segments extending through continuous dark portions on the straight lines, and count the number of straight lines including segments with a length L of 100 nm or more. Check whether the number of such straight lines in the agglomerate is 12 or more.

<Method for Checking Ratio of Toner Particles with Agglomerates Where Number of Straight Lines is 12 or More>

Take 30 toner particles with agglomerates in the toner to be evaluated, and perform the foregoing procedure on the agglomerates. Count the number of toner particles with agglomerates where the number of straight lines is 12 or more. The ratio A of the toner particles with the agglomerates where the number of straight lines is 12 or more is calculated by the following equation:

$$A = (\text{number of toner particles with agglomerates where the number of straight lines is 12 or more})/30.$$

<Method for Check Area Ratio of Binding Components in Agglomerates>

The area ratio of the binding components is calculated based on binding component domains D1 and non-binding component domains D2, using the backscattered electron images of agglomerates on toner particle surfaces. The backscattered electron images of the agglomerates are obtained by a method similar to the method for obtaining the reflected electron images of the toner particle surfaces.

The domains D1 and D2 are analyzed using the image processing software ImageJ (developed by Wayne Rashand) on the backscattered electron images of the outermost surfaces of the toner particles, obtained by the foregoing technique. The procedure will now be described.

Initially, convert a backscattered electron image to be analyzed in 8 bits using Type on the Image menu. Next, using Filters on the Process menu, set the Median diameter to 2.0 pixels to reduce image noise. Estimate the center of the backscattered electron image excluding the observation condition display area displayed at the bottom of the image. Select a 1.5-μm-square area about the center of the backscattered electron image, using the Rectangle tool on the toolbar.

Next, using the Freehand selections function on the Image menu, select only portions where the carbon atom areas in the mapping image match the dark portions in the backscattered electron image, and fill all the selected portions with black. Fill all the portions other than where the carbon atom areas in the mapping image match the dark portions in the backscattered electron image with white. Next, select Threshold on Adjust menu. Manually select 128, which is the middle tone between black and white in an 8-bit image, as the threshold value, and click Apply to obtain a binarized image.

Through this operation, pixels corresponding to domains D1 (binding components) are displayed in black (pixel group A1), and pixels corresponding to domains D2 (non-binding components) are displayed in white (pixel group A2).

Again, estimate the center of the backscattered electron image excluding the observation condition display area displayed at the bottom of the image. Select a 1.5 μm-square-area about the image center of the backscattered electron image, using the Rectangle tool on the toolbar.

Next, select the scale bar in the observation condition display area displayed at the bottom of the backscattered electron image, using the Straight Line tool on the toolbar. Select Set Scale on the Analyze menu in this state, and a new window opens with the pixel distance of the selected line entered in the Distance in Pixels field.

Enter the value of the scale bar (for example, 100) into the Known Distance field of the window, input the unit of the scale bar (for example, nm) into the Unit of Measurement field, and click OK to complete the scale setting.

Next, select Set Measurements on the Analyze menu and check Area and Feret's diameter. Select Analyze Particles on the Analyze menu, check Display Results, and click OK to perform domain analysis.

From a newly opened Results window, obtain the area (Area) for each of the domains corresponding to the domains D1 formed by the pixel group A1 and the domains D2 formed by the pixel group A2.

Suppose that the total sum of the areas of the domains D1 derived from the binding components is S1 ($\mu m^2$), and the total sum of the areas of the domains D2 derived from the non-binding components is S2 ($\mu m^2$). Calculate the area ratio S of the binding components from the obtained S1 and S2 using the following equation:

$$S(\text{area }\%)=\{S1/(S1+S2)\}\times 100.$$

Perform the foregoing procedure on ten fields of view on the toner particles to be evaluated. The arithmetic mean of the calculations is assumed as the area ratio.

<Method for Observing Toner and Method for Calculating Number of Toner Particles>

The toner is observed using an SEM.

The SEM device and observation conditions are as follows:

Device used: ULTRA PLUS manufactured by Carl Zeiss Microscopy Co., Ltd.;

Acceleration voltage: 1.0 kV;

WD: 2.0 mm;

Aperture size: 30.0 μm;

Detection signal: SE2 (secondary electron);

Observation magnification: 2000 times;

Contrast: 45.0%±5.0% (reference value);

Brightness: 38.0%±5.0% (reference value);

Resolution: 1024×768; and

Sample preparation: Disperse toner particles over a carbon tape (no evaporation applied).

The contrast and brightness are set as appropriate based on the state of the device used. The accelerating voltage is set to achieve the following objectives: obtaining structural information about the outermost surfaces of toner particles, and preventing charge-up of the unevaporated samples.

The number of observation fields of view is such that Tall reaches 300 or more, where Tall is the count of toner particles that are entirely visible within the field of view in the obtained secondary electron image.

<Method for Calculating Ratio by Number CI of Toner Particles with Agglomerates>

Count the number, Tagg, of toner particles with agglomerates among the toner particles that are entirely visible within the observation fields of view in all the secondary electron images of the observation fields of view obtained. FIG. 7 illustrates an example of the toner particles with agglomerates to count the number of.

CI (% by number) is calculated from the obtained Tall and Tagg, using the following equation:

$$CI(\text{\% by number})=\text{Tagg}/\text{Tall}\times 100.$$

<Method for Measuring Sizes of Agglomerates and Method for Counting Toner Particles with Agglomerates>

Capture images of entire toner particles at an appropriate magnification (5000 to 10000 times) by the foregoing SEM observation, and store the captured images. The image resolution is 1024×768 pixels.

On an SEM image obtained, select an area that is considered to be an agglomerate, using the image analysis software Image J (developed by Wayne Rasband). The size of the agglomerate is defined by the maximum Feret diameter of this selected area. The calculation procedure is as follows:

a) Set the scale in [Analyze]-[Set Scale];

b) Check [Feret's diameter] in [Analyze]-[Set Measurements];

c) Select [Freehand Selections] and manually select an agglomerate on the image;

d) Select [Analyze]-[Measure] to obtain the maximum Feret diameter (Feret) of the selected area;

e) If there is more than one agglomerate in the image, repeat steps c) and d);

f) Perform a similar analysis on the remaining nine images of toner particles with agglomerates with a maximum Feret diameter of 500 nm or more and 8000 nm or less; and g) Assume the maximum value of Feret (Feret diameter) in each analysis result obtained as the maximum Feret diameter.

Count those with a maximum Feret diameter of 500 nm or more and 8000 nm or less as agglomerates.

Observe arbitrarily selected positions of the toner under the SEM. The arithmetic mean of the maximum Feret diameters of a total of 100 agglomerates is assumed as Ag.

The percent by number of the toner particles with agglomerates among the arbitrarily observed toner particles is assumed as CI.

<Method for Evaluating the Presence of Silica and Binding Components in Agglomerates>

The presence of silica and binding components in the agglomerates is checked using a Scanning Transmission Electron Microscopy with Energy Dispersive X-ray spectroscopy (STEM-EDX) and an SEM.

Initially, the toner particles with agglomerates are evaluated for the cross-sectional structure and composition of the agglomerates using the STEM-EDX.

Figure 10:
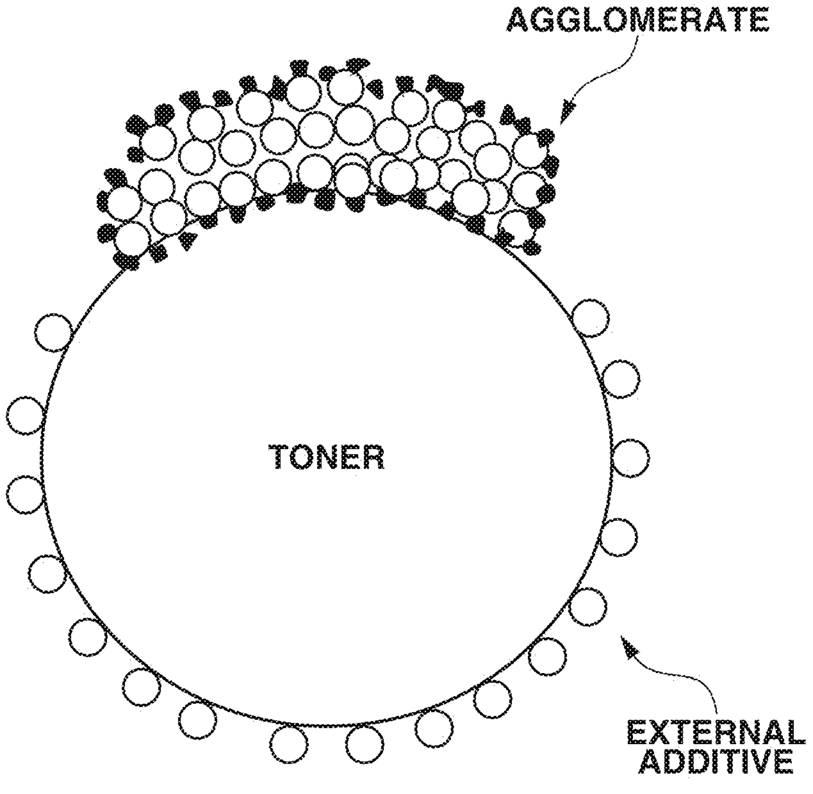
FIG. 10 is a schematic sectional view of a toner particle with an agglomerate.

Apply an Os film (5 nm) and a naphthalene film (20 nm) to the toner particles as protective films, using an osmium plasma coater (OPC80T manufactured by Filgen, Inc.). Embed the toner particles in a photocurable resin D800 (JEOL Ltd.), and then prepare 100-nm-thick toner particle cross sections using an ultrasonic ultramicrotome (UC7 manufactured by Leica Microsystems) at a cutting speed of 1 mm/s. Here, 300 to 500 toner particle cross sections are desirably obtained by processing a plurality of toner particles at once. FIG. 10 is a schematic diagram illustrating a cross section of a toner particle with an agglomerate.

Perform STEM-EDX observation on the obtained cross sections using the STEM function of a TEM-EDX (TEM: JEM-2800 [200 keV] manufactured by JEOL Ltd., EDX detector: Dry SD 100GV manufactured by JEOL Ltd., and EDX system: NORAN SYSTEM 7 manufactured by Thermo Fisher Science Inc.). Adjust the STEM probe size to 1.0 nm, the observation magnification to 50000 to 300000 times, the EDX image size to 256×256 pixels, and the storage rate to 10000 cps. Accumulate 50 frames for observation. The observation locations are set so that agglomerates on the outer peripheries of the toner particles fall within the field of view.

The presence of particles consisting mainly of silica and binding components in the agglomerates can be determined by checking the presence of portions rich in silicon and oxygen separate from portions rich in elements derived from the binding components. The binding components made of resin are rich in carbon.

Next, backscattered electron image observation is performed on the toner particles with agglomerates, using an SEM. The image capturing conditions are as follows:

(1) Sample Preparation

Attach a carbon tape to the sample stage (aluminum sample stage of 12.5 mm-φ×6 mm-t). Place the toner on top of the carbon tape. Blow air to remove an excess of the sample from the sample stage. Set the sample stage on the sample holder, and then set the sample holder in an SEM (Ultra Plus manufactured by Carl Zeiss AG).

(2) Setting SEM Observation Conditions

The presence of agglomerates containing silica fine particles and binding components is checked using images obtained by backscattered electron image observation under the Ultra Plus. In backscattered electron images, the image contrast varies depending on elemental composition, whereby the presence of silica fine particles and binding components in the agglomerates can be checked. Set the accelerating voltage to 0.7 kV, the EsB grid to 500 V, and the WD to 3.0 mm.

(3) Focus Adjustment

Set the observation magnification to 30000 (30k) times and adjust the alignment and stigma. Next, set the field of view to an area that appears to have the morphology of an agglomerate at an appropriate magnification. If there are two types of contracts in the resulting backscattered electron image, namely, one considered to correspond to silica fine particles and one considered to correspond to binding components, then the area can be determined to be the same as the agglomerate composition of which is observed by the STEM-EDX.

<Method for Calculating Ratios by Number Ca and Cb of Toner Particles with Agglomerates After Ultrasonic Treatments>

Put approximately 10 ml of ion-exchanged water from which solid impurities are removed in advance into a glass container.

As a dispersing agent, add approximately 0.5 ml of a diluted solution of "Contaminon N" (10%-by-mass aqueous solution of a pH-7 neutral detergent for precision measuring instruments, containing non-ionic surfactants, anionic surfactants, and organic builders, manufactured by Wako Pure Chemical Industries), diluted with ion-exchanged water to approximately three times by mass. Add approximately 0.02 g of the sample to be measured. During stirring, perform the following dispersion process using an ultrasonic disperser to generate a measurement dispersion. During this process, cool the dispersion as appropriate to a temperature of 10° C. or higher and 40° C. or lower. An ultrasonic homogenizer with an oscillation frequency of 30 kHz (VP-050 manufactured by TAITEC Corporation) is used as the ultrasonic disperser. Insert the vibrating part 1.0 cm into the dispersion, and vibrate under the following ultrasonic condition A or ultrasonic condition B:

Ultrasonic condition A: an output frequency of 30 kHz, an output power of 0.75 W, and an irradiation time of 300 s, and Ultrasonic condition B: an output frequency of 30 kHz, an output power of 35 W, and an irradiation time of 300 s.

Filter the dispersion obtained by the foregoing procedure through Kiriyama filter paper (No. 5C: pore size of 1 μm) to separate the particles from the filtrate. Wash the obtained particles with 100 parts by mass of ion-exchanged water. Dry the particles under vacuum at 25° C. for 24 hours. Powders for measuring the ratios by number Ca and Cb of toner particles with agglomerates are thereby obtained.

Using the obtained powders, calculate Ca and Cb by a procedure similar to the "method for calculating the ratio by number CI of toner particles with agglomerates". Check whether Ca and Cb satisfy the relationships of the following inequalities (1) and (2):

$$0.90 \leq Ca/CI \leq 1.00, \text{ and} \quad \text{inequality (1)}$$

$$0.01 \leq Cb/CI \leq 0.10. \quad \text{inequality (2)}$$

[Method for Measuring Physical Properties of Conductive Roller]

Next, a method for checking for the structure of the conductive layer of the conductive roller and a method for measuring various physical properties will be described.

<Checking for Matrix-Domain Structure>

The presence or absence of the matrix-domain structure formed in the conductive layer of the conductive roller is checked by the following method.

Using a razor, cut out a section (500 μm in thickness) so that a cross section perpendicular to the longitudinal direction of the conductive layer can be observed. Next, apply platinum evaporation and capture an image at a magnification of 1000 times using an SEM (product name: S-4800, manufactured by Hitachi High-Technologies Corporation) to obtain a cross-sectional image.

Figure 2:
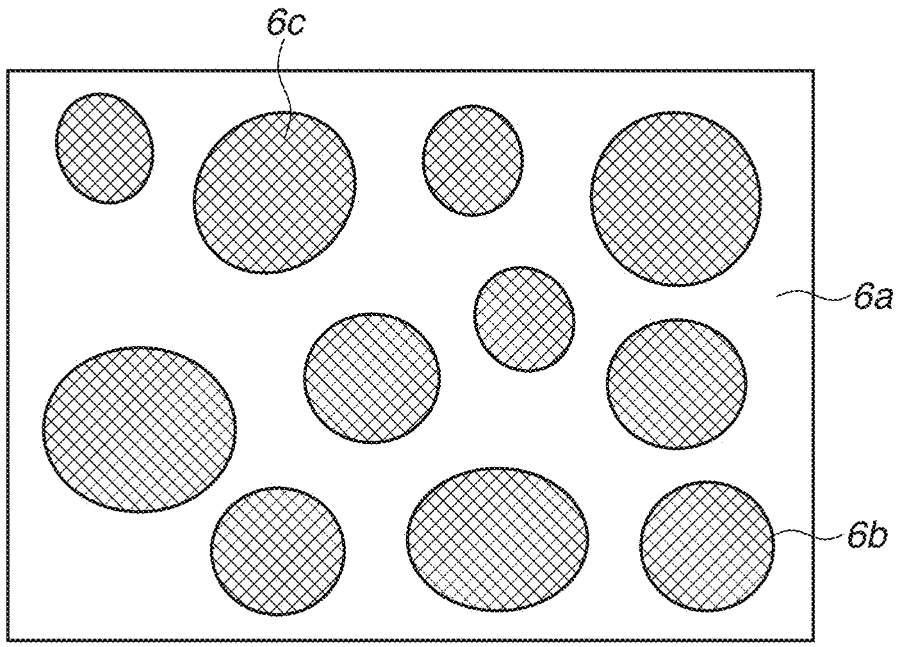
FIG. 2 is an enlarged sectional view of a conductive layer.

In the cross-sectional image, a matrix-domain structure observed in the section of the conductive layer shows a morphology such as illustrated in FIG. 2, where a plurality of domains **6*b* is dispersed in a matrix 6*a* with the domains 6*b* not interconnected but independent of each other. The domains 6*b* include electronic conductive agents 6*c*. The matrix 6*a* is continuous within the image, and the domains 6*b* are isolated by the matrix 6*a***.

If a matrix-domain structure such as that of FIG. 2 is observed in the cross-sectional image, the evaluation is "present". On the other hand, if the cross-sectional image does not include such a matrix-domain structure, the evaluation is "absent".

<Measurement of Volume Resistivity R1 of Matrix>

The volume resistivity R1 of the matrix can be measured, for example, by cutting out a slice of a predetermined thickness (for example, 1 μm) including a matrix-domain structure from the conductive layer, and bringing a microprobe of a scanning probe microscope (SPM) or atomic force microscope (AFM) into contact with the matrix in the slice.

For example, cut out slices from the conductive layer as illustrated in FIG. 3B. The slices are cut out to include at least a part of a surface parallel to the YZ plane (for example, 83*a*, 83*b*, and 83*c*) perpendicular to the axial direction of the conductive member, with the longitudinal direction of the conductive member as the X-axis, the thickness direction of the conductive layer as the Z-axis, and the circumferential direction as the Y-axis. The slices can be cut out using a sharp razor, a microtome, or a focused ion beam (FIB) method.

To measure the volume resistivity, ground one side (surface) of each slice cut from the conductive layer. Next, bring the microprobe of the SPM or AFM into contact with the matrix portion on the side of the slice opposite to the grounded surface. Apply a direct-current (DC) voltage of 50 V for 5 seconds, and measure ground currents over the 5-second period. Calculate the arithmetic mean of the measurements, and determine the electrical resistance by dividing the applied voltage by the calculated mean value. Finally, convert the resistance value into volume resistivity using the thickness of the slice.

Here, the SPM or AFM can measure the thickness of the slice simultaneously with the measurement of the resistance.

To determine the value of the volume resistivity R1 of the matrix in the cylindrical conductive member, for example, cut out a slice sample from each of regions into which the conductive layer is divided circumferentially in four and longitudinally in five. Measure each slice sample for the volume resistivity. Then, determine the arithmetic mean of the volume resistivities of the total of 20 samples.

In practical examples to be described below, 1-μm-thick slices were initially cut out from the conductive layer of the conductive material at a cutting temperature of −100° C., using a microtome (product name: Leica EM FCS, manufactured by Leica Microsystems). As illustrated in FIG. 3B, the slices were cut to include at least a part of an YZ plane (for example, 83*a*, 83*b*, and 83*c*) perpendicular to the axial direction of the conductive member, with the longitudinal direction of the conductive member as the X-axis, the thickness direction of the conductive layer as the Z-axis, and the circumferential direction as the Y-axis.

In an environment with a temperature of 23° C. and a humidity of 50% relative humidity (RH), one side of each slice (hereinafter, also referred to as a "grounded surface") was grounded on a metal plate. The cantilever of an SPM (product name: Q-Scope 250, manufactured by Quesant Instrument Corporation) was brought into contact with a location on the opposite side of the slice (hereafter referred to as a "measurement surface") that corresponded to the matrix and where no domain existed between the measurement surface and the grounded surface. A voltage of 50 V was then applied to the cantilever for 5 seconds, current values were measured, and the arithmetic mean value over the 5-second period was calculated.

The surface shape of the measured slice was observed using the SPM, and the thickness of the measurement location was calculated from the obtained height profile. The area of the recess where the cantilever contacted was also calculated from the observation result of the surface shape. The volume resistivity was then calculated using the thickness and the recess area.

The conductive layer was divided into five equal parts longitudinally and four equal parts circumferentially. A slice was randomly fabricated from each of the regions, resulting in a total of 20 slices. The 20 slices were subjected to the foregoing measurement. The average value of the measurements was assumed as the volume resistivity R1 of the matrix.

The SPM (product name: Q-Scope 250, manufactured by Quesant Instrument Corporation) was operated in contact mode.

<Measurement of Volume Resistivity R2 of Domains>

The volume resistivity R2 of the domains is measured by a similar method as the foregoing method for measuring the volume resistivity R1 of the matrix, except that locations corresponding to domains in the ultrathin slices are measured with a measurement voltage of 1 V.

In the practical examples to be described below, R2 was calculated by a similar method as the foregoing (measurement of the volume resistivity R1 of the matrix), except for the following. The locations for the cantilever to contact within the measurement surface were changed to ones that corresponded to domains and where no matrix existed between the measurement surface and the grounded surface. The voltage applied in measuring the current values was changed to 1 V.

<Measurement of Martens Hardness>

Martens hardness is measured using a microhardness tester (product name: Picodenter HM500, manufactured by Helmut Fischer GmbH). "WIN-HCU" (product name) that comes with the surface coating property tester (microhardness tester) is used as its software. Martens hardness is a material property value obtained by pressing an indenter under a load into the test object. Martens hardness is calculated by (test load)/(surface area of the indenter under the test load) ($N/mm^2$).

Press a rectangular pyramidal or similar indenter into the test object under a predetermined, relatively small test load. When the indenter reaches a predetermined indentation depth, determine the surface area of the indenter contacting the test object from the depth. Determine the universal hardness using the formula to be described below. In the present exemplary embodiment, the hardness value obtained under a load of 1 mN is employed.

Perform measurement based on International Organization for Standardization (ISO) 14577, using the surface coating property tester (product name: Picodenter HM500). Measure Martens hardness at 10 arbitrarily selected locations in the midsection of the conductive roller. Employ the arithmetic mean of the measurements as the measurement value of the developer carrier. The measurement conditions are as follows:

- Measuring indenter: Square pyramid indenter (136° in angle, Berkovich type);
- Indenter material: Diamond;
- Measurement environment: Temperature 23° C., RH 50%;
- Loading and unloading rate: 1 mN/50 seconds; and
- Maximum indentation load: 1 mN.

Measure a load-hardness curve by applying the load at the rate specified in the foregoing conditions. Calculate the Martens hardness at the point of time when the indentation depth reaches 0.1 μm, using the following equation:

$$\text{Martens hardness } HM(N/\text{mm}^2)=F(N)/(\text{surface area } [\text{mm}^2] \text{ of the indenter under the test load}),$$

where F represents force.

<Measurement of Martens Hardness G1 of Matrix Portion and Martens Hardness G2 of Domain Portions>

Specifically, the Martens hardnesses of the matrix portion and the domain portions are measured in the following manner. Initially, using a razor, cut out a measurement sample including the outer surface of the conductive roller from the conductive roller to be measured. The measurement sample is cut out with a length of 2 mm in both the circumferential and longitudinal directions of the conductive roller, and a thickness of 500 μm in the depth direction from the outer surface of the conductive roller.

Set the obtained measurement sample in the microhardness tester so that the observation surface of the measurement sample corresponding to the outer surface of the conductive roller can be observed. Observe the observation surface under a microscope (with a magnification of 50 times) accompanying the microhardness tester, and arbitrarily select 10 points in the matrix portion that are 0.1 μm or more away from the outer rim of any domain. Bring the tip of the measurement indenter into contact with each of the 10 points, and measure the Martens hardness under the foregoing conditions. Employ the arithmetic mean of the measurements obtained at the 10 points as the Martens Hardness G1 of the matrix portion.

Similarly, observe the observation surface of the measurement sample and arbitrarily select 10 domains. Bring the measurement indenter into contact with the gravitational center position of each domain on the plane, and measure the Martens hardness under the foregoing conditions. Employ the arithmetic mean of the measurements obtained at the 10 points as the Martens Hardness G2 of the domain portions.

The obtained values of the Martens hardnesses G1 and G2 of the matrix and domain portions are compared to evaluate the relationship in the magnitude of hardness between the domain portions and the matrix portion.

<Measurement of Circular Equivalent Diameter D of Domain Observed in Cross Section of Conductive Layer>

A circular equivalent diameter D of a domain is calculated in the following manner.

Using a microtome (product name: Leica EM FCS, manufactured by Leica Microsystems), cut out 1-μm-thick samples having a surface where a cross section (83*a*, 83*b*, 83*c*) in the thickness direction of the conductive layer appears as illustrated in FIG. 3B, at three positions including the longitudinal center of the conductive layer and positions L/4 from both ends of the conductive layer to the center, where L is the longitudinal length of the conductive layer, and T is the thickness of the conductive layer.

Evaporate platinum on the cross section of each of the obtained three samples in the thickness direction of the conductive layer. Capture images of three locations arbitrarily selected on the platinum-evaporated surface of each sample within the range of 0.1T to 0.9T in depth from the outer surface of the conductive layer at a magnification of 5000 times, using an SEM (product name: S-4800, manufactured by Hitachi High-Tech Corporation).

Binarize each of the obtained nine captured images, using image processing software (product name: Image-Pro Plus, manufactured by Media Cybernetics, Inc.). Quantify the binarized image using the software's counting function. Calculate the arithmetic mean S of the areas of the domains included in each of the captured images.

Next, calculate the circular equivalent diameter ($=(4S/\pi)^{0.5}$) of the domains from the arithmetic mean S of the areas of the domains calculated from each of the captured images. Next, calculate the arithmetic mean of the circular equivalent diameters of the domains in the captured images, whereby the circular equivalent diameter D of the domains observed in the cross sections of the conductive layer of the conductive roller to be measured is obtained.

<Measurement of Particle Size Distribution of Domains>

To evaluate the uniformity of the circular equivalent diameter D of the domains, the particle size distribution of the domains is measured in the following manner. Initially, obtain binarized images from the 5000× observation images obtained by the foregoing measurement of the circular equivalent diameter D of the domains under the SEM (product name: S-4800, manufactured by Hitachi High-Tech Corporation), using the image processing software (product name: Image-Pro Plus, manufactured by Media Cybernetics Inc.). Next, calculate an average D and a standard deviation σd of the domain group in each binarized image using the counting function of the image processing software, and calculate a particle size distribution index σd/D.

In measuring the σd/D particle size distribution of the domain diameters, obtain cross sections of the conductive layer in the thick direction such as illustrated in FIG. 3B, at three positions including the longitudinal center of the conductive layer and positions L/4 from both ends of the conductive layer to the center, where L is the longitudinal length of the conductive layer and T is the thickness of the conductive layer. At three locations arbitrarily selected within the thickness range of 0.1T to 0.9T in depth from the outer surface of the conductive layer in each of the three sections obtained from the foregoing three measurement positions, i.e., a total of nine locations, extract 50-μm-square regions and perform measurement. Calculate the arithmetic mean of the nine locations.

<Measurement of Domain-to-Domain Distance Dm Observed in Cross Sections of Conductive Layer>

Obtain samples having a surface where a cross section (83*a*, 83*b*, 83*c*) in the thickness direction of the conductive layer appears as illustrated in FIG. 3B, at three positions including the longitudinal center of the conductive layer and positions L/4 from both ends of the conductive layer to the center, where L is the longitudinal length of the conductive layer, and T is the thickness of the conductive layer.

In each of the three samples obtained, set 50-μm-square analysis regions at three locations arbitrarily selected within the thickness range of 0.1T to 0.9T in depth from the outer surface of the conductive layer on the surface where the cross section in the thickness direction of the conductive layer appears. Capture images of the three analysis regions at a magnification of 5000 times, using an SEM (product name: S-4800, manufactured by Hitachi High-Tech Corporation). Binarize each of the total of nine images captured, using image processing software (product name: LUZEX, manufactured by NIRECO CORPORATION).

The binarization is performed by the following procedure. Render each captured image in an 8-bit grayscale to obtain a 256-level monochrome image. Invert the black and white of the monochrome image so that the domains in the captured image appear white. Binarize the resulting image to obtain a binarized image of the captured image. Next, calculate wall-to-wall distances of the domains in each of the nine binarized images, and calculate the arithmetic mean thereof. This value is denoted by Dm. A "wall-to-wall distance" refers to the distance (shortest distance) between the walls of the most closely adjacent domains, which can be determined by setting an adjacent wall-to-wall distance as a measurement parameter of the foregoing image processing software.

<Measurement of Uniformity of Domain-to-Domain Distance Dm>

Calculate the standard deviation σm of the domain-to-domain distance Dm from the distribution of the wall-to-wall distances of the domains obtained in the foregoing process of measuring the domain-to-domain distance Dm. Calculate the coefficient of variation σm/Dm, which is an index of uniformity of the domain-to-domain distance Dm.

<Circular Equivalent Diameter Ds of Domains Observed on Outer Surface of Conductive Layer>

The circular equivalent diameter Ds of the domains observed on the outer surface of the conductive layer is measured in the following manner.

Using a microtome (product name: Leica EM FCS, manufactured by Leica Microsystems), cut out samples including the outer surface of the conductive layer at three positions including the longitudinal center of the conductive layer and L/4 from both ends of the conductive layer to the center, where L is the longitudinal length of the conductive layer. The samples have a thickness of 1 μm.

Evaporate platinum on the surfaces of the samples corresponding to the outer surface of the conductive layer. Arbitrarily select three locations on the platinum-evaporated surface of each sample, and capture images at a magnification of 5000 times using an SEM (product name: S-4800, manufactured by Hitachi High-Tech Corporation). Binarize each of the total of nine images captured, using image processing software (product name: Image-Pro Plus, manufactured by Media Cybernetics, Inc.). Quantify the binarized image using the software's counting function. Calculate the arithmetic mean Ss of the planar areas of the domains included in each of the captured images.

Next, calculate the circular equivalent diameter ($=(4Ss/\pi)^{0.5}$) of the domains from the arithmetic mean Ss of the planar areas of the domains, calculated for each captured image. Next, calculate the arithmetic mean of the circular equivalent diameters of the domains in the captured images to obtain the circular equivalent diameter Ds of the domains observed on the outer surface of the conductive roller to be measured.

<Wall-to-Wall Distance Dms Between Adjacent Domains Observed on Outer Surface of Conductive Roller>

Using a razor, cut out samples including the outer surface of the conductive roller at three positions including the longitudinal center of the conductive layer and positions L/4 from both ends of the conductive layer to the center, where L is the longitudinal length of the conductive layer, and T is the thickness of the conductive layer. The samples have a size of 2 mm in both the circumferential direction and the longitudinal direction of the conductive layer, with the same thickness as the thickness T of the conductive layer.

In each of the three samples obtained, set 50-μm-square analysis regions at three locations arbitrarily selected on the surface corresponding to the outer surface of the conductive roller. Capture images of the three analysis regions at a magnification of 5000 times, using an SEM (product name: S-4800, manufactured by Hitachi High-Tech Corporation). Binarize each of the total of nine images captured, using image processing software (product name LUZEX, manufactured by NIRECO CORPORATION).

The binarization procedure is similar to that in determining the domain-to-domain distance Dm described above. Determine the wall-to-wall distances of the domains in each of the binarized images of the nine captured images, and calculate the arithmetic mean thereof. The resulting value is employed as the adjacent wall-to-wall distance Dms.

<Measurement of Surface Roughness Ra>

The surface roughness Ra is measured according to JIS B 0601-1994 surface roughness standard, using a surface roughness measuring instrument (product name: SE-3500, manufactured by Kosaka Laboratory Ltd.). Measure six locations randomly selected on the surface of the conductive roller, and calculate the arithmetic mean as Ra. Here, the cut-off value is 0.8 mm, and the evaluation length is 8 mm.

[Configuration Included in Exemplary Embodiment of Present Disclosure]

The present disclosure includes the following configurations:

(Configuration 1) A process cartridge including toner, a toner accommodation unit configured to accommodate the toner, an electrophotographic photosensitive member, a charging unit configured to charge a surface of the electrophotographic photosensitive member, a cleaning unit configured to remove residual toner from a region upstream of the charging unit, and a developing unit configured to develop an electrostatic latent image formed on the surface of the electrophotographic photosensitive member with toner to form a toner image on the surface of the electrophotographic photosensitive member, (I) wherein the charging unit includes a conductive member disposed to be able to contact the electrophotographic photosensitive member, wherein the cleaning unit includes a cleaning blade disposed to be able to contact the electrophotographic photosensitive member, wherein the conductive member includes a support having a conductive outer surface and a conductive layer disposed on the outer surface of the support, the conductive layer has a matrix-domain structure including a matrix and a plurality of domains dispersed in the matrix, the matrix contains a first rubber, the domains contain a second rubber, and a surface of the conductive member has a surface roughness Ra of 2.00 μm or less, and wherein G1 and G2 both fall within a range of 1.0 N/mm$^2$ or more and 10.0 N/mm$^2$ or less, and an absolute value of a difference between G1 and G2 is 0.1 N/mm$^2$ or more and 7.0 N/mm$^2$ or less, where G1 is a Martens hardness of the matrix measured at the outer surface of the conductive member under a load of 1 mN, and G2 is a Martens hardness of the domains measured at the outer surface of the conductive member under a load of 1 mN, and (II) wherein the toner includes at least toner particles, with agglomerates containing silica fine particles and binding components on surfaces of the toner particles, wherein CI is 1% by number or more and 15% by number or less, where CI (% by number) is a ratio by number of toner particles with the agglomerates, wherein CI, Ca, and Cb satisfy the following inequalities (1) and (2):

$$0.90 \leq Ca/CI \leq 1.00, \text{ and} \quad \text{inequality (1)}$$

$$0.01 \leq Cb/CI \leq 0.10, \quad \text{inequality (2)}$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

ultrasonic condition A: an output frequency of 30 kHz, an output power of 0.75 W, and an irradiation time of 300 s, and ultrasonic condition B: an output frequency of 30 kHz, an output power of 35 W, and an irradiation time of 300 s, and wherein a relationship of Dms<Ag is satisfied, where Dms is an arithmetic mean of distances between adjacent domains at the outer surface of the conductive roller, and Ag is an arithmetic mean of Feret diameters of the agglomerates.

(Configuration 2) The process cartridge according to configuration 1, wherein an area ratio of the binding components of an agglomerate on a surface of a toner particle with the agglomerate, observed under a scanning electron microscope is 5% or more and 50% or less with respect to the entire agglomerate.

(Configuration 3) The process cartridge according to configuration 1 or 2, wherein the Martens hardnesses G1 and G2 satisfy a relationship of G1<G2.

(Configuration 4) The process cartridge according to any one of configurations 1 to 3, wherein the arithmetic mean Dms of closest distances between the domains is 200 nm or more and 2000 nm or less.

(Configuration 5) The process cartridge according to any one of configurations 1 to 4, wherein the arithmetic mean Ag of the Feret diameters of the agglomerates is 1000 nm or more and 8000 nm or less.

(Configuration 6) The process cartridge according to any one of configurations 1 to 5, wherein the domains contain an electron conductive agent.

(Configuration 7) The process cartridge according to any one of configurations 1 to 6, wherein the matrix has a volume resistivity higher than $1.00\times10^{12}$ Ω·cm and lower than or equal to $1.00\times10^{17}$ Ω·cm.

(Configuration 8) The process cartridge according to any one of configurations 1 to 7, wherein the toner contains a layered composite compound as an external additive.

(Configuration 9) The process cartridge according to configuration 8, wherein the layered composite compound contains fluorine.

(Configuration 10) The process cartridge according to configuration 8 or 9, wherein the layered composite compound is hydrotalcite.

(Configuration 11) A process cartridge set including a first cartridge and a second cartridge configured to be detachably attached to a main body of an electrophotographic apparatus, (I) wherein the first cartridge includes a charging unit configured to charge a surface of an electrophotographic photosensitive member, a cleaning unit configured to remove residual toner from a region upstream of the charging unit, and a first frame configured to support the charging unit and the cleaning unit, and wherein the second cartridge includes a toner container configured to accommodate toner with which an electrostatic latent image formed on the surface of the electrophotographic photosensitive member is developed to form a toner image on the surface of the electrophotographic photosensitive member, (II) wherein the charging unit includes a conductive member disposed to contact the electrophotographic photosensitive member, wherein the cleaning unit includes a cleaning blade disposed to contact the electrophotographic photosensitive member, wherein the conductive member includes a support having a conductive outer surface and a conductive layer disposed on the outer surface of the support, the conductive layer has a matrix-domain structure including a matrix and a plurality of domains dispersed in the matrix, the matrix contains a first rubber, the domains contain a second rubber, and a surface of the conductive member has a surface roughness Ra of 2.00 μm or less, and wherein G1 and G2 both fall within a range of 1.0 N/mm$^2$ or more and 10.0 N/mm$^2$ or less, and an absolute value of a difference between G1 and G2 is 0.1 N/mm$^2$ or more and 7.0 N/mm$^2$ or less, where G1 is a Martens hardness of the matrix measured at the outer surface of the conductive member under a load of 1 mN, and G2 is a Martens hardness of the domains measured at the outer surface of the conductive member under a load of 1 mN, and (III) wherein the toner includes at least toner particles, with agglomerates containing silica fine particles and binding components on surfaces of the toner particles, wherein CI is 1% by number or more and 15% by number or less, where CI (% by number) is a ratio by number of toner particles with the agglomerates, wherein CI, Ca, and Cb satisfy the following inequalities (1) and (2):

$$0.90 \le Ca/CI \le 1.00, \text{ and} \quad \text{inequality (1)}$$

$$0.01 \le Cb/CI \le 0.10, \quad \text{inequality (2)}$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

ultrasonic condition A: an output frequency of 30 kHz, an output power of 0.75 W, and an irradiation time of 300 s, and ultrasonic condition B: an output frequency of 30 kHz, an output power of 35 W, and an irradiation time of 300 s, and wherein a relationship of Dms<Ag is satisfied, where Dms is an arithmetic mean of distances between adjacent domains at the outer surface of the conductive roller, and Ag is an arithmetic mean of Feret diameters of the agglomerates.

PRACTICAL EXAMPLES

The present exemplary embodiment will be described in more detail in conjunction with the following manufacturing examples and practical examples. However, these examples are not intended to limit the invention. Note that "parts" in the manufacturing examples and practical examples are all on a mass basis unless otherwise specified.

Manufacturing examples of toner particles will now be described.

<Preparation of Resin Particle Dispersion 1>

Seventy-eight point zero parts of styrene, 20.7 parts of butyl acrylate, 1.3 parts of acrylic acid as a carboxyl group-providing monomer, and 3.2 parts of n-lauryl mercaptan were mixed and dissolved. To this solution, a solution of 2.0 parts of sodium linear alkylbenzene sulfonate (product name: Neogen RK, manufactured by Dai-ichi Kogyo Seiyaku Co., Ltd.) dissolved in 150 parts of ion-exchanged water was added in its entirety and dispersed.

While the liquid was gently stirring for an additional 10 minutes, a solution of 0.3 parts of potassium persulfate and 10 parts of ion-exchanged water was added. After nitrogen substitution, emulsion polymerization was performed at 70° C. for 6 hours. After the polymerization was completed, the reaction solution was cooled to room temperature. Ion-exchanged water was added to obtain resin particle dispersion 1 with a solid content concentration of 12.5% by mass and a volume-based median diameter of 0.2 μm.

<Preparation of Release Agent Dispersion 1>

One hundred parts of a release agent (behenyl behenate, melting point: 72.1° C.) and 15 parts of aliphatic alcohol alkylene oxide adduct were mixed with 385 parts of ion-exchanged water, and dispersed for about 1 hour using a wet jet mill JN100 (manufactured by Jokoh Co., Ltd.) to obtain release agent dispersion 1. The concentration of release agent dispersion 1 was 20% by mass.

<Preparation of Coloring Agent Dispersion 1>

One hundred parts of carbon black "Nipex 35 (manufactured by Orion Engineered Carbons)" as a coloring agent and 15 parts of aliphatic alcohol alkylene oxide adduct were mixed with 885 parts of ion-exchanged water. The resulting mixture was dispersed for about 1 hour using the wet jet mill JN100 to obtain coloring agent dispersion 1.

<Fabrication Example of Toner Core Particle Dispersion 1>

(Dispersion Process)

Using a homogenizer (Ultra-Turrax T50, manufactured by IKA Works, Inc.), 265 parts of resin particle dispersion 1, 10 parts of release agent dispersion 1, 10 parts of coloring agent dispersion 1, 2.9 parts of aliphatic alcohol alkylene oxide adduct, and 0.6 parts of linear alkylbenzene sulfonic acid sodium salt (Neogen RK) were dispersed. During stirring, the temperature inside the container was adjusted to 30° C., and a 1-mol/l sodium hydroxide aqueous solution was added to adjust the pH to 8.0.

(Aggregation Process)

As an aggregation agent, a solution of 0.08 parts of aluminum chloride dissolved in 10 parts of ion-exchanged water was added over a period of 10 minutes while the dispersion was stirred at 30° C. After the resulting liquid was left to stand for 3 minutes, heating was started and the temperature was raised to 50° C. to form associated particles. In this state, the associated particles were measured for particle diameter, using "Coulter Counter Multisizer 3" (registered trademark, manufactured by Beckman Coulter, Inc.). When the weight average particle diameter reached 7.0 μm, 0.9 parts of sodium chloride and 5.0 parts of aliphatic alcohol were added to stop particle growth.

After a 1-mol/l sodium hydroxide aqueous solution was added to adjust the pH to 9.0, the temperature was raised to 95° C. to spheroidize the aggregated particles. When the average circularity reached 0.980, cooling was started and the dispersion was cooled to room temperature to obtain toner core particle dispersion 1.

<Fabrication Example of Monomer Dispersion 1 Containing Silica and Binding Components>

One hundred parts of styrene, 20 parts of methacryloxypropyltrimethoxysilane, and 100 parts of colloidal silica were dispersed using the homogenizer (Ultra-Turrax T50, manufactured by IKA Works, Inc.). The temperature inside the container was adjusted to 25° C. and the dispersion was stirred for 1 hour to obtain monomer dispersion 1 containing silica and binding components.

<Fabrication Examples of Monomer Dispersions 2 to 12 Containing Silica and Binding Components>

Monomer dispersions 2 to 12 containing silica and binding components were obtained in a similar manner as with the preparation of monomer dispersion 1 containing silica and binding components, except that the numbers of parts and the material types were changed as listed in Table 1.

TABLE 1

| | | | Binding components | | Silica | | |
|---|---|---|---|---|---|---|---|
| | Monomer A | Number of parts added in dispersion process [parts] | Monomer B | Number of parts added in dispersion process [parts] | Type | Particle diameter [nm] | Number of parts added in dispersion process [parts] |
| Monomer dispersion 1 | styrene | 100 | methacryloxypropyl-trimethoxysilane | 20 | colloidal silica | 105 | 100 |
| Monomer dispersion 2 | styrene | 100 | methacryloxypropyl-trimethoxysilane | 10 | colloidal silica | 105 | 100 |
| Monomer dispersion 3 | styrene | 100 | methacryloxypropyl-trimethoxysilane | 30 | colloidal silica | 105 | 100 |
| Monomer dispersion 4 | styrene | 100 | methacryloxypropyl-trimethoxysilane | 20 | colloidal silica | 105 | 75 |
| Monomer dispersion 5 | styrene | 100 | methacryloxypropyl-trimethoxysilane | 20 | colloidal silica | 105 | 80 |
| Monomer dispersion 6 | styrene | 30 | methacryloxypropyl-trimethoxysilane | 15 | colloidal silica | 105 | 120 |
| Monomer dispersion 7 | styrene | 40 | methacryloxypropyl-trimethoxysilane | 0 | colloidal silica | 105 | 125 |
| Monomer dispersion 8 | styrene | 100 | methacryloxypropyl-trimethoxysilane | 20 | fumed silica | 15 | 100 |
| Monomer dispersion 9 | styrene | 100 | methacryloxypropyl-trimethoxysilane | 20 | fumed silica | 35 | 100 |
| Monomer dispersion 10 | — | — | — | — | colloidal silica | 105 | 100 |
| Monomer dispersion 11 | styrene | 120 | methacryloxypropyl-trimethoxysilane | 0 | colloidal silica | 105 | 100 |
| Monomer dispersion 12 | styrene | 100 | methacryloxypropyl-trimethoxysilane | 40 | colloidal silica | 105 | 100 |

<Fabrication Example of Hydrotalcite 1>

A mixed aqueous solution (solution A) of 1.03-mol/l magnesium chloride and 0.239-mol/l aluminum sulfate, a 0.753-mol/l sodium carbonate aqueous solution (solution B), and a 3.39-mol/l sodium hydroxide aqueous solution (solution C) were prepared. Next, using metering pumps, solutions A, B, and C were added into a reaction vessel at flow rates such that the volume ratio of solution A to solution B was 4.5:1. The pH of the reaction liquid was maintained in the range of 9.3 to 9.6 using solution C, and a precipitate was generated at a reaction temperature of 40° C. After filtration and washing, the precipitate was re-emulsified in ion-exchanged water to obtain raw hydrotalcite slurry. The concentration of hydrotalcite in the obtained hydrotalcite slurry was 5.6% by mass.

The obtained hydrotalcite slurry was dried under vacuum overnight at 40° C. NaF was dissolved in ion-exchanged water to a concentration of 100 mg/L, and the solution was adjusted to pH 7.0 using 1-mol/l HCl or 1-mol/l NaOH. The dried hydrotalcite was added to this solution at 0.1% (w/v %). Using a magnetic stirrer, the mixture was stirred at a constant speed for 48 hours to prevent sedimentation. The mixture was then filtered through a membrane filter with a pore size of 0.5 μm, followed by washing with ion-exchanged water. The resulting hydrotalcite was dried under vacuum overnight at 40° C. and then subjected to a crushing process. Table 2 describes the composition and physical properties of the obtained hydrotalcite 1.

<Fabrication Example of Hydrotalcite 2>

A mixed aqueous solution (solution A) of 1.03-mol/l magnesium chloride and 0.239-mol/l aluminum sulfate, a 0.753-mol/l sodium carbonate aqueous solution (solution B), and a 3.39-mol/l sodium hydroxide aqueous solution (solution C) were prepared.

Next, using metering pumps, solutions A, B, and C were added into a reaction vessel at flow rates such that the volume ratio of solution A to solution B was 4.5:1. The pH of the reaction liquid was maintained in the range of 9.3 to 9.6 using solution C, and a precipitate was generated at a reaction temperature of 40° C. After filtration and washing, the precipitate was re-emulsified in ion-exchanged water to obtain raw hydrotalcite slurry. The concentration of hydrotalcite in the obtained hydrotalcite slurry was 5.6% by mass. The mixture was then filtered through a membrane filter with a pore size of 0.5 μm, followed by washing with ion-exchanged water. The resulting hydrotalcite was dried under vacuum overnight at 40° C. and then subjected to a crushing process. Table 2 describes the composition and physical properties of the obtained hydrotalcite 2.

TABLE 2

| | Sodium fluoride treatment | F/A1 ratio | Average particle diameter [nm] |
|---|---|---|---|
| Hydrotalcite 1 | yes | 0.12 | 400 |
| Hydrotalcite 2 | no | 0.00 | 400 |

Next, manufacturing examples of toner will be described.

<Manufacturing Example of Toner 1>

Two point seven five parts of monomer dispersion 1 obtained by the foregoing method and 0.005 parts of potassium persulfate were added to 100 parts of toner core particle dispersion 1. The temperature inside the container was adjusted to 90° C., and the mixture was stirred for 2 hours using a full-zone stirring blade to obtain toner particle dispersion 1.

Hydrochloric acid was added to the obtained toner particle dispersion 1 to adjust the pH to 1.5 or lower. After stirred and let stand for 1 hour, the mixture was separated into solid and liquid components using a pressure filter to obtain a toner cake. The resulting toner cake was re-slurried with ion-exchanged water to form a dispersion again, which was then separated into solid and liquid components using the foregoing filter. The re-slurrying and solid-liquid separation were repeated until the electrical conductivity of the filtrate fell to or below 5.0 μS/cm. Finally, solid-liquid separation was performed to obtain a toner cake. The obtained toner cake was dried and further classified using a classifier to obtain toner particles 1. The weight average particle diameter of toner particles 1 was 6.9 μm.

One hundred parts of toner particles 1 and 0.4 parts of hydrotalcite 1 were submitted into a fluid mixer (FM mixer; FM10C model manufactured by Nippon Coke & Engineering Co., Ltd.) with 7° C. water circulating in the jacket. After the water temperature in the jacket stabilized at 7° C.±1° C., the mixture was blended for 5 minutes at a blade tip speed of 38 m/sec to obtain toner mixture 1. During this process, the water flow in the jacket was adjusted as appropriate so that the temperature inside the FM mixer did not exceed 25° C. The obtained toner mixture 1 was sieved through a mesh with a pore size of 75 μm to obtain toner 1. Table 3-2 describes the physical properties of the obtained toner 1.

<Manufacturing Examples of Toners 2 to 14 and 17 to 23>

Toners 2 to 14 and 17 to 23 were obtained in a similar manner as with the manufacturing example of toner 1 except that the numbers of parts, material types, and manufacturing conditions were changed as listed in Table 3-1. Table 3-2 lists the physical properties of the obtained toners 2 to 14 and 17 to 23.

<Manufacturing Example of Toner 15>

One point zero zero parts of styrene, 0.25 parts of methacryloxypropyltrimethoxysilane, 1.25 parts of colloidal silica, and 0.005 parts of potassium persulfate were added to 100 parts of toner core particle dispersion 1. The temperature inside the container was adjusted to 90° C., and the mixture was stirred for 2 hours using a full-zone stirring blade to obtain toner particle dispersion 2.

Hydrochloric acid was added to the obtained toner particle dispersion 2 to adjust the pH to 1.5 or lower. After stirred and let stand for 1 hour, the mixture was separated into solid and liquid components using a pressure filter to obtain a toner cake. The resulting toner cake was re-slurried with ion-exchanged water to form a dispersion again, which was then separated into solid and liquid components using the foregoing filter. The re-slurrying and solid-liquid separation were repeated until the electrical conductivity of the filtrate fell to or below 5.0 μS/cm. Finally, solid-liquid separation was performed to obtain a toner cake. The obtained toner cake was dried and further classified using a classifier to obtain toner particles 2. The weight average particle diameter of toner particles 2 was 6.9 μm.

One hundred parts of toner particles 2 and 0.4 parts of hydrotalcite 1 were submitted into the FM mixer (FM10C model manufactured by Nippon Coke & Engineering Co., Ltd.) with 7° C. water circulating in the jacket. After the water temperature in the jacket stabilized at 7° C.±1° C., the mixture was blended for 5 minutes at a blade tip speed of 38 m/sec to obtain toner mixture 15. During this process, the water flow in the jacket was adjusted as appropriate so that the temperature inside the FM mixer did not exceed 25° C.

The obtained toner mixture 15 was sieved through a mesh with a pore size of 75 μm to obtain toner 15. Table 3-2 describes the physical properties of the obtained toner 15.

<Manufacturing Example of Toner 16>

One point two five parts of styrene, 1.25 parts of colloidal silica, and 0.005 parts of potassium persulfate were added to 100 parts of toner core particle dispersion 1. The temperature inside the container was adjusted to 90° C., and the mixture was stirred for 2 hours using a full-zone stirring blade to obtain toner particle dispersion 3.

Hydrochloric acid was added to the obtained toner particle dispersion 3 to adjust the pH to 1.5 or lower. After stirred and let stand for 1 hour, the mixture was separated into solid and liquid components using a pressure filter to obtain a toner cake. The resulting toner cake was re-slurried with ion-exchanged water to form a dispersion again, which was then separated into solid and liquid components using the foregoing filter. The re-slurrying and solid-liquid separation were repeated until the electrical conductivity of the filtrate fell to or below 5.0 μS/cm. Finally, solid-liquid separation was performed to obtain a toner cake. The obtained toner cake was dried and further classified using a classifier to obtain toner particles 3. The weight average particle diameter of toner particles 3 was 7.1 μm.

One hundred parts of toner particles 3 and 0.4 parts of hydrotalcite 1 were submitted into the FM mixer (FM10C model manufactured by Nippon Coke & Engineering Co., Ltd.) with 7° C. water circulating in the jacket. After the water temperature in the jacket stabilized at 7° C.±1° C., the mixture was blended for 5 minutes at a blade tip speed of 38 m/sec to obtain toner mixture 16. During this process, the water flow in the jacket was adjusted as appropriate so that the temperature inside the FM mixer did not exceed 25° C. The obtained toner mixture 16 was sieved through a mesh with a pore size of 75 μm to obtain toner 16. Table 3-2 describes the physical properties of the obtained toner 16.

TABLE 3-1

| | | Monomer dispersion containing silica and binding components | | Additive | | | External additive type | |
|---|---|---|---|---|---|---|---|---|
| Toner No. | Toner particles No. | No | Number of parts [parts] | Type | Number of parts [parts] | Stirring condition | Type | Number of parts [Parts] |
| 1 | 1 | 1 | 2.75 | potassium persulfate | 0.005 | only full-zone stirring impeller | hydrotalcite 1 | 0.4 |
| 2 | 1 | 1 | 0.50 | potassium persulfate | 0.001 | only full-zone stirring impeller | hydrotalcite 1 | 0.4 |
| 3 | 1 | 1 | 6.50 | potassium persulfate | 0.012 | only full-zone stirring impeller | hydrotalcite 1 | 0.4 |
| 4 | 1 | 2 | 2.75 | potassium persulfate | 0.004 | only full-zone stirring impeller | hydrotalcite 1 | 0.4 |
| 5 | 1 | 3 | 2.75 | potassium persulfate | 0.006 | only full-zone stirring impeller | hydrotalcite 1 | 0.4 |
| 6 | 1 | 4 | 2.75 | potassium persulfate | 0.005 | only full-zone stirring impeller | hydrotalcite 1 | 0.4 |
| 7 | 1 | 5 | 2.75 | potassium persulfate | 0.005 | only full-zone stirring impeller | hydrotalcite 1 | 0.4 |
| 8 | 1 | 6 | 2.10 | potassium persulfate | 0.004 | only full-zone stirring impeller | hydrotalcite 1 | 0.4 |
| 9 | 1 | 7 | 2.00 | potassium persulfate | 0.004 | only full-zone stirring impeller | hydrotalcite 1 | 0.4 |
| 10 | 1 | 8 | 5.00 | potassium persulfate | 0.012 | only full-zone stirring impeller | hydrotalcite 1 | 0.4 |
| 11 | 1 | 9 | 5.00 | potassium persulfate | 0.012 | only full-zone stirring impeller | hydrotalcite 1 | 0.4 |
| 12 | 1 | 8 | 3.50 | potassium persulfate | 0.007 | full-zone stirring impeller and homogenizer | hydrotalcite 1 | 0.4 |
| 13 | 1 | 2 | 0.60 | potassium persulfate | 0.001 | full-zone stirring impeller and homogenizer | hydrotalcite 1 | 0.4 |
| 14 | 1 | 2 | 0.60 | potassium persulfate | 0.001 | full-zone stirring impeller and homogenizer | hydrotalcite 1 | 0.4 |
| 15 | 2 | | | described in specification | | | | |
| 16 | 3 | | | described in specification | | | | |
| 17 | 1 | 1 | 2.75 | potassium persulfate | 0.005 | only full-zone stirring impeller | hydrotalcite 2 | 0.4 |

TABLE 3-1-continued

| Toner No. | Toner particles No. | Monomer dispersion containing silica and binding components: No | Monomer dispersion containing silica and binding components: Number of parts [parts] | Additive: Type | Additive: Number of parts [parts] | Stirring condition | External additive type: Type | External additive type: Number of parts [Parts] |
|---|---|---|---|---|---|---|---|---|
| 18 | 1 | 1 | 2.75 | potassium persulfate | 0.005 | only full-zone stirring impeller | — | 0.4 |
| 19 | 1 | 10 | 2.75 | — | — | only full-zone stirring impeller | hydrotalcite 1 | 0.4 |
| 20 | 1 | 1 | 0.40 | potassium persulfate | 0.001 | only full-zone stirring impeller | hydrotalcite 1 | 0.4 |
| 21 | 1 | 1 | 7.00 | potassium persulfate | 0.013 | only full-zone stirring impeller | hydrotalcite 1 | 0.4 |
| 22 | 1 | 11 | 2.75 | potassium persulfate | 0.004 | only full-zone stirring impeller | hydrotalcite 1 | 0.4 |
| 23 | 1 | 12 | 2.75 | potassium persulfate | 0.007 | only full-zone stirring impeller | hydrotalcite 1 | 0.4 |

TABLE 3-2

| | Initial ratio by number CI of agglomerates [% by number] | Ratio by number Ca of agglomerates after processed under condition A [% by number] | Ratio by number Ca of agglomerates after processed under condition B [% by number] | Area ratio of binding components in agglomerates [%] | Feret diameter Ag of agglomerates [μm] | Ratio by number of agglomerates satisfying condition (a) |
|---|---|---|---|---|---|---|
| Toner 1 | 6.4 | 6.3 | 0.2 | 39.7 | 4.12 | 92 |
| Toner 2 | 1.0 | 1.0 | 0.1 | 39.1 | 2.68 | 91 |
| Toner 3 | 15.0 | 14.3 | 0.5 | 40.5 | 7.21 | 91 |
| Toner 4 | 8.1 | 7.3 | 0.1 | 35.3 | 3.65 | 85 |
| Toner 5 | 6.9 | 6.9 | 0.7 | 44.9 | 3.99 | 93 |
| Toner 6 | 4.8 | 4.8 | 0.4 | 50.2 | 7.55 | 99 |
| Toner 7 | 5.5 | 5.5 | 0.4 | 50.0 | 7.49 | 96 |
| Toner 8 | 6.9 | 6.4 | 0.1 | 5.0 | 1.52 | 51 |
| Toner 9 | 7.9 | 7.2 | 0.1 | 4.9 | 1.35 | 38 |
| Toner 10 | 12.0 | 11.0 | 0.1 | 33.5 | 8.11 | 89 |
| Toner 11 | 10.1 | 9.6 | 0.1 | 35.2 | 7.85 | 91 |
| Toner 12 | 8.9 | 8.7 | 0.3 | 39.9 | 8.11 | 91 |
| Toner 13 | 4.3 | 3.9 | 0.3 | 45.1 | 1.00 | 95 |
| Toner 14 | 2.3 | 2.1 | 0.2 | 47.2 | 0.99 | 96 |
| Toner 15 | 5.5 | 5.4 | 0.2 | 44.3 | 4.69 | 55 |
| Toner 16 | 5.0 | 4.6 | 0.2 | 46.8 | 6.61 | 49 |
| Toner 17 | 6.4 | 6.3 | 0.2 | 39.2 | 4.12 | 92 |
| Toner 18 | 6.4 | 6.3 | 0.2 | 39.5 | 4.12 | 92 |
| Toner 19 | — | — | — | — | — | — |
| Toner 20 | 0.5 | 0.5 | 0.0 | 38.1 | 1.33 | 92 |
| Toner 21 | 16.0 | 15.5 | 0.2 | 41.2 | 7.48 | 92 |
| Toner 22 | 7.1 | 6.2 | 0.1 | 30.6 | 4.12 | 66 |
| Toner 23 | 6.0 | 5.9 | 0.8 | 48.8 | 4.12 | 98 |

Manufacturing examples of conductive rollers for the charging unit of the process cartridge will be described.

<Manufacturing Example of Conductive Roller 1>

(1. Preparation of Conductive Layer-Forming Rubber Mixture)

[1-1. Preparation of Domain-Forming Rubber Mixture (CMB)]

The materials listed in Table 4 were mixed in the quantities listed in Table 4, using a 6-liter pressurized kneader (product name: TD6-15MDX, manufactured by TOSHIN Co., Ltd.) to obtain a CMB. The mixing conditions were a filling ratio of 70% by volume, a number of blade rotations of 30 rpm, and a duration of 30 minutes.

TABLE 4

| | Raw material name | Quantity (parts) |
|---|---|---|
| Base rubber | SBR (Product name: Tufden 1000, manufactured by Asahi Kasei Corporation) | 100 |
| Electronic conductive agent | carbon black (Product name: Toka Black #5500, manufactured by Tokai Carbon Co., Ltd.) | 60 |

TABLE 4-continued

| | Raw material name | Quantity (parts) |
|---|---|---|
| Vulcanization accelerator aid | zinc oxide (Product name: Zinc White, manufactured by Sakai Chemical Industry Co., Ltd.) | 5 |
| Processing aid | zinc stearate (Product name: SZ-2000, manufactured by Sakai Chemical Industry Co., Ltd.) | 2 |

[1-2. Preparation of Matrix-Forming Rubber Mixture (MRC)]

The materials listed in Table 5 were mixed in the quantities listed in Table 5, using the 6-liter pressurized kneader (product name: TD6-15MDX, manufactured by TOSHIN Co., Ltd.) to obtain an MRC. The mixing conditions were a filling ratio of 70% by volume, a number of blade rotations of 30 rpm, and a duration of 16 minutes.

TABLE 5

| | Raw material name | Quantity (parts) |
|---|---|---|
| Base rubber | butyl rubber (Product name: JSR Butyl 065, manufactured by JSR Corporation) | 100 |
| Filler | calcium carbonate (Product name: Nanox #30, manufactured by Maruo Calcium Co., Ltd.) | 70 |
| Vulcanization accelerator aid | zinc oxide (Product name: Zinc White, manufactured by Sakai Chemical Industry Co., Ltd.) | 7 |
| Processing aid | zinc stearate (Product name: SZ-2000, manufactured by Sakai Chemical Industry Co., Ltd.) | 2.8 |

[1-3. Preparation of Conductive Layer-Forming Unvulcanized Rubber Mixture]

The CMB and MRC obtained as described above were mixed in the quantities listed in Table 6, using the 6-liter pressurized kneader (product name: TD6-15MDX, manufactured by TOSHIN Co., Ltd.). The mixing conditions were a filling ratio of 70% by volume, a number of blade rotations of 30 rpm, and a duration of 20 minutes.

TABLE 6

| | Raw material name | Quantity (parts) |
|---|---|---|
| Base rubber | domain-forming rubber mixture | 25 |
| Base rubber | matrix-forming rubber mixture | 75 |

Next, for 100 parts of the CMB and MRC mixture, vulcanizing agents and vulcanization accelerators were added in the quantities listed in Table 7, and mixed using an open roll with a roll diameter of 12 inches (0.30 m) to prepare a conductive layer-forming rubber mixture.

The mixing conditions were a number of front roll rotations of 10 rpm, a number of back roll rotations of 8 rpm, and a roll gap of 2 mm. After the mixture was rolled back and forth a total of 20 times, the roll gap was set to 0.5 mm, and the mixture was passed through 10 times for thinning.

TABLE 7

| | Raw material name | Quantity (parts) |
|---|---|---|
| Vulcanizing agent | sulfur (Product name: Sulfax PMC, manufactured by Tsurumi Chemical Industry Co., Ltd.) | 3 |
| Vulcanization accelerator | tetramethylthiuram disulfide (Product name: TT, manufactured by Ouchi Shinko Chemical Industrial Co., Ltd.) | 3 |

(2. Fabrication of Conductive Roller)

[2-1. Fabrication of Support with Conductive Outer Surface]

As a support with a conductive outer surface, a round rod with a total length of 252 mm and an outer diameter of 6 mm was prepared by applying electroless nickel plating to the surface of a stainless steel (SUS) rod.

[2-2. Molding of Conductive Layer]

A die with an inner diameter of 12.5 mm was attached to the tip of a crosshead extruder equipped with a supply mechanism for the support and a dispensing mechanism for the unvulcanized rubber roller. The temperature of the extruder and crosshead was adjustment to 80° C., and the feed rate of the support to 60 mm/sec. Under such conditions, the conductive layer-forming rubber mixture was supplied from the extruder to coat the outer periphery of the support with the conductive layer-forming rubber mixture inside the crosshead, whereby an unvulcanized rubber roller was obtained.

Next, the unvulcanized rubber roller was placed in a hot-air vulcanization oven at 160° C. and heated for 60 minutes to vulcanize the conductive layer-forming rubber mixture, whereby a roller with a conductive layer formed on the outer periphery of the support was obtained. Both ends of the conductive layer were then cut off by 12.25 mm each, making the longitudinal length of the conductive layer portion 228 mm.

Finally, the surface of the conductive layer was polished with a rotating grindstone. Conductive roller 1 having a crown shape, with a diameter of 8.44 mm at positions 90 mm from the center to the respective ends and a center diameter of 8.5 mm was thereby obtained.

<Manufacturing Examples of Conductive Rollers 2 to 9>

Conductive rollers 2 to 9 were manufactured in a similar manner as with conductive roller 1 except that the materials and conditions listed in Tables 9-1 and 9-2 were used for the base rubber, conductive agent, vulcanizing agent, and vulcanization accelerator.

As for details of the materials listed in Tables 9-1 and 9-2, Table 10-1 lists the rubber materials, Table 10-2 the conductive agents, and Table 10-3 the vulcanizing agents and vulcanization accelerators.

<Manufacturing Example of Comparative Conductive Roller 1>

Conductive roller C1 was manufactured in a similar manner as with conductive roller 1 except for the use of the materials and conditions described in Tables 9-1 and 9-2. Comparative conductive roller 1 was then manufactured by forming a conductive resin layer on conductive roller C1 based on the method described below. The manufactured comparative conductive roller 1 was subjected to a similar measurement and evaluation as with comparative roller 1.

(Formation of Conductive Resin Layer)

Methyl isobutyl ketone was added as a solvent to a caprolactone-modified acrylic polyol solution, whereby the solid content was adjusted to 10% by mass. Using the materials listed in the following Table 8, a mixed solution was prepared with 1000 parts of this acrylic polyol solution (100 parts of solid content). The mixture of blocked hexamethylene diisocyanate (HDI) and blocked isophorone diisocyanate (IPDI) was "NCO/OH=1.0".

TABLE 8

| | Raw material name | Quantity (parts) |
|---|---|---|
| Main agent | caprolactone-modified acrylic polyol solution (solid content: 70% by mass) (product name: PLACCEL DC2016, manufactured by Daicel Corporation) | 100 (solid content) |
| Curing agent 1 | blocked isocyanate A (IPDI, solid content: 60% by mass) (product name: VESTANAT B1370, manufactured by Degussa Japan Co., Ltd) | 37 (solid content) |
| Curing agent 2 | blocked isocyanate B (HDI, solid content 80% by mass) (Product name: DURANATE TPA-B80E, manufactured by Asahi Kasei Chemicals Corporation) | 24 (solid content) |
| Conductive agent | carbon black (high abrasion furnace [HAF]) (Product name: Seast3, manufactured by Tokai Carbon Co., Ltd.) | 15 |
| Additive 1 | needle-like rutile titanium dioxide fine particles (Product name: MT-100T, manufactured by Tayca Corporation) | 35 |

TABLE 8-continued

| | Raw material name | Quantity (parts) |
|---|---|---|
| Additive 2 | modified dimethyl silicone oil (Product name: SH28PA, manufactured by Toray Dow Corning Silicone Co., Ltd.) | 0.1 |

Next, 210 g of the foregoing mixed solution and 200 g of glass beads with an average particle diameter of 0.8 mm as media were mixed in a 450-ml glass bottle. This mixture was pre-dispersed for 24 hours using a paint shaker disperser to obtain a paint for forming the conductive resin layer.

Conductive roller C1 was immersed in the paint for forming the conductive resin layer with its longitudinal direction vertical, whereby conductive roller C1 was dip-coated. The immersion time for the dip coating was 9 seconds. The initial withdrawal speed was 20 mm/sec and the final withdrawal speed was 2 mm/sec, between which the withdrawal speed was linearly changed over time.

The resulting coated object was air-dried at room temperature for 30 minutes, and then dried for 1 hour in a hot-air circulation dryer set at 90° C. The article was further dried for 1 hour in a hot-air circulation dryer set at 160° C. to obtain comparative conductive roller 1.

<Manufacturing Examples of Comparative Conductive Rollers 2 and 3>

Comparative conductive rollers 2 to 4 were manufactured in a similar manner as with conductive roller 1 except for the use of the materials and conditions listed in Tables 9-1 to 9-3. The manufactured comparative conductive rollers 2 and 3 were subjected to a similar measurement and evaluation as with conductive roller 1.

Tables 11-1 and 11-2 list the physical properties of the manufactured conductive rollers 1 to 6 and comparative conductive rollers 1 to 3.

TABLE 9-1

| | Domain-forming rubber mixture | | | | | | | | |
|---|---|---|---|---|---|---|---|---|---|
| | Base rubber | | | | | | | Dispersion | |
| | Domain material | Material abbreviation | SP value | Mooney viscosity | Conductive agent Type | Parts | DBP | time (min) | Mooney viscosity |
| Conductive roller 1 | SBR | T1000 | 16.8 | 45 | #5500 | 60 | 155 | 30 | 84 |
| Conductive roller 2 | SBR | T1000 | 16.8 | 45 | #7360 | 45 | 87 | 30 | 65 |
| Conductive roller 3 | NBR | N202S | 20.4 | 51 | #5500 | 80 | 155 | 30 | 105 |
| Conductive roller 4 | NBR | DN401 | 17.4 | 32 | #7360 | 60 | 87 | 30 | 51 |
| Conductive roller 5 | SBR | T2003 | 17.0 | 45 | — | — | — | — | 45 |
| Conductive roller 6 | Butyl | JSR Butyl 065 | 15.8 | 32 | #5500 | 65 | 155 | 30 | 93 |
| Comparative conductive roller 1 | NBR | N230SV | 17.1 | 43 | #7360 | 80 | 87 | 30 | 85 |
| Comparative conductive roller 2 | Butyl | JSR Butyl 065 | 15.8 | 32 | Ketjen | 12 | 360 | 30 | 50 |
| Comparative conductive roller 3 | NBR | N202S | 20.4 | 51 | #5500 | 80 | 155 | 30 | 105 |
| Comparative conductive roller 4 | SBR | T1000 | 16.8 | 45 | #5500 | 60 | 155 | 30 | 75 |

Regarding the Mooney viscosities in Table 9-1, those of the raw materials are the catalog values from the respective companies. The Mooney viscosities of the mixtures were measured as Mooney viscosity $ML_{(1+4)}$ at the rubber temperature during kneading.

The unit of the SP value is $(J/cm^3)^{0.5}$. DBP represents the DBP absorption ($cm^3$/100 g).

TABLE 9-2

| | Matrix-forming rubber mixture | | | | | | |
|---|---|---|---|---|---|---|---|
| | Base rubber | | | | | | |
| | Material | | SP value | Mooney viscosity | Conductive agent Type | Conductive agent Parts | Mooney viscosity |
| Conductive roller 1 | Butyl | JSR Butyl 065 | 15.80 | 32 | — | — | 40 |
| Conductive roller 2 | SBR | A303 | 17.00 | 46 | — | — | 52 |
| Conductive roller 3 | Butyl | JSR Butyl 065 | 15.80 | 32 | — | — | 40 |
| Conductive roller 4 | Butyl | JSR Butyl 065 | 15.80 | 32 | — | — | 40 |
| Conductive roller 5 | NBR | N230SV | 19.20 | 32 | #7360 | 60 | 74 |
| Conductive roller 6 | SBR | T2003 | 17.00 | 33 | — | — | 52 |
| Comparative conductive roller 1 | — | — | — | — | — | — | — |
| Comparative conductive roller 2 | EPDM | Esplene 301A | 17.00 | 44 | — | — | 90 |
| Comparative conductive roller 3 | Butyl | JSR Butyl 065 | 15.80 | 32 | — | — | 40 |
| Comparative conductive roller 4 | NBR | N260S | 17.20 | 46 | — | — | 51 |

TABLE 9-3

| | Unvulcanized rubber composition | | Unvulcanized rubber dispersion | | | | |
|---|---|---|---|---|---|---|---|
| | Domain [parts] | Matrix [parts] | Number of rotations [rpm] | Kneading time [min] | Vulcanizing agent sulfur [parts] | Vulcanization accelerator Abbreviation | Vulcanization accelerator Parts |
| Conductive roller 1 | 25 | 75 | 30 | 20 | 3 | TT | 3 |
| Conductive roller 2 | 15 | 85 | 30 | 20 | 3 | TT | 3 |
| Conductive roller 3 | 23 | 77 | 30 | 16 | 3 | TT | 3 |
| Conductive roller 4 | 25 | 75 | 30 | 20 | 3 | TT | 3 |
| Conductive roller 5 | 75 | 25 | 30 | 20 | 3 | TBZTD | 1 |
| Conductive roller 6 | 24 | 76 | 30 | 20 | 2 | TT | 2 |
| Comparative conductive roller 1 | 100 | 0 | — | — | 3 | TBZTD | 1 |
| Comparative conductive roller 2 | 22 | 78 | 30 | 20 | 3 | TET | 3 |
| Comparative conductive roller 3 | 25 | 75 | 30 | 20 | 3 | TT | 3 |
| Comparative conductive roller 4 | 25 | 75 | 30 | 20 | 3 | TET | 3 |

Regarding the Mooney viscosities in Table 9-2, those of the raw materials are the catalog values from the respective companies. The Mooney viscosities of the mixtures were measured as Mooney viscosity $ML_{(1+4)}$ at the rubber temperature during kneading.

TABLE 10-1

| Material abbreviation | | Material name | Product name | Manufacturer name |
|---|---|---|---|---|
| Butyl | JSR Butyl 065 | butyl rubber | JSR Butyl 065 | JSR Corporation |
| EPDM | Esplene 301A | ethylene propylene diene rubber | Esplene 301A | Sumitomo Chemical Co., Ltd. |
| NBR | DN401 | acrylonitrile butadiene rubber | Nipol DN401LL | Zeon Corporation |
| NBR | N230SV | acrylonitrile butadiene rubber | NBR N230SV | JSR Corporation |
| NBR | N202S | acrylonitrile butadiene rubber | NBR N202S | JSR Corporation |
| NBR | N230S | acrylonitrile butadiene rubber | NBR N230S | JSR Corporation |
| SBR | T2003 | styrene butadiene rubber | Tufden 2003 | Asahi Kasei Corporation |
| SBR | T1000 | styrene butadiene rubber | Tufden 1000 | Asahi Kasei Corporation |
| SBR | A303 | styrene butadiene rubber | Asapren A303 | Asahi Kasei Corporation |

TABLE 10-2

| Material abbreviation | Material name | Product name | Manufacturer name |
|---|---|---|---|
| #7360 | conductive carbon black | Toka Black #7360SB | Tokai Carbon Co., Ltd. |
| #5500 | conductive carbon black | Toka Black #5500 | Tokai Carbon Co., Ltd. |
| Ketjen | conductive carbon black | Carbon ECP | Lion Specialty Chemicals Co., Ltd. |

TABLE 10-3

| Material abbreviation | Material name | Product name | Manufacturer name |
|---|---|---|---|
| TT | tetramethylthiuram disulfide | Toka Black #7360SB | Tokai Carbon Co., Ltd. |
| TBZTD | tetrabenzylthiuram disulfide | Toka Black #5500 | Tokai Carbon Co., Ltd. |
| TET | tetraethylthiuram disulfide | Carbon ECP | Lion Specialty Chemicals Co., Ltd. |

TABLE 11-1

| | MD structure | Ra [μm] | Matrix hardness G1 [N/mm$^2$] | Domain hardness G2 [N/mm$^2$] | Absolute value of difference between G1 and G2 [N/mm$^2$] | Relationship of G1 and G2 |
|---|---|---|---|---|---|---|
| Conductive roller 1 | yes | 0.85 | 1.9 | 2.3 | 0.4 | G1 < G2 |
| Conductive roller 2 | yes | 2.00 | 3.4 | 4.2 | 0.8 | G1 < G2 |
| Conductive roller 3 | yes | 0.84 | 3.7 | 10.5 | 6.8 | G1 < G2 |
| Conductive roller 4 | yes | 0.85 | 2.0 | 2.1 | 0.1 | G1 < G2 |
| Conductive roller 5 | yes | 0.83 | 2.6 | 2.1 | 0.5 | G1 < G2 |
| Conductive roller 6 | yes | 0.82 | 3.7 | 4.4 | 0.7 | G1 < G2 |
| Comparative conductive roller 1 | no | 0.92 | — | — | — | — |
| Comparative conductive roller 2 | yes | 2.10 | 1.9 | 2.3 | 0.4 | G1 < G2 |
| Comparative conductive roller 3 | yes | 0.85 | 1.9 | 10.5 | 8.6 | G1 < G2 |

TABLE 11-2

| | Dms [μm] | Dm [μm] | σm/Dm | Domain diameter D [μm] | Domain diameter Ds [μm] | σd/D | R1 [Ω · cm] | R2 [Ω · cm] | R1/R2 |
|---|---|---|---|---|---|---|---|---|---|
| Conductive roller 1 | 0.25 | 0.22 | 0.24 | 0.20 | 0.20 | 0.25 | $5.83 \times 10^{16}$ | $1.66 \times 10^{1}$ | $3.51 \times 10^{15}$ |
| Conductive roller 2 | 0.47 | 0.44 | 0.26 | 0.44 | 0.44 | 0.26 | $2.11 \times 10^{12}$ | $2.60 \times 10^{6}$ | $8.12 \times 10^{6}$ |
| Conductive roller 3 | 1.27 | 1.24 | 0.37 | 1.21 | 1.21 | 0.26 | $5.09 \times 10^{16}$ | $4.10 \times 10^{1}$ | $1.24 \times 10^{15}$ |
| Conductive roller 4 | 0.37 | 0.35 | 0.25 | 0.38 | 0.38 | 0.25 | $5.83 \times 10^{16}$ | $4.80 \times 10^{3}$ | $1.21 \times 10^{13}$ |
| Conductive roller 5 | 3.10 | 2.20 | 0.41 | 2.50 | 2.50 | 0.47 | $9.20 \times 10^{2}$ | $2.60 \times 10^{15}$ | $3.54 \times 10^{-13}$ |
| Conductive roller 6 | 1.33 | 1.22 | 0.22 | 1.20 | 1.20 | 0.24 | $2.62 \times 10^{12}$ | $6.23 \times 10^{1}$ | 4.14 × 1010 |
| Comparative conductive roller 1 | — | — | — | — | — | — | — | — | — |
| Comparative conductive roller 2 | 0.34 | 0.24 | 0.25 | 0.34 | 0.34 | 0.24 | $6.42 \times 10^{15}$ | $2.10 \times 10^{2}$ | $3.06 \times 10^{13}$ |
| Comparative conductive roller 3 | 1.27 | 1.24 | 0.37 | 1.21 | 1.21 | 0.26 | $5.09 \times 10^{16}$ | $1.66 \times 10^{1}$ | $3.07 \times 10^{15}$ |

In Table 11-1, the MD structure represents the presence or absence of a matrix-domain structure.

Practical Example 1

An HP Color LaserJet Enterprise M653dn printer was prepared as an electrophotographic apparatus. Next, a process cartridge that was a predetermined cartridge filled with toner 1, conductive roller 1, and the electrophotographic apparatus were stored in a normal-temperature normal-humidity environment (25° C./50% RH) for 48 hours for acclimation to the measurement environment.

Conductive roller 1 stored in the foregoing environment was set as the charging roller of the process cartridge, and mounted in the M653dn printer for evaluation.

This combination of the electrophotographic apparatus and the process cartridge corresponds to the configuration illustrated in FIG. 5.

Note that the M653dn printer was used with the process speed modified to 400 mm/s, taking into consideration printers' further advancement in speed and durability in the future. A4-size color laser copy paper (manufactured by Canon Inc., 80 g/m$^2$) was used as the evaluation paper.

<Evaluation of Image Streaks (Contamination Streaks) Due to Poor Cleaning>

Image streaks due to poor cleaning were evaluated in a normal-temperature normal-humidity environment (25° C./50% RH). Assuming long-term durability testing, a horizontal line pattern with a print coverage of 1% was set up with 2 sheets per job, with the machine configured to pause briefly between jobs before starting the next one. In this mode, a total of 30000 sheets of image output test was conducted, and the number of streaks caused by toner passed through the cleaning on the electrophotographic roller was measured. In the present disclosure, the following rank B and higher were determined to be acceptable for practical use:

A: no streak;

B: one streak;

C: two or three streaks; and

D: four or more streaks.

<Evaluation of Charging Roller Contamination and Density Unevenness>

Charging roller contamination was evaluated in a normal-temperature normal-humidity environment (25° C./50% RH). Assuming long-term durability testing, a horizontal line pattern with a print coverage of 1% was set up with 2 sheets per job, with the machine configured to pause briefly between jobs before starting the next one. In this mode, a total of 30000 sheets of print test was carried out. After the test, the charging roller surface and halftone images were visually inspected and evaluated based on the following criteria:

A: No defects were observed on either the conductive roller surface or the images;

B: Slight stain was observed on the conductive roller surface, but did not appear on the images;

C: Stain was observed on the conductive roller surface, and unevenness in image density started to become noticeable; and D: Stain was observed on the conductive roller surface, and clear unevenness in image density was observed on the images.

In the present disclosure, the foregoing rank B and above were determined to be acceptable for practical use.

<Evaluation of Charge Build-Up Characteristics (Fogging After Storage Under High-Temperature High-Humidity [H/H] Environment)>

Charge build-up characteristics were evaluated in an H/H environment (30° C./80% RH), which is unfavorable for charge build-up characteristics. The evaluation was performed using the modified HP Color LaserJet Enterprise M653dn printer stored in the foregoing environment. Initially, a blank image was printed on an evaluation sheet with a Post-it note attached near the bottom center. The difference in density between the area covered by the Post-it note and the not-covered area was employed as the initial background fogging value. Assuming long-term durability testing, a horizontal line pattern with a print coverage of 1% was set up with 2 sheets per job, with the machine configured to pause briefly between jobs before starting the next one. In this mode, a total of 35000 sheets of print test was performed. Immediately after the printing of 30000 sheets was completed, the machine was powered off for 72 hours, leaving the developer unit inside the machine. After this leaving period, the machine was powered on again, and a similar image as with the initial background fogging test was printed, and the difference in density was assumed as the post-storage fogging value. A reflectance densitometer (Reflectometer Model TC-6DS, manufactured by Tokyo Denshoku Co., Ltd.) was used with an amber light filter. The evaluation criteria were set as follows:

A: less than 2.0;

B: 2.0 or more and not more than 3.0;

C: 3.0 or more and not more than 4.0; and

D: 4.0 or more.

In the present disclosure, the foregoing rank C and above were determined to be acceptable for practical use.

Practical Examples 2 to 23 and Comparative Examples 1 to 9

The evaluation was conducted in a similar manner as with practical example 1 except that the conductive roller and the toner to be filled were changed as seen in Table 12. Table 12 lists the evaluation results.

TABLE 12

| | Toner | Conductive roller | Ca/CI | Cb/CI | Relationship in magnitude between Ag and Dms | Evaluation of poor clearing/contamination streaks: Contamination streaks | Evaluation of poor clearing/contamination streaks: Evaluation | Evaluation of conductive roller contamination/density unevenness Evaluation | Fogging after H/H storage: Amount of fogging [%] | Fogging after H/H storage: Evaluation |
|---|---|---|---|---|---|---|---|---|---|---|
| Practical example 1 | toner 1 | conductive roller 1 | 0.99 | 0.03 | Dms < Ag | 0 | A | A | 0.5 | A |
| Practical example 2 | toner 2 | conductive roller 1 | 0.99 | 0.01 | Dms < Ag | 1 | B | B | 2.2 | B |
| Practical example 3 | toner 3 | conductive roller 1 | 0.95 | 0.03 | Dms < Ag | 0 | A | B | 1.2 | A |
| Practical example 4 | toner 4 | conductive roller 1 | 0.90 | 0.01 | Dms < Ag | 0 | A | B | 1.2 | A |
| Practical example 5 | toner 5 | conductive roller 1 | 1.00 | 0.10 | Dms < Ag | 1 | B | A | 1.3 | A |
| Practical example 6 | toner 1 | conductive roller 2 | 0.99 | 0.03 | Dms < Ag | 0 | A | B | 1.5 | A |
| Practical example 7 | toner 1 | conductive roller 3 | 0.99 | 0.03 | Dms < Ag | 1 | B | B | 1.5 | A |
| Practical example 8 | toner 1 | conductive roller 4 | 0.99 | 0.03 | Dms < Ag | 0 | A | B | 2.3 | B |
| Practical example 9 | toner 6 | conductive roller 1 | 1.00 | 0.08 | Dms < Ag | 1 | B | A | 2.8 | B |
| Practical example 10 | toner 7 | conductive roller 1 | 1.00 | 0.08 | Dms < Ag | 0 | A | A | 2.5 | B |
| Practical example 11 | toner 8 | conductive roller 1 | 0.93 | 0.01 | Dms < Ag | 0 | A | A | 1.2 | A |
| Practical example 12 | toner 9 | conductive roller 1 | 0.91 | 0.01 | Dms < Ag | 1 | B | B | 1.6 | A |
| Practical example 13 | toner 1 | conductive roller 5 | 0.99 | 0.03 | Dms < Ag | 1 | B | A | 1.7 | A |
| Practical example 14 | toner 1 | conductive roller 6 | 0.99 | 0.03 | Dms < Ag | 1 | B | B | 1.5 | A |
| Practical example 15 | toner 10 | conductive roller 1 | 0.92 | 0.01 | Dms < Ag | 1 | B | B | 1.8 | A |
| Practical example 16 | toner 11 | conductive roller 1 | 0.95 | 0.01 | Dms < Ag | 1 | B | A | 1.4 | A |
| Practical example 17 | toner 12 | conductive roller 1 | 0.98 | 0.03 | Dms < Ag | 0 | A | A | 0.8 | A |
| Practical example 18 | toner 13 | conductive roller 1 | 1.00 | 0.08 | Dms < Ag | 1 | B | A | 1.6 | A |
| Practical example 19 | toner 14 | conductive roller 1 | 1.00 | 0.09 | Dms < Ag | 1 | B | B | 1.9 | A |
| Practical example 20 | toner 15 | conductive roller 1 | 0.98 | 0.04 | Dms < Ag | 1 | B | A | 2.5 | B |
| Practical example 21 | toner 16 | conductive roller 1 | 0.92 | 0.04 | Dms < Ag | 1 | B | B | 2.8 | B |
| Practical example 22 | toner 17 | conductive roller 1 | 0.99 | 0.03 | Dms < Ag | 0 | A | A | 2.6 | B |
| Practical example 23 | toner 18 | conductive roller 1 | 0.99 | 0.03 | Dms < Ag | 0 | A | B | 3.4 | C |
| Comparative example 1 | toner 1 | comparative conductive roller 1 | 0.99 | 0.03 | — | 5 | D | D | 2.6 | B |
| Comparative example 2 | toner 1 | comparative conductive roller 2 | 0.99 | 0.03 | Dms < Ag | 2 | C | D | 2.6 | B |
| Comparative example 3 | toner 1 | comparative conductive roller 3 | 0.99 | 0.03 | Dms < Ag | 4 | D | B | 1.8 | A |
| Comparative example 4 | toner 19 | comparative conductive roller 4 | — | — | — | 5 | D | D | 6.4 | D |

TABLE 12-continued

| | Toner | Conductive roller | Ca/CI | Cb/CI | Relationship in magnitude between Ag and Dms | Evaluation of poor clearing/ contamination streaks: Contamination streaks | Evaluation | Evaluation of conductive roller contamination/ density unevenness Evaluation | Fogging after H/H storage: Amount of fogging [%] | Evaluation |
|---|---|---|---|---|---|---|---|---|---|---|
| Comparative example 5 | toner 20 | comparative conductive roller 4 | 0.99 | 0.03 | Dms < Ag | 4 | D | C | 3.5 | C |
| Comparative example 6 | toner 21 | comparative conductive roller 4 | 0.89 | 0.01 | Dms < Ag | 2 | C | D | 2.4 | B |
| Comparative example 7 | toner 22 | comparative conductive roller 4 | 0.87 | 0.01 | Dms < Ag | 3 | C | D | 1.6 | A |
| Comparative example 8 | toner 23 | comparative conductive roller 4 | 0.99 | 0.13 | Dms < Ag | 4 | D | B | 1.8 | A |
| Comparative example 9 | toner 13 | conductive roller 6 | 1.00 | 0.08 | Dms < Ag | 3 | C | D | 2.6 | B |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-203615, filed Dec. 1, 2023, which is hereby incorporated by reference herein in its entirety.

What is claimed is:

1. A process cartridge comprising:

toner;

a toner accommodation unit configured to accommodate the toner;

an electrophotographic photosensitive member;

a charging unit configured to charge a surface of the electrophotographic photosensitive member;

a cleaning unit configured to remove residual toner from a region upstream of the charging unit; and a developing unit configured to develop an electrostatic latent image formed on the surface of the electrophotographic photosensitive member with toner to form a toner image on the surface of the electrophotographic photosensitive member, (I) wherein the charging unit includes a conductive member disposed to contact the electrophotographic photosensitive member, wherein the cleaning unit includes a cleaning blade disposed to contact the electrophotographic photosensitive member, wherein the conductive member includes a support having a conductive outer surface and a conductive layer disposed on the outer surface of the support, the conductive layer has a matrix-domain structure including a matrix and a plurality of domains dispersed in the matrix, the matrix contains a first rubber, the domains contain a second rubber, and a surface of the conductive member has a surface roughness Ra of 2.00 μm or less, and wherein G1 and G2 both fall within a range of 1.0 $N/mm^2$ or more and 10.0 $N/mm^2$ or less, and an absolute value of a difference between G1 and G2 is 0.1 $N/mm^2$ or more and 7.0 $N/mm^2$ or less, where G1 is a Martens hardness of the matrix measured at the outer surface of the conductive member under a load of 1 mN, and G2 is a Martens hardness of the domains measured at the outer surface of the conductive member under a load of 1 mN, and (II) wherein the toner includes at least toner particles, with agglomerates containing silica fine particles and binding components on surfaces of the toner particles, wherein CI is 1% by number or more and 15% by number or less, where CI (% by number) is a ratio by number of toner particles with the agglomerates, wherein CI, Ca, and Cb satisfy the following inequalities (1) and (2):

$$0.90 \le Ca/CI \le 1.00, \text{ and inequality} \quad (1)$$

$$0.01 \le Cb/CI \le 0.10, \text{ inequality} \quad (2)$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

ultrasonic condition A: an output frequency of 30 kHz, an output power of 0.75 W, and an irradiation time of 300 s, and ultrasonic condition B: an output frequency of 30 kHz, an output power of 35 W, and an irradiation time of 300 s, and wherein a relationship of Dms<Ag is satisfied, where Dms is an arithmetic mean of distances between adjacent domains at the outer surface of the conductive roller, and Ag is an arithmetic mean of Feret diameters of the agglomerates.

2. The process cartridge according to claim 1, wherein an area ratio of the binding components of an agglomerate on a surface of a toner particle with the agglomerate, observed under a scanning electron microscope is 5% or more and 50% or less with respect to the entire agglomerate.

3. The process cartridge according to claim 1, wherein the Martens hardnesses G1 and G2 satisfy a relationship of G1<G2.

4. The process cartridge according to claim 1, wherein the arithmetic mean Dms of distances between the adjacent domains is 200 nm or more and 2000 nm or less.

5. The process cartridge according to claim 1, wherein the arithmetic mean Ag of the Feret diameters of the agglomerates is 1000 nm or more and 8000 nm or less.

6. The process cartridge according to claim 1, wherein the domains contain an electron conductive agent.

7. The process cartridge according to claim 1, wherein the matrix has a volume resistivity higher than $1.00\times10^{12}$ Ω·cm and lower than or equal to $1.00\times10^{17}$ Ω·cm.

8. The process cartridge according to claim 1, wherein the toner contains a layered composite compound as an external additive.

9. The process cartridge according to claim 8, wherein the layered composite compound contains fluorine.

10. The process cartridge according to claim 8, wherein the layered composite compound is hydrotalcite.

11. A process cartridge set comprising:

a first cartridge and a second cartridge configured to be detachably attached to a main body of an electrophotographic apparatus, (I) wherein the first cartridge includes a charging unit configured to charge a surface of an electrophotographic photosensitive member, a cleaning unit configured to remove residual toner from a region upstream of the charging unit, and a first frame configured to support the charging unit and the cleaning unit, and wherein the second cartridge includes a toner container configured to accommodate toner with which an electrostatic latent image formed on the surface of the electrophotographic photosensitive member is developed to form a toner image on the surface of the electrophotographic photosensitive member, (II) wherein the charging unit includes a conductive member disposed to contact the electrophotographic photosensitive member, wherein the cleaning unit includes a cleaning blade disposed to contact the electrophotographic photosensitive member, wherein the conductive member includes a support having a conductive outer surface and a conductive layer disposed on the outer surface of the support, the conductive layer has a matrix-domain structure including a matrix and a plurality of domains dispersed in the matrix, the matrix contains a first rubber, the domains contain a second rubber, and a surface of the conductive member has a surface roughness Ra of 2.00 μm or less, and wherein G1 and G2 both fall within a range of 1.0 N/mm$^2$ or more and 10.0 N/mm$^2$ or less, and an absolute value of a difference between G1 and G2 is 0.1 N/mm$^2$ or more and 7.0 N/mm$^2$ or less, where G1 is a Martens hardness of the matrix measured at the outer surface of the conductive member under a load of 1 mN, and G2 is a Martens hardness of the domains measured at the outer surface of the conductive member under a load of 1 mN, and (III) wherein the toner includes at least toner particles, with agglomerates containing silica fine particles and binding components on surfaces of the toner particles, wherein CI is 1% by number or more and 15% by number or less, where CI (% by number) is a ratio by number of toner particles with the agglomerates, wherein CI, Ca, and Cb satisfy the following inequalities (1) and (2):

$$0.90 \le Ca/CI \le 1.00, \text{ and inequality} \tag{1}$$

$$0.01 \le Cb/CI \le 0.10, \text{ inequality} \tag{2}$$

where Ca (% by number) is the ratio by number of toner particles with the agglomerates in the toner after processed under the following ultrasonic condition A, and Cb (% by number) is the ratio by number of toner particles with the agglomerates in the toner after processed under the following ultrasonic condition B:

ultrasonic condition A: an output frequency of 30 kHz, an output power of 0.75 W, and an irradiation time of 300 s, and ultrasonic condition B: an output frequency of 30 kHz, an output power of 35 W, and an irradiation time of 300 s, and wherein a relationship of Dms<Ag is satisfied, where Dms is an arithmetic mean of distances between adjacent domains at the outer surface of the conductive roller, and Ag is an arithmetic mean of Feret diameters of the agglomerates.

* * * * *